(12) United States Patent
Asa et al.

(10) Patent No.: US 11,731,520 B2
(45) Date of Patent: Aug. 22, 2023

(54) WIRELESS POWER SYSTEM

(71) Applicant: UT-Battelle, LLC, Oak Ridge, TN (US)

(72) Inventors: Erdem Asa, Oak Ridge, TN (US); Veda Prakash Galigekere, Oak Ridge, TN (US); Omer C. Onar, Oak Ridge, TN (US); Burak Ozpineci, Oak Ridge, TN (US); Jason L. Pries, Oak Ridge, TN (US); Gui-Jia Su, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 17/892,401

(22) Filed: Aug. 22, 2022

(65) Prior Publication Data

US 2022/0402384 A1   Dec. 22, 2022

Related U.S. Application Data

(63) Continuation of application No. 17/127,197, filed on Dec. 18, 2020, now Pat. No. 11,420,524.

(60) Provisional application No. 62/950,978, filed on Dec. 20, 2019.

(51) Int. Cl.
*H02J 50/12*     (2016.01)
*B60L 53/122*    (2019.01)
*B60L 53/60*     (2019.01)
*H02J 50/80*     (2016.01)
*H02M 5/293*     (2006.01)
*H02J 7/00*      (2006.01)

(52) U.S. Cl.
CPC .......... *B60L 53/122* (2019.02); *B60L 53/60* (2019.02); *H02J 7/0047* (2013.01); *H02J 50/12* (2016.02); *H02J 50/80* (2016.02); *H02M 5/293* (2013.01); *B60L 2210/20* (2013.01); *B60L 2210/30* (2013.01); *H02J 2310/48* (2020.01)

(58) Field of Classification Search
CPC ..................................................... H02J 50/80
See application file for complete search history.

(56) References Cited

U.S. PATENT DOCUMENTS

| | | |
|---|---|---|
| 5,450,305 A | 9/1995 | Boys et al. |
| 5,568,036 A | 10/1996 | Hulsey et al. |
| 9,919,610 B1 * | 3/2018 | Sarwat ............... B60L 53/12 |
| 2014/0042821 A1 | 2/2014 | Boys et al. |
| 2020/0106303 A1 | 4/2020 | Thrimawithana et al. |
| 2020/0156489 A1 | 5/2020 | Tombelli |
| 2021/0050794 A1 | 2/2021 | Thrimawithana et al. |
| 2021/0188106 A1 | 6/2021 | Asa et al. |

* cited by examiner

*Primary Examiner* — Daniel Kessie
(74) *Attorney, Agent, or Firm* — Warner Norcross + Judd LLP

(57) ABSTRACT

A method for wirelessly or conductively (non-wireless) providing AC or DC power in AC or DC load applications and bidirectional applications.

21 Claims, 44 Drawing Sheets

WIRELESS POWER SYSTEM

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of wireless power transfer systems, also described as wireless energy transfer systems.

BACKGROUND

Conventional wireless energy transfer systems enable elimination of physical electrical contacts and provide several advantages in supplying power in electric vehicle charging systems. Conventional Plug-in Electric Vehicle (PEV) and Electric Vehicle (EV) charging systems include two different charging points, corresponding to AC and DC platforms in the vehicle. In this conventional arrangement, a wireless power transfer (WPT) system is often integrated to the DC charging platform that requires three power converter stages: AC-to-DC and DC-to-AC stages outside of the vehicle, and an AC-to-DC stage in the vehicle. One or three-phase grid power is converted to DC in the AC-to-DC stage, which is outside the vehicle, and which provides power factor correction and DC link voltage stabilization in the output. This conventional AC-to-DC stage may require a larger DC link bulk capacitor in order to operate at a high power factor and constant DC voltage. High frequency sinusoidal current is generated by the DC-to-AC stage in a resonant manner in a primary coil and transmitted to a magnetically coupled pick-up coil. High frequency AC current in the pick-up coil is converted to DC through the AC-to-DC stage and used to charge a battery of the vehicle. This conventional arrangement has inefficiencies, including the conventional arrangement's reliance on the DC link platform and its use of a bulky capacitor for PEV and EV on-board charger systems.

Conventional single and three-phase matrix converter topologies have been used for AC grid applications to generate high frequency AC current. Although, these conventional converter structures can eliminate a DC link, their configuration often causes poor power qualities under standard conditions. For instance, some such conventional approaches use a direct AC-to-AC converter to generate high frequency current on the primary side of a WPT system by using energy injection control to the load when it is needed. Such a conventional converter can reduce switching losses without reverse flow and commutation circuitry; however, the system input current THD is considered to be too high. It can be convenient to inject the power in a short time to the load, such as in the case of a dynamic wireless charging application; however, this approach is not considered suitable to run a WPT system in a continuous time for stationary charging systems. Although, overall system cost margin is reduced considering a conventional single stage configuration, these conventional converters often suffer high voltage and/or current stresses that can require commutation or compensation circuits to reduce switching and conduction losses. As a result, for WPT systems, the conventional approach is to use single stage integrated AC-to-DC Power Factor Correction (PFC) and DC-to-DC conversion topologies.

SUMMARY

In one embodiment, a system and method are provided.

In general, one innovative aspect of the subject matter described herein can be a method for wirelessly providing AC power to a vehicle or an energy storage system, the vehicle being an electric vehicle or a plug-in electric vehicle or a hybrid electric vehicle, the energy storage system including a stationary or mobile system, the vehicle or the energy storage system including a battery and an on-board AC charger configured to receive the AC power, convert the AC power to DC power, and charge the battery with the DC power. The method may include, at an off-board module, receiving a grid-voltage signal that is single-phase or three-phase, producing a modulated high-frequency voltage signal that includes a high-frequency carrier signal having an envelope corresponding to the grid-voltage signal, and wirelessly transmitting the modulated high-frequency voltage signal to the vehicle or the energy storage system. The method may include, at an on-board module spaced apart from, and electromagnetically coupled with, the off-board module, wirelessly receiving the modulated high-frequency voltage signal, and providing the modulated high-frequency voltage signal to an AC plug of the on-board AC charger as the AC power.

The foregoing and other embodiments can each optionally include one or more of the following features, alone or in combination. In particular, one embodiment includes all the following features in combination.

In some embodiments, the method may include the high-frequency carrier signal having a carrier frequency in a range that any switching power electronics device can operate within, and producing the modulated high-frequency voltage signal includes switching on-and-off the grid-voltage signal at the carrier frequency.

In some embodiments, the method may include, prior to producing the modulated high-frequency voltage signal, passing the grid-voltage signal through coupling capacitors.

In some embodiments, the method may include the coupling capacitors having any value depending on the design.

In some embodiments, the method may include, prior to producing the modulated high-frequency voltage signal, pre-filtering the grid-voltage signal.

In some embodiments, the method may include, prior to producing the modulated high-frequency voltage signal, interfacing with an AC source through a relay control system.

In some embodiments, the method may include, prior to producing a load voltage signal, interfacing with an AC source through a relay control system at an input of on-board terminals.

In some embodiments, the method may include, prior to interfacing with an AC source through a relay control system at an input of on-board terminals, filtering a voltage signal at an output.

In some embodiments, the method may include wirelessly receiving the modulated high-frequency voltage signal uses a pickup coil of the on-board module, and wirelessly transmitting the modulated high-frequency voltage signal using a primary coil of the off-board module, where the primary coil and the pickup coil are disposed adjacent to each other.

In some embodiments, the method may include the grid-voltage signal having a frequency of 50 Hz or 60 Hz, and an RMS value in a range of 110V-208V-220V-240V-480V-13.8 kV (for voltage levels and any voltage here within) as single phase or three-phase for one or both of medium and low grid voltage networks.

In general, one innovative aspect of the subject matter described herein is a system for wirelessly providing AC power to a vehicle or an energy storage system, the vehicle being an electric vehicle, a plug-in electric or an hybrid electric vehicle, the energy storage including a stationary or mobile energy storage element, the vehicle and the energy storage system including a battery and an on-board AC charger configured to receive the AC power, convert the AC power to DC power, and charge the battery with the DC power. The system may include an off-board module with an AC-to-AC bidirectional converter configured to receive a grid-voltage signal that is single phase or three-phase. The AC-to-AC bidirectional converter may be configured to convert the grid-voltage signal to a modulated high-frequency voltage signal, where the modulated high-frequency voltage signal includes a high-frequency carrier signal having an envelope corresponding to the grid-voltage signal that is single phase or three-phase. The off-board module may include a transmitter including a primary coil, the transmitter configured to wirelessly transmit the modulated high-frequency voltage signal to the vehicle or energy storage battery. The system may include an on-board module with a receiver including a pick-up coil, the receiver configured to receive the modulated high-frequency voltage signal when the primary coil and the pick-up coil are disposed adjacent to each other. The receiver may be configured to provide the modulated high-frequency voltage signal to an AC plug of the on-board AC charger as the AC power.

The foregoing and other embodiments can each optionally include one or more of the following features, alone or in combination. In particular, one embodiment includes all the following features in combination.

In some embodiments, the system may be configured such that the AC-to-AC bidirectional converter includes: two half bridges connected to single-phase active phases in a common point; the two half bridges in a single phase system configured such that, during a positive cycle, a first one of the half bridges switches on-and-off the grid-voltage signal, while a second one of the half bridges does not switch; the two half bridges configured such that, during a negative cycle, the second one of the half bridges switches on-and-off the grid-voltage signal, while the first one of the half bridges does not switch; and whereby the two half bridges chop the grid-voltage signal at a carrier frequency of the high-frequency carrier signal and produce the modulated high-frequency voltage signal.

In some embodiments, the system may be configured such that the AC-to-AC bidirectional converter includes: three half bridges connected to three-phase active phases in a common point; the three half bridges in a three-phase system configured such that, a corresponding half bridge of each phase is in an on state in positive cycle, while other half bridges are in an off state; the three half bridges configured such that, the corresponding half bridge of each phase is in an off state in a negative cycle, while other half bridges are in an on state; and whereby the three half bridges chop the grid-voltage signal at a carrier frequency of the high-frequency carrier signal and produce the modulated high-frequency voltage signal.

In some embodiments, the system may be configured such that the carrier frequency is in a range of that any switching power electronics device can operate within.

In some embodiments, the system may be configured such that the AC-to-AC bidirectional converter includes coupling capacitors connected across the two and three half bridges, respectively.

In some embodiments, the coupling capacitors may have a capacitance in a range of 1 nF-20 µF.

In some embodiments, the off-board module may include a pre-stage filter configured to filter the received grid-voltage signal.

In some embodiments, the grid-voltage signal may have a frequency of 50 Hz or 60 Hz and a RMS in a range of 110V-208V-220V-240V-480V-13.8 kV (for voltage levels and any voltage here within).

In general, one innovative aspect of the subject matter described herein can be a wireless power supply for wirelessly transmitting power to a receiver of a wireless power receiver. The wireless power supply may include power supply circuitry operable to receive AC power from an AC power source, the power supply circuitry configured to output an AC voltage signal. The wireless power supply may include transmitter circuitry operably coupled to the power supply circuitry, where the transmitter circuitry may be configured to receive the AC voltage signal from the power supply circuitry, and where the transmitter circuitry may be configured to modulate the AC voltage signal to wirelessly transmit a modulated AC voltage signal to the receiver of the wireless power receiver.

The foregoing and other embodiments can each optionally include one or more of the following features, alone or in combination. In particular, one embodiment includes all the following features in combination.

In some embodiments, the wireless power supply may be configured such that the modulated AC voltage signal transmitted to the wireless power receiver provides the wireless power receiver with AC power corresponding to grid-power received from a grid connection to a grid-power source, and where the AC power source is the grid-power source.

In some embodiments, the wireless power supply may be configured such that an envelope of the modulated AC voltage signal corresponds the AC power received from the AC power source.

In some embodiments, the wireless power supply may be configured such that the transmitter circuitry includes a primary coil configured to inductively couple with a secondary coil of the wireless power receiver for transmission of power to the wireless power receiver.

In some embodiments, the wireless power supply may be configured such that the transmitter circuitry includes switching circuitry configured to modulate the AC voltage signal to yield the modulated AC voltage signal.

In some embodiments, the wireless power supply may be configured such that the switching circuitry is configured to generate the modulated AC voltage signal by modulating the AC voltage signal according to a high-frequency carrier signal that has a carrier frequency greater than a frequency of the AC voltage signal obtained from the power supply circuitry.

In some embodiments, the wireless power supply may be configured such that the switching circuitry is configured to generate the modulated AC voltage signal by switching ON and OFF the AC voltage signal according to a modulation signal.

In some embodiments, the modulation signal may be a high-frequency carrier signal.

In some embodiments, the switching circuitry may include: two half-bridges for single phase and includes three half-bridges for three-phase system connected in a common point and active phases; for single phase, the two half-bridges configured such that, during a positive cycle, a first one of the two half-bridges configured to switch on-and-off the AC voltage signal, while a second one of the two half-bridges does not switch; for single phase, the two half-bridges configured such that, during a negative cycle, the second one of the two half-bridges configured to switch on-and-off the AC voltage signal, while the first one of the two half-bridges does not switch; for three-phase, the three half-bridges are configured such that, a corresponding half bridge of each phase is in an on state in a positive cycle, while other half bridges are in an off state; for three-phase, the three half bridges are configured such that, a corresponding half bridge of each phase is in an off state in a negative cycle, while other half bridges are in an on state; and whereby the two half-bridges and three half bridges are operable to chop the AC voltage signal at a carrier frequency of a high-frequency carrier signal and produce the modulated AC voltage signal.

In some embodiments, the wireless power receiver may be incorporated into a vehicle or an energy storage system, and where the wireless power supply is incorporated into a vehicle charging system or an energy storage charging system.

In some embodiments, the wireless power supply and the receiver may form a wireless AC bridge capable of transmitting the AC power from the AC power source to the wireless power receiver for consumption as AC power by a load.

In general, one innovative aspect of the subject matter described herein as a wireless power receiver operable to receive wireless power from a wireless power supply, the wireless power supply configured to receive AC power from an AC power source. The wireless power receiver may include a receiver configured to output an AC modulated voltage signal based on power received wirelessly from the wireless power supply. The wireless power receiver may include an AC load coupler operable to provide the AC modulated voltage signal to a load, where an envelope of the AC modulated voltage signal substantially corresponds to the AC power received from the AC power source.

The foregoing and other embodiments can each optionally include one or more of the following features, alone or in combination. In particular, one embodiment includes all the following features in combination.

In some embodiments, the receiver may include a secondary coil capable of inductively coupling with a primary coil of the wireless power supply for reception of power from the wireless power supply.

In some embodiments, the AC modulated voltage signal may be based on a high-frequency carrier signal and the AC power from the AC power source.

In some embodiments, the high-frequency carrier signal may have a carrier frequency greater than a frequency of the AC power source.

In some embodiments, the wireless power receiver may be provided in an on-board module of a vehicle or an energy storage system, where the load includes an AC charger of the vehicle or the energy storage system.

In some embodiments, the AC load coupler may include electrical conductors in electrical communication with the load.

In some embodiments, the AC load coupler may include an electrical connector operable to electrically connect to a corresponding connector associated with the load.

In general, one innovative aspect of the subject matter described herein as a method of transferring power wirelessly from a wireless power supply to a wireless power receiver. The method may include: receiving, in the wireless power supply, an AC voltage signal from an AC power source; modulating the AC voltage signal to generate a modulated AC voltage signal; and wirelessly transmitting, from the wireless power supply, the modulated AC voltage signal to a receiver of the wireless power receiver.

The foregoing and other embodiments can each optionally include one or more of the following features, alone or in combination. In particular, one embodiment includes all the following features in combination.

In some embodiments, the method may include an envelope of the modulated AC voltage signal corresponding substantially to the AC voltage signal received from the AC power source.

In some embodiments, the modulating may include modulating the AC voltage signal according to a carrier signal.

In some embodiments, the carrier signal may be a high-frequency carrier signal having a carrier frequency that is higher than a AC voltage frequency of the AC voltage signal.

In some embodiments, the method may include providing switching circuitry operable to modulate the AC voltage signal based on the carrier signal. Modulating the AC voltage signal may include chopping, via the switching circuitry, the AC voltage signal according to the carrier signal to generate the modulated AC voltage signal.

In some embodiments, the method may include wirelessly receiving the modulated AC voltage signal in the wireless power receiver, providing the modulated AC voltage signal, received by the wireless power receiver, as AC power to a load electrically coupled to the wireless power receiver, whereby AC power from the AC power source is transmitted from the wireless power supply to the wireless power receiver such that the wireless power supply and the wireless power receiver operate as an AC power bridge.

In some embodiments, wirelessly transmitting may include wirelessly transmitting, via a primary coil, the modulated AC voltage signal, and wirelessly receiving may include wirelessly receiving in a secondary coil, via inductive coupling between the secondary coil and the primary coil, the modulated AC voltage signal.

In some embodiments, the method may include: wirelessly receiving the modulated AC voltage signal in the wireless power receiver; generating a DC voltage signal based on the modulated AC voltage signal; and providing the DC voltage signal, received by the wireless power receiver, as DC power to a load electrically coupled to the wireless power receiver, whereby AC power from the AC power source is transmitted from the wireless power supply to the wireless power receiver such that the wireless power supply and the wireless power receiver operate as an AC power bridge.

In some embodiments, wirelessly transmitting may include wirelessly transmitting, via a primary coil, the modulated AC voltage signal; and wirelessly receiving may include wirelessly receiving in a secondary coil, via inductive coupling between the secondary coil and the primary coil, the modulated AC voltage signal and delivered to the DC load as DC power and in a bidirectional operation.

In general, one innovative aspect of the subject matter described herein as an AC-to-AC bidirectional converter that may include wireless power transmitter circuitry operable to transmit power wirelessly, the wireless power transmitter circuitry including transmitter resonant tuning circuitry. The converter may include receiver circuitry operable to receive power wirelessly from the wireless power transmitter circuitry, the receiver circuitry having receiver resonant tuning circuitry that is different from the transmitter resonant tuning circuitry, where the receiver resonant tuning circuitry includes one or more L and C networks arranged to form a resonant network, and where the transmitter resonant tuning circuitry includes one or more L and C networks arranged to form a resonant network.

The foregoing and other embodiments can each optionally include one or more of the following features, alone or in combination. In particular, one embodiment includes all the following features in combination.

In some embodiments, the receiver resonant tuning circuitry may include one or more of the following types of compensation circuits: series-series compensation, parallel-parallel compensation, LCC-LCC compensation, LCL-LCL compensation, series-parallel compensation, parallel-series compensation, series-LCC compensation, LCC-series compensation, parallel-LCC compensation, LCC-parallel compensation, series-LCL compensation, LCL-series compensation, parallel-LCL compensation, and LCL-parallel compensation.

In some embodiments, the wireless power transmitter circuitry and the receiver circuitry may be configured to transfer power via at least one transformer, where the at least one transformer includes at least one of a) one or more highly coupled transformers and b) one or more loosely coupled transformers, where the at least one transformer is based on one or more of the following transformer arrangements: single phase, three-phase, polyphase, multiphase, star connection, delta connection, zig-zag connection, phase-shift connection, unipolar circular coil, unipolar rectangular coil, bipolar double-D coil, bipolar coil as rectangular, bipolar coil as double-D, omni directional 3D coil, LLC transformer, and CLL transformer.

In some embodiments, the AC-to-AC bidirectional converter may be provided in transmission lines for a low voltage grid network or a medium voltage grid network as step-up or step-down solid-state transformer; where power is transferred conductively or wirelessly back to the AC grid.

In general, one innovative aspect of the subject matter described herein is a method for wirelessly providing DC power based on AC power and providing AC power based on DC power in a bi-directional configuration for energy convergence. The method may include: receiving or transmitting a DC energy source; receiving or transmitting a grid-voltage signal, the grid-voltage signal being a single phase grid-voltage signal or a three-phase grid-voltage signal; producing a modulated high-frequency voltage signal that includes a high-frequency carrier signal having an envelope corresponding to the grid-voltage signal; where, to receive the DC energy source, wirelessly transmitting the modulated high-frequency voltage signal to provide the DC energy source In one embodiment, to receive the DC energy source, at a receiver side spaced apart from, and electromagnetically coupled with, an off-board module, the method may include wirelessly receiving the modulated high-frequency voltage signal, and providing the modulated high-frequency voltage signal to a DC source as the DC power.

The foregoing and other embodiments can each optionally include one or more of the following features, alone or in combination. In particular, one embodiment includes all the following features in combination.

In some embodiments, the DC energy source may be provided by one or more of a battery and an LED.

In some embodiments, the high-frequency carrier signal may have a carrier frequency in an acceptable range for a switching power electronics device, and the method may include producing the modulated high-frequency voltage signal includes switching on-and-off the grid-voltage signal at the carrier frequency.

In some embodiments, prior to producing the modulated high-frequency voltage signal, the method may include passing the grid-voltage signal through coupling capacitors while AC to DC.

In some embodiments, the method may include, prior to producing the modulated high-frequency voltage signal, passing a DC voltage signal from the DC energy source through coupling capacitors in an opposite direction while DC to AC.

In some embodiments, the coupling capacitors may have a capacitance based on parameters for the modulated high-frequency voltage signal.

In some embodiments, the method may include, prior to producing the modulated high-frequency voltage signal, pre-filtering the grid-voltage signal.

In some embodiments, the method may include, prior to producing the modulated high-frequency voltage signal, interfacing with AC source through the relay control system while DC to AC energy transmission.

In some embodiments, wirelessly receiving the modulated high-frequency voltage signal may include wirelessly receiving the modulated high-frequency voltage signal via a pickup coil; and wirelessly transmitting the modulated high-frequency voltage signal includes wirelessly transmitting the modulated high-frequency voltage signal with a primary coil of the off-board module, where the primary coil and the pickup coil are disposed adjacent to each other.

In some embodiments, the grid-voltage signal may have a frequency of 50 Hz or 60 Hz, and an RMS in a range of 110V-208V-220V-240V-480V-13.8 kV as single and three-phases for medium and low grid voltage networks.

In general, one innovative aspect of the subject matter described herein is a system for wirelessly providing DC power based on AC power and providing AC power based DC power to provide an AC-to-DC bidirectional converter such that AC power is convertible to DC power and DC power is convertible to AC power. The system may be configured with an off-board module that includes an AC-to-AC converter configured to receive a grid-voltage signal that is a single phase grid-voltage signal or a three-phase grid-voltage signal, the AC-to-AC converter configured to convert the grid-voltage signal to a modulated high-frequency voltage signal, where the modulated high-frequency voltage signal includes a high-frequency carrier signal having an envelope corresponding to the grid-voltage signal. The off-board module may include a transmitter with a primary coil, the transmitter configured to wirelessly transmit the modulated high-frequency voltage signal to provide a DC power source. The system may be configured with an on-board module including a receiver including a pick-up coil, the receiver configured to receive the modulated high-frequency voltage signal when the primary coil and the pick-up coil are disposed adjacent to each other, and the receiver configured to provide the modulated high-frequency voltage signal to a DC load as the DC power source.

The foregoing and other embodiments can each optionally include one or more of the following features, alone or in combination. In particular, one embodiment includes all the following features in combination.

In some embodiments, the AC-to-DC bidirectional converter may include: for single phase, two half bridges connected to single-phase active phases in a common point; for single phase, the two half bridges are configured such that, during a positive cycle, a first one of the half bridges switches on-and-off the grid-voltage signal, while a second one of the half bridges does not switch; for single phase, the two half bridges are configured such that, during a negative cycle, the second one of the half bridges switches on-and-off the grid-voltage signal, while the first one of the half bridges does not switch; and for three-phase, three half bridges connected to three-phase active phases in a common point; for three-phase, the three half bridges are configured such that, a corresponding half bridge of each phase is in an on state in positive cycle, while the other half bridges are in an off state; the three half bridges configured such that, the corresponding half bridge of each phase is in an off state in a negative cycle, while the other half bridges are in an on state; and whereby the two and three half bridges chop the grid-voltage signal at a carrier frequency of the high-frequency carrier signal and produce the modulated high-frequency voltage signal during AC-to-DC energy transmission; and whereby the two half bridges and the three half bridges modulate the Sinusoidal-PWM signal during DC-to-AC energy transmission.

In some embodiments, the carrier frequency may be provided at within an acceptable range of performance for components of switching circuitry of the half bridges.

In some embodiments, the AC-to-DC bidirectional converter may include coupling capacitors connected across the two and three half bridges, respectively.

In some embodiments, the coupling capacitors may have a capacitance based on parameters for the modulated high-frequency voltage signal.

In some embodiments, the off-board module may include a pre-stage filter configured to filter the received grid-voltage signal.

In some embodiments, the grid-voltage signal may have a frequency of 50 Hz or 60 Hz and an RMS in a range of 110V-208V-220V-240V-480V-13.8 kV.

In general, one innovative aspect of the subject matter described herein is a wireless power supply for wirelessly transmitting power to a receiver of a wireless power receiver. The wireless power supply may include power supply circuitry operable to receive AC power from an AC power source, the power supply circuitry configured to output a DC voltage signal, the power supply circuitry being bidirectional such that a received DC voltage signal is convertible to AC power. The wireless power supply may include transmitter circuitry operably coupled to the power supply circuitry, the transmitter circuitry configured to receive the DC voltage signal from the power supply circuitry, the transmitter circuitry configured to modulate the DC voltage signal to wirelessly transmit a modulated AC voltage signal to the receiver of the wireless power receiver.

The foregoing and other embodiments can each optionally include one or more of the following features, alone or in combination. In particular, one embodiment includes all the following features in combination.

In some embodiments, the modulated AC voltage signal may be transmitted to the wireless power receiver provides the wireless power receiver with AC power corresponding to grid-power received from a grid connection to a grid-power source, where the AC power source is the grid-power source.

In some embodiments, the wireless power supply may be configured such that an envelope of the modulated AC voltage signal corresponds the AC power received from the AC power source.

In some embodiments, the transmitter circuitry may include a primary coil configured to inductively couple with a secondary coil of the wireless power receiver for transmission of power to the wireless power receiver.

In some embodiments, the transmitter circuitry may include switching circuitry configured to modulate the DC voltage signal to yield the modulated AC voltage signal.

In some embodiments, the switching circuitry may be configured to generate the modulated AC voltage signal by modulating the DC voltage signal according to a high-frequency carrier signal that has a carrier frequency greater than a frequency of the AC power obtained from the power supply circuitry.

In some embodiments, the switching circuitry may be configured to generate the modulated AC voltage signal by switching ON and OFF the DC voltage signal according to a modulation signal.

In some embodiments, the modulation signal may be a high-frequency carrier signal.

In some embodiments, the wireless power supply may be configured such that: the switching circuitry includes two half-bridges for single phase and three half-bridges for three-phase system connected in a common point and active phases; for single phase, the two half-bridges are configured such that, during a positive cycle, a first one of the two half-bridges is configured to switch on-and-off the DC voltage signal, while a second one of the two half-bridges does not switch; for single phase, the two half-bridges are configured such that, during a negative cycle, the second one of the two half-bridges is configured to switch on-and-off the DC voltage signal, while the first one of the two half-bridges does not switch; for three-phase, the three half-bridges are configured such that, a corresponding half bridge of each phase is in an on state in a positive cycle, while the other half bridges are in an off state; for three-phase, the three half-bridges are configured such that, the corresponding half bridge of each phase is in an off state in a negative cycle, while the other half bridges are on state; whereby the two half-bridges and the three half-bridges are operable to chop the DC voltage signal at a carrier frequency of a high-frequency carrier signal and produce the modulated AC voltage signal during AC-to-DC energy transmission; and whereby the two half-bridges and three half bridges are operable to modulate Sinusoidal-PWM with respect to the DC voltage signal and produce a AC voltage signal during DC-to-AC energy transmission.

In some embodiments, the wireless power receiver may be incorporated into a DC source, where the wireless power supply is incorporated into a DC system and is bidirectional.

In some embodiments, the wireless power supply and the receiver may form a wireless AC bridge capable of transmitting the AC power from the AC power source to the wireless power receiver for consumption as DC power by a load.

In general, one innovative aspect of the subject matter described herein as a wireless power receiver operable to receive wireless power from a wireless power supply, the wireless power supply configured to receive AC power from an AC power source. The wireless power receiver may include a receiver configured output an AC modulated voltage signal based on power received wireless from the wireless power supply, the receiver operable to provide a DC voltage signal based on the AC modulated voltage signal. The wireless power receiver may include a DC load coupler operable to provide the DC voltage signal to a load, where the AC modulated voltage signal substantially corresponds to the AC power received from the AC power source.

The foregoing and other embodiments can each optionally include one or more of the following features, alone or in combination. In particular, one embodiment includes all the following features in combination.

In some embodiments, the receiver may include a secondary coil capable of inductively coupling with a primary coil of the wireless power supply for reception of power from the wireless power supply.

In some embodiments, the DC voltage signal may be based on a high-frequency carrier signal and the AC power from the AC power source.

In some embodiments, the high-frequency carrier signal may have a carrier frequency greater than a frequency of the AC power source.

In some embodiments, the wireless power receiver may be provided in an on-board module of a DC source, where the load is operably coupled to the DC source.

In some embodiments, the DC load coupler may include electrical conductors in electrical communication with the load.

In some embodiments, the DC load coupler may include an electrical connector operable to electrically connect to a corresponding connector associated with the load.

In general, one innovative aspect of the subject matter described herein as a method of transferring power wirelessly from a wireless power supply to a wireless power receiver. The method may include: receiving, in the wireless power supply, an AC voltage signal from an AC power source; modulating the AC voltage signal to generate a modulated AC voltage signal; and wirelessly transmitting, from the wireless power supply, the modulated AC voltage signal to a receiver of the wireless power receiver.

The foregoing and other embodiments can each optionally include one or more of the following features, alone or in combination. In particular, one embodiment includes all the following features in combination.

In some embodiments, an envelope of the modulated AC voltage signal may correspond substantially to the AC voltage signal received from the AC power source.

In some embodiments, the modulating may include modulating the AC voltage signal according to a carrier signal.

In some embodiments, the carrier signal may be a high-frequency carrier signal having a carrier frequency that is higher than an AC voltage frequency of the AC voltage signal.

In some embodiments, the method may include providing switching circuitry operable to modulate the AC voltage signal based on the carrier signal. Modulating the AC voltage signal may include chopping, via the switching circuitry, the AC voltage signal according to the carrier signal to generate the modulated AC voltage signal.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

Figure 1:
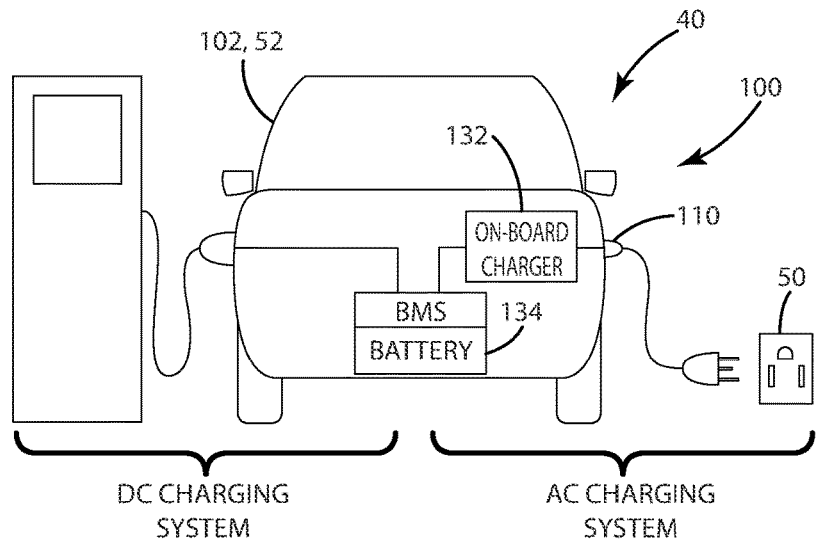
FIG. 1 shows a wireless charger system for an electric vehicle in accordance with one embodiment.
Figure 2:
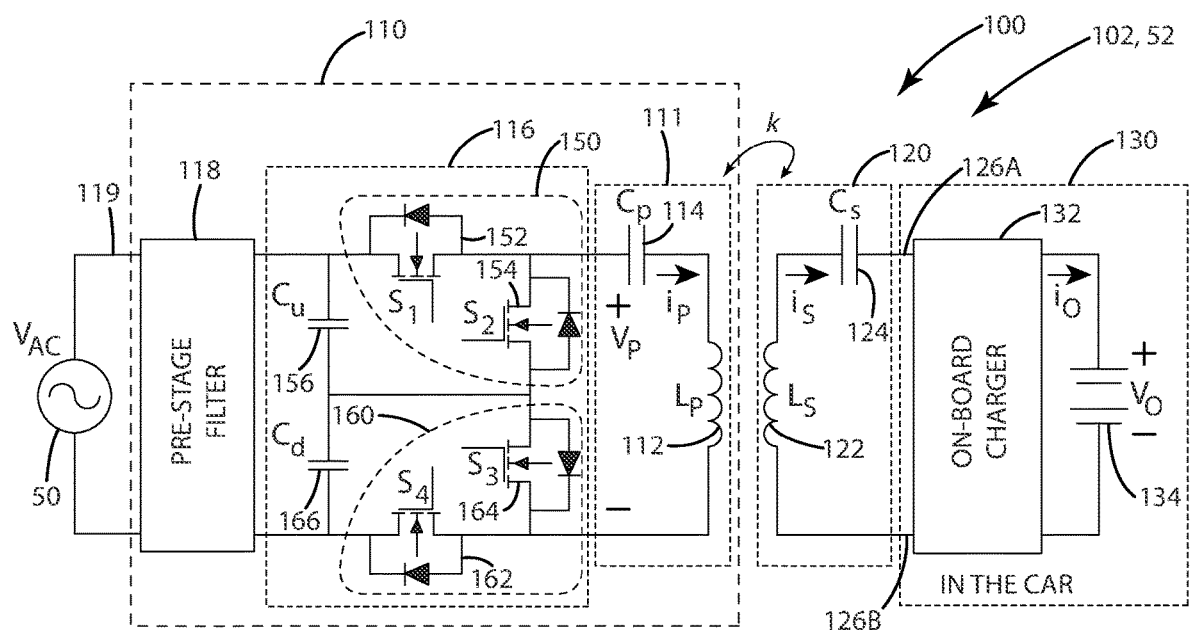
FIG. 2 shows single phase AC-to-AC converter incorporated into a wireless power system in accordance with one embodiment.

A wireless power system in accordance with one embodiment is shown in FIGS. 1 and 2 and generally designated 100. The wireless power system 100 in the illustrated embodiment includes a remote device 102 and a wireless power supply 110 configured to transmit wireless power to the remote device 102. In one embodiment, the remote device 102 may be operable to transmit power to the wireless power supply 110, which may be configured to receive wireless power in addition to or as an alternative to transmitting wireless power to the remote device 102. For purposes of disclosure, the remote device 102 is described herein as a vehicle 52; however, the remote device 102 or one or more components thereof may be incorporated into any type of apparatus or device, including, for instance, a mobile phone or table top appliance.

Additional examples of applications include a vehicle provided as an electric vehicle, a plug-in hybrid electric vehicle, or an electric/plug-in hybrid combat vehicle. Further example applications can relate to energy storage provided in a variety of forms, including a stationary or mobile energy storage system, a low/high voltage battery charger being cell phone, a laptop, a tablet, a power tool, a gardening tool, a handheld vacuum cleaner, a kitchen gadget, any type of battery charger or adapter, chargers for portable electronics (including cameras, laptops, and cell phones), household appliances with grid isolation requirements, air mobility vehicles (such as electric/hybrid propulsion aircraft, drones, UAVs, and satellites), laser applications, LEDs, single-phase or three-phase grid systems with medium or low grid voltage networks, fuel cell, solar, or wind turbine renewable energy conversion systems, microturbines (e.g., in grid connected applications), and High Voltage (HV) systems.

The vehicle 52 in the illustrated embodiment includes a wireless power receiver 120 (e.g., a receiver) separable from and capable of coupling with the wireless power supply 110 (e.g., a transmitter), which may also be considered an off-board module. The wireless power receiver 120, as described herein, may be considered an on-board module, and may be configured for transmitting and/or receiving wireless power in one embodiment to the off-board module. The wireless power receiver 120 may form part of an energy storage charging system 40.

The remote device 102 or vehicle 52 in the illustrated embodiment includes a battery 134 or principle load operable to use power received wirelessly from the wireless power supply 110. For instance, the wireless power receiver 120 may be coupled to a load 130 to provide power thereto. The load 130 in the illustrated embodiment includes an on-board charger 132, such as an on-board AC charger) operable to receive power from the wireless power receiver 120. The load 130 may also include the battery 134 or another type of principle load. The wireless power receiver 120 in the illustrated embodiment includes a receiver 122 (e.g., a secondary coil or a pick-up coil).

In the illustrated embodiment of FIG. 2, the wireless power supply 110 may include a wireless power transmitter 111 having a transmitter 112 (e.g., a primary coil) operable to couple with the receiver 122 for wirelessly transferring power, such as by magnetic coupling or inductive coupling. As described herein, the transmitter 112 and the receiver 122 may vary depending on the application, and are not limited to a single primary coil or a single secondary coil.

The wireless power supply 110 may be operable to receive power from a source 50, which may be AC or DC depending on the application as described herein. In one embodiment, where the source 50 is an AC source, the source 50 may be provided via grid power or utility power, and may be single phase or three-phase depending on the application as described herein.

Before discussion of several embodiments of wireless power systems and associated operation, it is noted that, for purposes of discussion, a controller or control system for controlling one or more components of the wireless power systems is not depicted. The controller or control system may be coupled to one or more components of the wireless power systems to achieve operation in accordance with the described functionality and methodology. For instance, several switching circuits are shown with gate connections that are not explicitly coupled to a controller or control system. Such switching circuits may be coupled to a controller or control system, which can selectively control the switching circuits in accordance with the modes and methodology described herein.

The controller or control system may be any type of microcontroller or microprocessor, and may include memory in an integrated form or may be coupled to memory in an external form. In general, the controller and components of the wireless power supply, in addition to the controller discussed herein, include circuitry and programming for carrying out the functions described herein. Such circuitry may include, but is not limited to, field programmable gate arrays, volatile or nonvolatile memory, discrete circuitry, and/or other hardware, software, or firmware that is capable of carrying out the functions described herein. The components of each component can be physically configured in any suitable manner, such as by mounting them all to a single circuit board, or they can be distributed across multiple circuit boards. The instructions followed by each of the controllers in carrying out the functions described herein, as well as the data for carrying out these functions, may be stored in memories mounted to each of components, or otherwise accessible to each controller.

I. AC-to-AC Conversion, Optionally Bidirectional

In one embodiment, the wireless power system 100 may provide a hybrid frequency wireless power converter for on-board charger applications or wireless power transfer applications. The wireless power system 100 may be controlled in an open loop mode without changing any control parameters, such as frequency and phase shift. Energy from the AC source 50, e.g., grid 60 Hz frequency power, may be transferred in an open loop mode. The AC source 50 may be coupled to power supply circuitry 119 of the wireless power system 100 as depicted in the illustrated embodiment of FIG. 2. The power supply circuitry 119 may be conductors that couple the AC source 50 to the wireless power supply 110, and may optionally include one or more connectors to facilitate providing an electrical connection between the AC source 50 and the wireless power supply 110.

The hybrid frequency wireless power converter may be defined by switching circuitry 116 of the wireless power supply 110, and may include first and second half bridges 150, 160 also described respectively as an upper or high-side half bridge 150 and a lower or low-side half bridge 160. The first and second half bridges 150, 160 may form lower and upper legs that are driven opposite during grid sinusoidal voltage in positive and negative cycles with a 50% duty cycle pulse width modulated (PWM) signal. This configuration may provide a unique solution for wireless power transfer by reducing the system infrastructure cost and complexity for AC-to-AC converter technologies, particularly for wireless energy transfer systems that include on-board charger systems. The switching circuitry 116 may enable reduction of the system THD and increase of PF in conjunction with a pre-stage filter 118 (e.g., a front stage filter) at the constant switching frequency.

The switching circuitry 116 in the illustrated embodiment includes first and second half bridges 150, 160 as discussed herein. The first half bridge 150 may include a first switch 152 ($S_1$) and a second switch 154 ($S_2$), and the second half bridge 160 may include a third switch 164 ($S_3$), and a fourth switch 162 ($S_4$). The switches of the first and second half bridges 150, 160 may be MOSFETs or any other type of solid-state switch capable of handling an amount of current specified for the application. The switching circuitry 116 may also include an upper capacitor 156 ($C_u$) and a lower capacitor 166 ($C_d$).

A hybrid frequency AC-to-AC converter topology is shown according to one embodiment for a wireless power system 100 in FIG. 2 in conjunction with an on-board charger 132 provided as part of a load 130. The wireless power system 100 includes a pre-stage filter 118, the first and second half bridges 150, 160 provided as series connected two half bridge resonant inverters, a wireless transformer with resonant capacitors, an on-board PEV/EV charger or an on-board charger 32, and a battery 134. The wireless transformer with resonant capacitors may be defined by the transmitter 112 ($L_P$) and the receiver 122 ($L_S$) in conjunction with a transmitter resonant capacitor 114 ($C_P$) and a receiver resonant capacitor 124 ($C_S$), where the transmitter 112 and the receiver 122 may couple magnetically or inductively for wireless energy transfer.

In the illustrated embodiment of FIG. 2, a grid side frequency of the AC source 50, which may correspond to a fundamental frequency of the AC source 50, may be merged with a high frequency switching signal provided to the switching circuitry 116. This approach may enable transference of the fundamental frequency of the energy through the transmitter 112 and the receiver 122 to an on-board charger 132 of the load 130. In one embodiment, the fundamental frequency of the AC source 50 may be 60 Hz, and merging with the high frequency switching signal may enable transference of this fundamental frequency to the on-board charger 132 as a 60 Hz sinusoidal signal.

A. AC-to-AC Switching Methodology

Merging between the grid side frequency of the AC source 50 and the high frequency switching single may be achieved in a variety of ways via selective activation of the switching circuitry 116. A switching arrangement according to one embodiment is shown in the illustrated embodiments of FIGS. 4-7. The states of the switches of the switching circuitry 116 and the switch transitions are presented to illustrate the behavior of the hybrid frequency AC-to-AC converter according to one embodiment. The voltage and current through components of the switching circuitry 116 are presented, for purposes of disclosure, with filter losses assumed as negligible, the input capacitor assumed as being sufficiently large, and the active switches assumed as ideal. The switching circuitry 116 and operation thereof is discussed herein according to modes when the grid sinusoidal voltage is in positive and negative cycles.

Figure 4A:
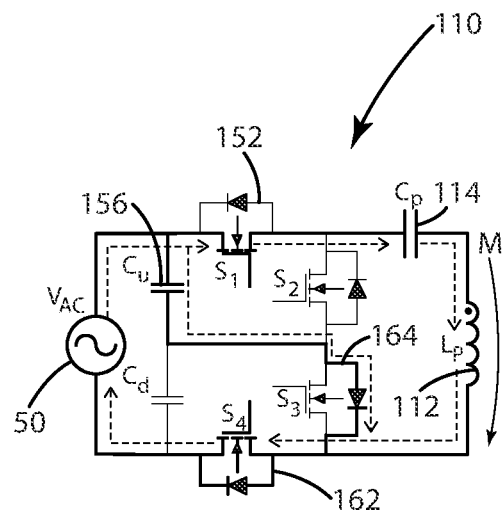
FIGS. 4A-D show various modes of operation of the wireless power system of FIG. 2 during a grid positive cycle.

Mode 1 [t0<t<t1]. During an interval corresponding to Mode 1, the active switches $S_1$ and $S_4$ are turned ON and the $S_3$ body diode is in an ON-state when grid voltage is in a positive cycle. As shown in the illustrated embodiment of FIG. 5, the current flows through $S_1$, resonant capacitor $C_P$, wireless transformer $L_P$, and $S_4$. Also, the upper capacitor $C_u$ is charged through $S_3$ body diode and $S_4$ in the converter as depicted in FIG. 4A. In the negative cycle, as shown in the illustrated embodiment of FIG. 7, the current flows through $S_4$, $L_P$, $C_P$, and $S_1$. And, bottom capacitor $C_d$ is reverse charged through $S_2$ body diode as depicted in the illustrated embodiment of FIG. 6A.

Figure 4B:
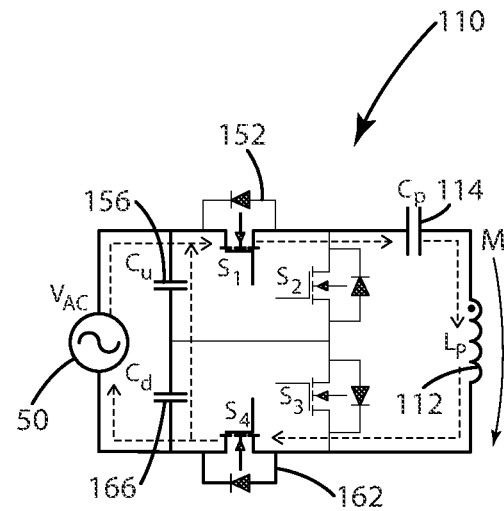
Figure 4C:
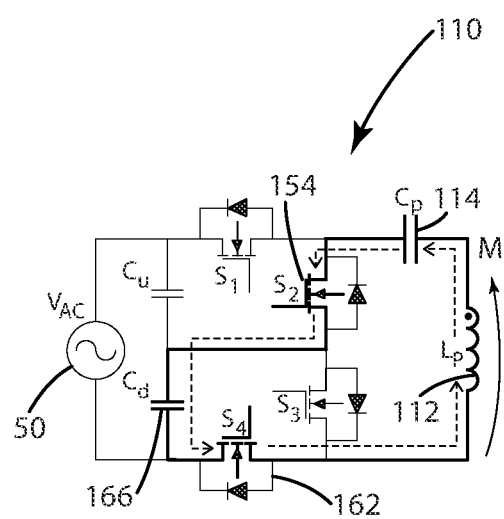
Figure 5:
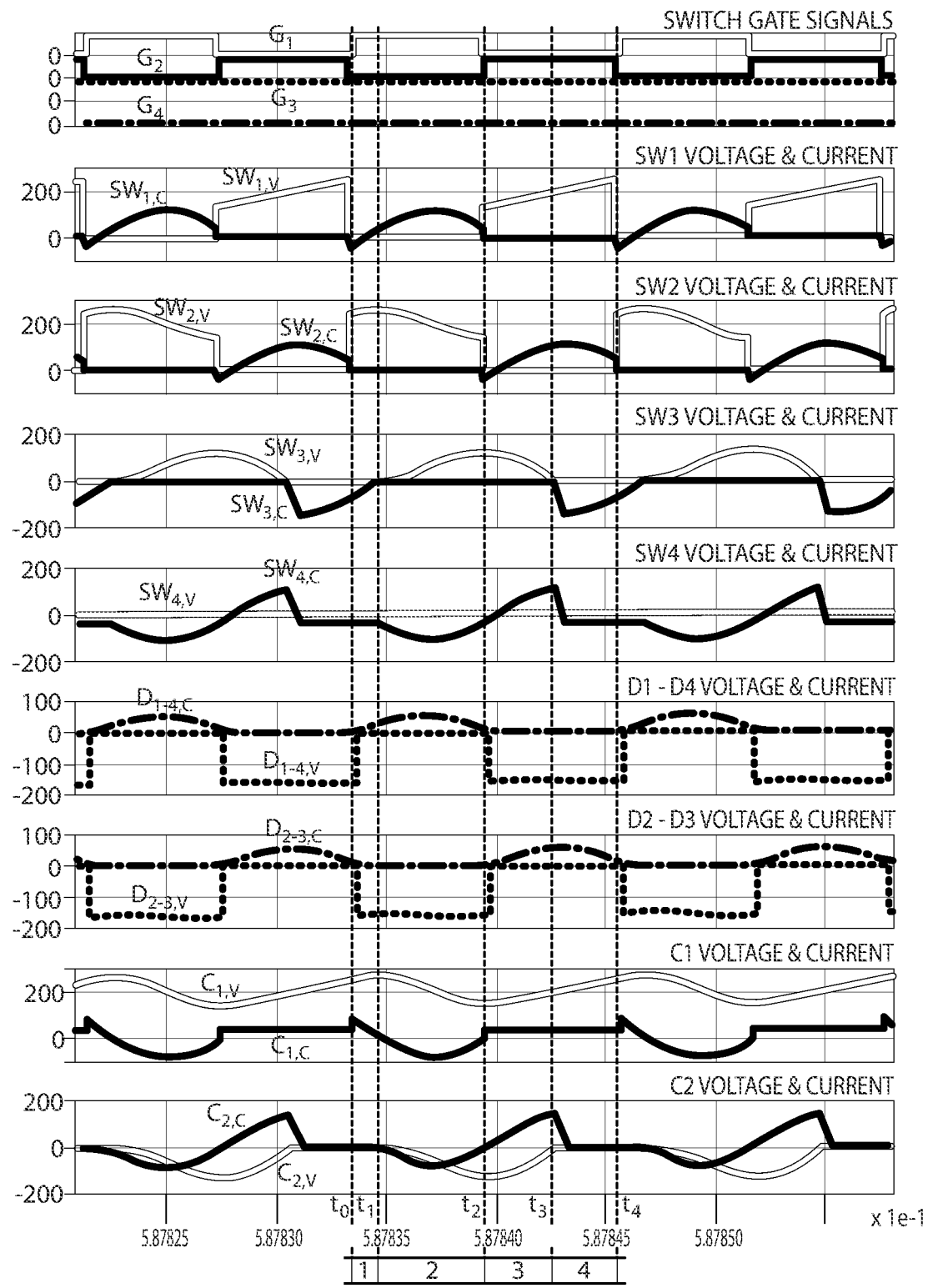
FIG. 5 depicts voltage and current waveforms for switching circuitry, including switches, diodes, and capacitors, during a grid positive cycle of the wireless power system of FIG. 2.
Figure 6A:
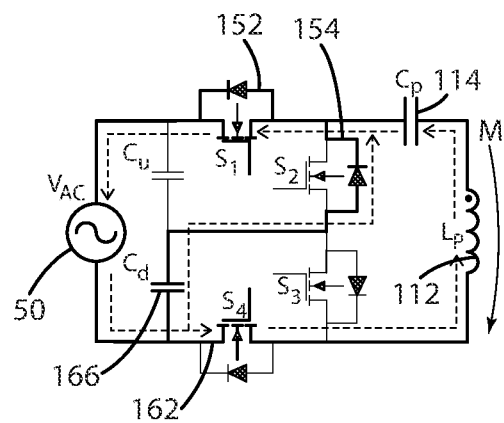
FIGS. 6A-D show various modes of operation of the wireless power system of FIG. 2 during a grid negative cycle.
Figure 6B:
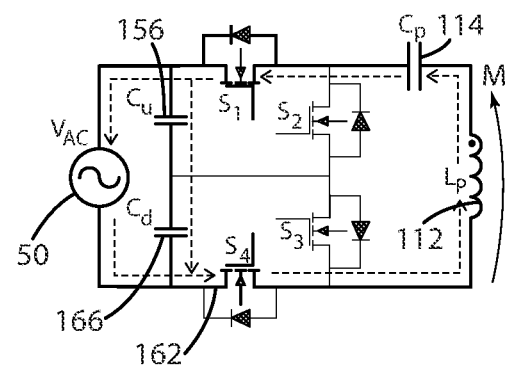
Figure 7:
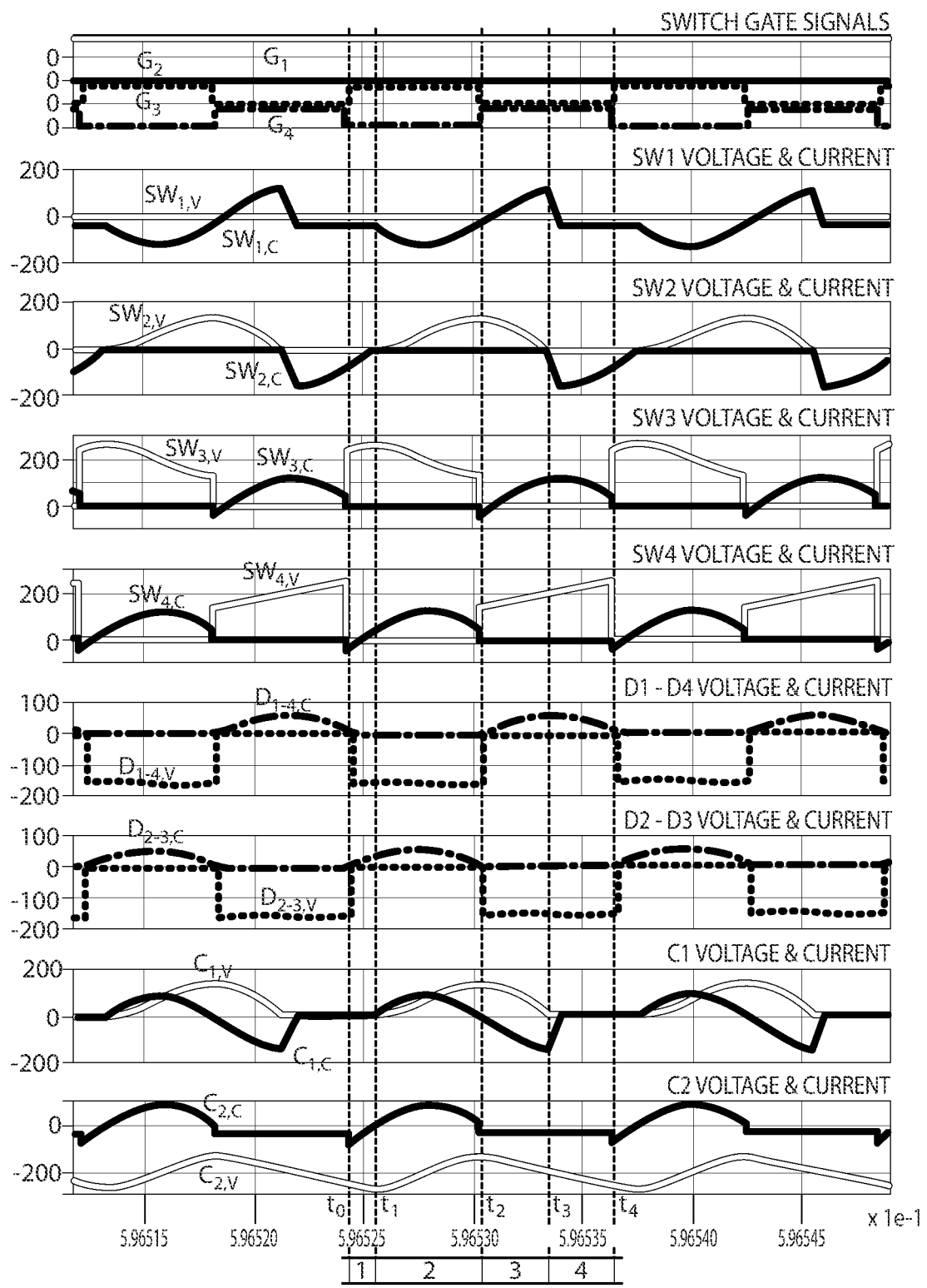
FIG. 7 depicts voltage and current waveforms for switching circuitry, including switches, diodes, and capacitors, during a grid negative cycle of the wireless power system of FIG. 2.

Mode 2 [t1<t<t2]. In a positive cycle of the grid voltage, the current flows through switches $S_1$, $C_P$, $L_P$, and $S_4$ as shown in FIG. 5 and FIG. 4B. Also, $C_d$ discharges and charges to $C_u$ in opposite polarity in this state. In the negative cycle, the current is negative and flows through $S_4$, $L_P$, $C_P$, and $S_1$ as shown in FIG. 7 and FIG. 6B. Also, $C_u$ discharges to $C_d$ in this cycle.

Figure 6C:
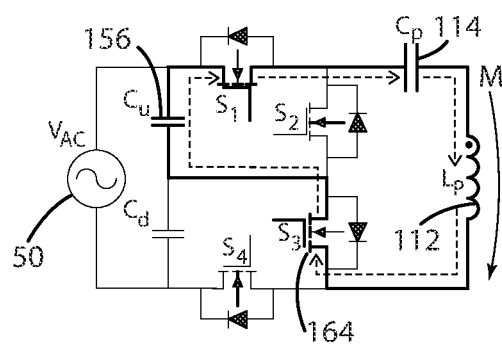
Figure 6D:
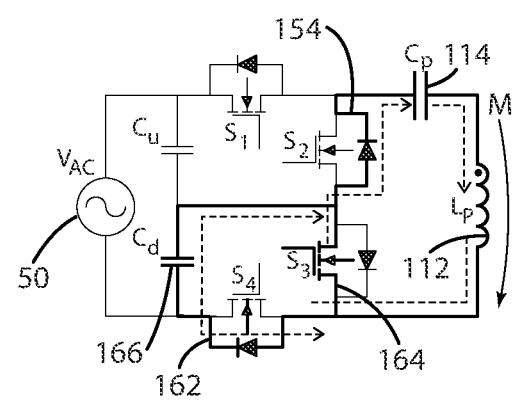

Mode 3 [t2<t<t3]. The resonant current in $L_P$ and $C_P$ discharges through $S_2$, $C_d$, and $S_4$ during the positive cycle of grid voltage as plotted in FIG. 5 and FIG. 4C. However, the resonant current in $C_P$ and $L_P$ circulates through $S_1$, $S_3$, and $C_u$ when the grid voltage is in the negative cycle as shown in FIG. 7 and FIG. 6C.

Figure 4D:
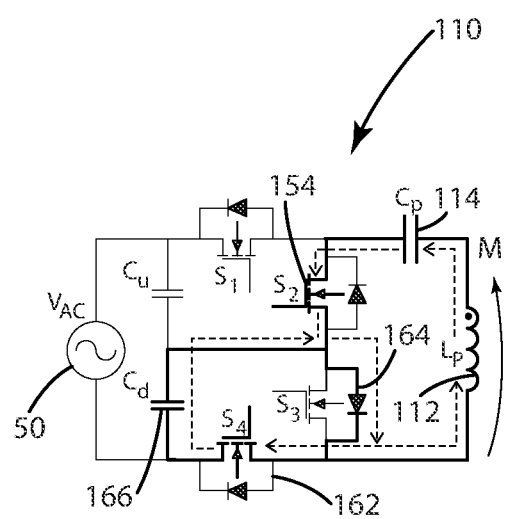

Mode 4 [t3<t<t4]. The current flows through $S_2$ and $S_4$ from $L_P$ and $C_P$ in the positive cycle of the grid voltage, and the capacitor $C_d$ discharges through $S_3$ body diode as shown in FIG. 5 and FIG. 4D. The negative polarity of the grid voltage is demonstrated in FIG. 7 and FIG. 6D in this interval that the current flows through $C_P$, $L_P$, $S_3$ and the capacitor $C_d$ discharges through $S_4$ body diode.

B. System Analysis

Figure 8:
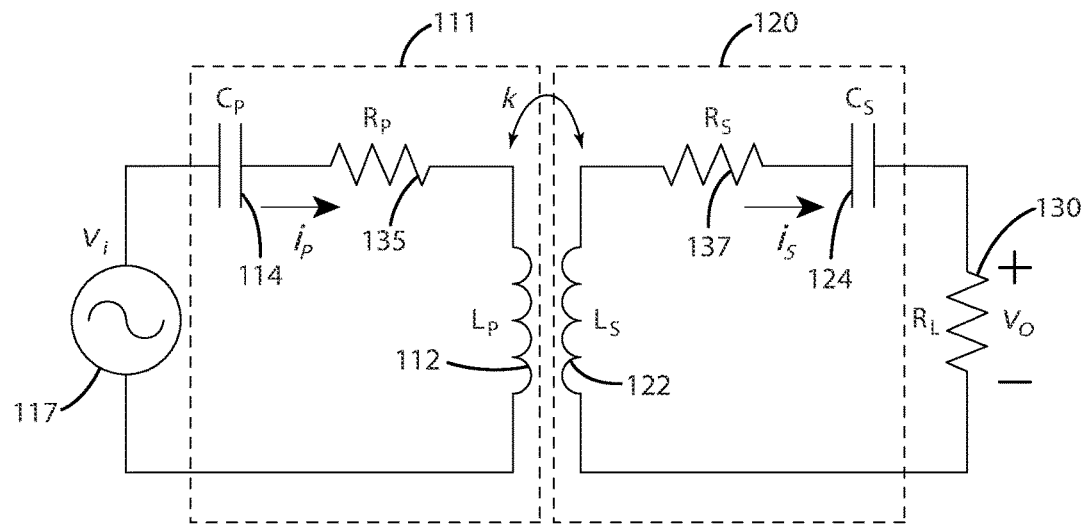
FIG. 8 shows an equivalent circuit of the wireless power system of FIG. 2.

The wireless power supply 110 and the remote device 102 according to one embodiment can be modeled according to the circuit schematic depicted in FIG. 8, the wireless system model can be represented as; the input voltage source 117 ($V_i$) output from the switching circuitry 116, transmitter resonant capacitors 114 ($C_P$), receiver resonant capacitor 124 ($C_S$), transmitter 112 ($L_P$), and receiver 122 ($L_S$). The transmitter 112 and the receiver 122 are identified with equivalent series resistances 135 ($R_P$) and 137 ($R_S$), respectively. k is a coupling factor between the transmitter 112 and the receiver 122 (e.g., the two coils) that leakage $L_L$ and magnetizing inductance $L_M$ values can be equivalently calculated from two coupled inductors as, $$L_M = k\sqrt{L_p L_s} = kL \quad (1)$$

$$L_L = L - L_M = (1-k)L \quad (2)$$

where, both coils $L_P$ and $L_S$ are assumed to be identical and equal to L. Primary $Z_P$ and secondary $Z_S$ equivalent impedances, where $$Z_p = \frac{1}{j\omega C_p} + R_p + j\omega L_L \quad (3)$$

$$Z_s = j\omega L_L + R_s + \frac{1}{j\omega C_s} \quad (4)$$

$Z_M$ is the magnetizing impedance related to the coupled inductors by $Z_M = j\omega L_M$. In these equations, $\omega = \{2\pi f_{sw}\}$ represents switching frequency of $f_{sw}$. The primary resonant sinusoidal voltage $V_i$ is in positive or negative or zero during the fundamental grid frequency $f_{60}$, and defined as $$V_i(t) = \begin{cases} v_{i,max}\sin(2\pi f_{60}t), & 0 < \omega \leq \pi \\ -v_{i,max}\sin(2\pi f_{60}t), & \pi < \omega \leq 2\pi \end{cases} \quad (5)$$

Using the Kirchhoff's voltage law, primary and secondary resonant tank in a matrix form is $$\begin{bmatrix} V_i \\ 0 \end{bmatrix} = \begin{bmatrix} Z_P + Z_M & -Z_M \\ -Z_M & Z_M + Z_S + R_L \end{bmatrix} \begin{bmatrix} I_P \\ I_S \end{bmatrix} \quad (6)$$

If the system is operated at the resonant frequency $\omega_R$ as where, $\omega_R = 1/\sqrt{L_p C_p} = 1/\sqrt{L_s C_s}$. The corresponding voltage and current transfer function of the contactless system can be written as, $$|M_V| = \left|\frac{V_o}{V_i}\right| = \left|\frac{Z_P}{R_L} + \frac{Z_S(Z_P + Z_M)}{R_L Z_M} + \frac{Z_P + Z_M}{Z_M}\right|^{-1} \quad (7)$$

$$|M_I| = \left|\frac{I_S}{I_P}\right| = \left|\frac{Z_M}{Z_M + Z_S + R_L}\right| \quad (8)$$

Figure 9:
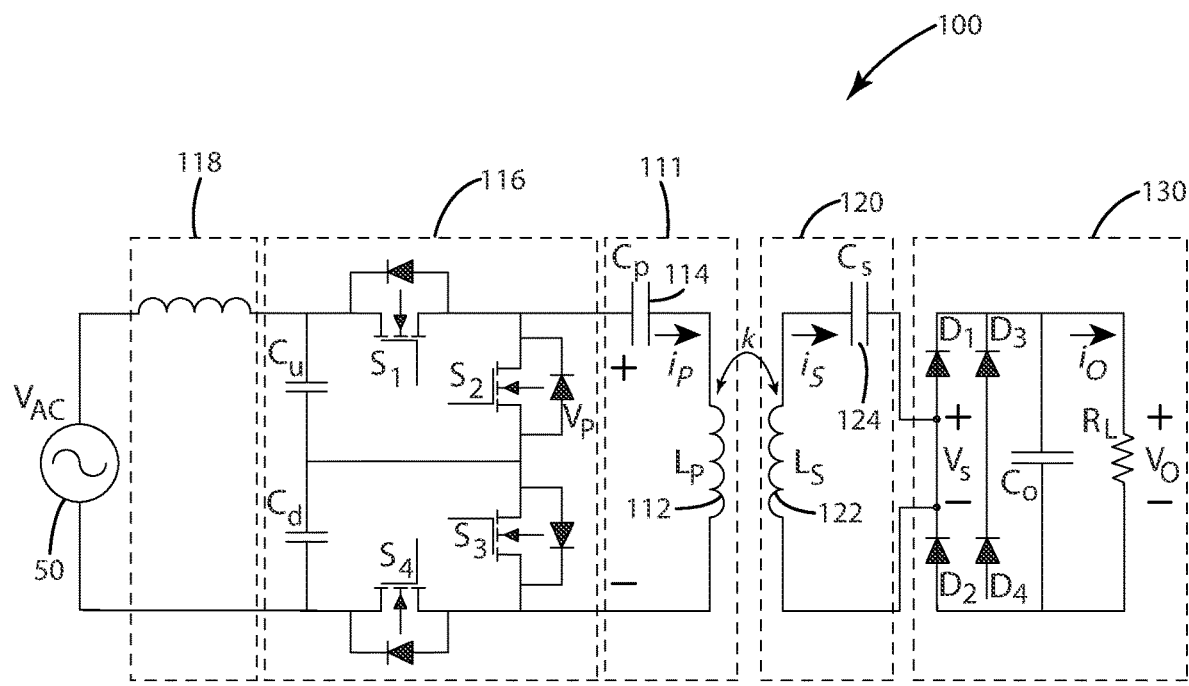
FIG. 9 shows a wireless power system in accordance with one embodiment.

A wireless power system 100 in accordance with one embodiment is depicted in FIG. 9, including a load 130 having a full-bridge rectifier ($D_1$, $D_2$, $D_3$, $D_4$), a filter capacitor $C_O$, and a load resistance $R_L$. The pre-stage filter 118 in the illustrated embodiment includes an inductor $L_i$; however, it is to be noted that the topology and components of the pre-stage filter 118 is not limited to this arrangement and that it may vary depending on the application.

Figure 10A:
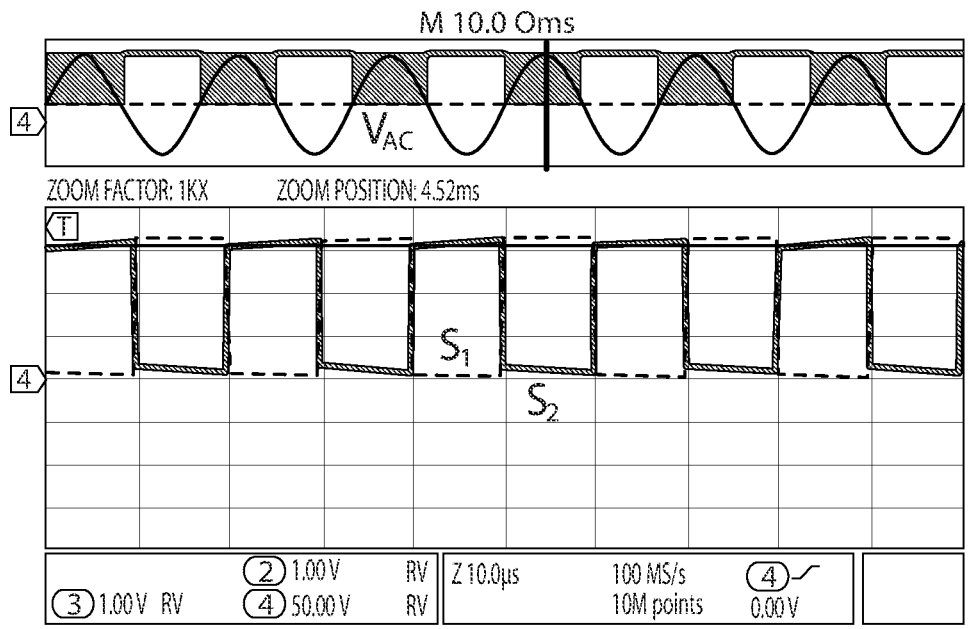
FIG. 10A depicts modulation gate signals for a sinusoidal grid voltage and a positive cycle.
Figure 10B:
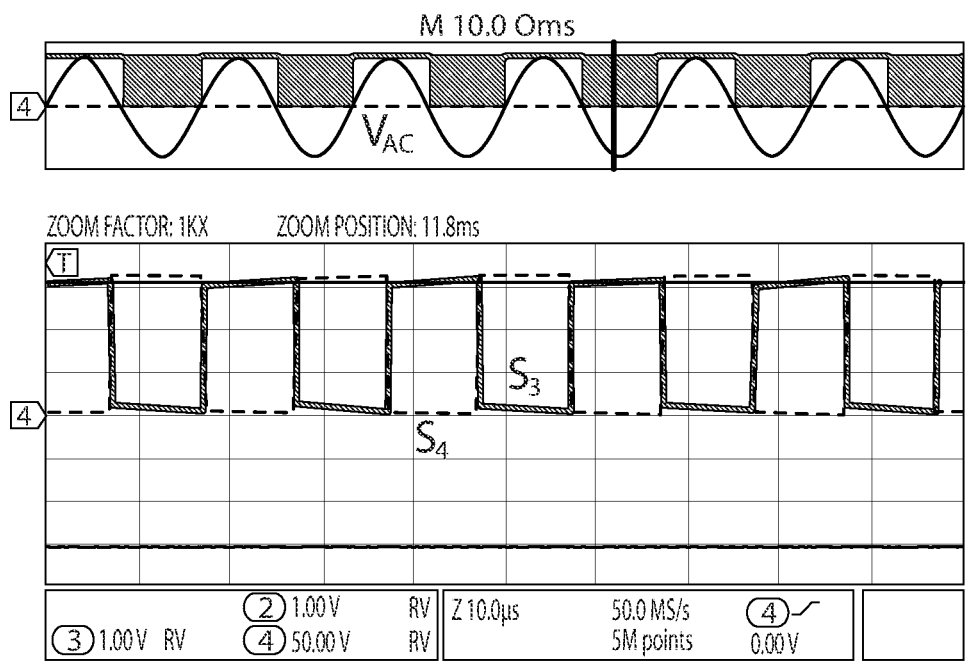
FIG. 10B depicts modulation gate signals for a sinusoidal grid voltage and a negative cycle.

The illustrated embodiment of FIG. 9 is considered applicable for an on-board charger application with the on-board charger 132 being represented by the full-bridge rectifier, the filter capacitor $C_O$, and the load resistance $R_L$. The full bridge rectifier may provide unity power factor (PFC) within the on-board charger 132. FIG. 10A shows switch gate waveforms with grid 60 Hz sinusoidal voltage when $S_1$ and $S_2$ are activated with 50% duty complementary gate signals, $S_3$ is on-state, and $S_4$ is off-state in positive cycle. However, during in negative cycle, $S_3$ and $S_4$ gate signals are activated with 50% duty complementary gate signals, $S_1$ is on-state, and $S_2$ is off-state as shown in FIG. 10B.

Figure 3A:
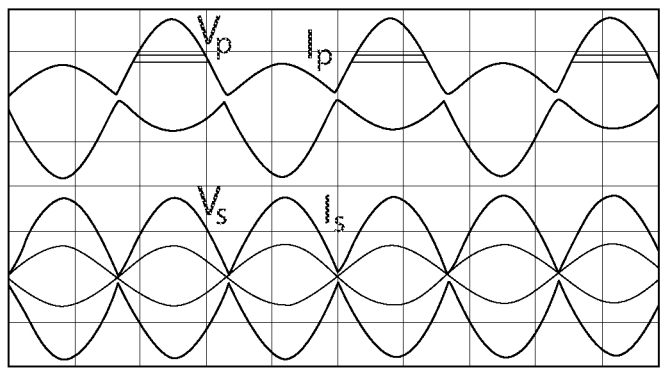
FIG. 3A depicts waveforms for a primary voltage and current and a secondary resonant tank voltage and current of the wireless power system of FIG. 2.
Figure 3B:
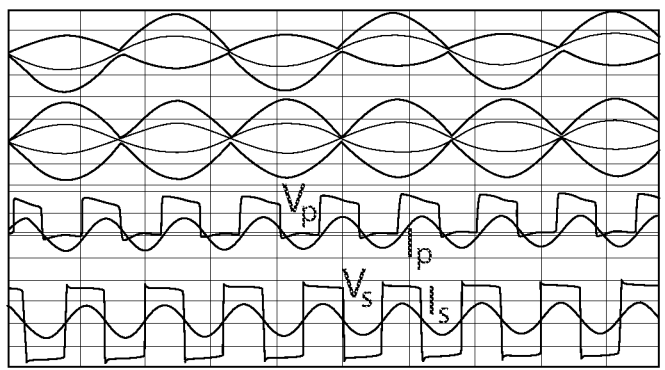
FIG. 3B depicts an enlarged version of the positive cycle waveforms in FIG. 3A.
Figure 3C:
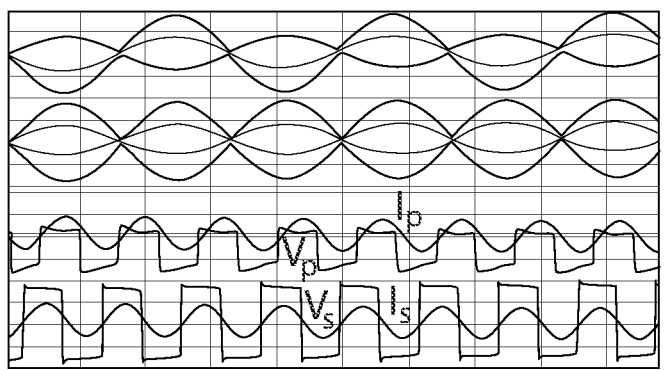
FIG. 3C depicts an enlarged version of the negative cycle waveforms in FIG. 3A.

The selected primary and secondary resonant tank voltage and current waveforms are given in FIG. 3A when the switching frequency is constant at 85 kHz during grid 60 Hz frequency. FIG. 3B and FIG. 3C present the selected waveforms in zoom during positive and negative cycles, respectively. As seen from the results, the system is running in open loop with 50% duty cycle that the primary switches operate at zero voltage switching during the operation in both positive and negative cycles. Also, the system current on the primary and secondary sides is pure sinusoidal as seen from the waveforms.

A wireless power system 100 in accordance with one embodiment is identified in Table I relative to conventional configurations. As can be seen, the bulky capacitor can be eliminated relative to conventional solutions, reducing volume and weight relative to these conventional solutions. Also, the wireless power system 100 may enable significant time savings in the system design process.

TABLE I

| | Conventional WPT | | |
|---|---|---|---|
| | Grid + Filter + Rectifier + Single Phase PFC + Half Bridge HF DC/AC + Wireless + Rectifier + Battery | Grid + Filter + Rectifier + Interleaved PFC + Full Bridge HF DC/AC + Wireless + Rectifier + Battery | Described WPT Grid + Filter + Single Phase Hybrid DC/AC + Wireless + On-board Charger + Battery |
| FET | 3 | 6 | 4 |
| Diode | 9 | 10 | 0 |

TABLE I-continued

| | Conventional WPT | | |
|---|---|---|---|
| | Grid + Filter + Rectifier + Single Phase PFC + Half Bridge HF DC/AC + Wireless + Rectifier + Battery | Grid + Filter + Rectifier + Interleaved PFC + Full Bridge HF DC/AC + Wireless + Rectifier + Battery | Described WPT Grid + Filter + Single Phase Hybrid DC/AC + Wireless + On-board Charger + Battery |
| Bulk Capacitor | 1 | 1 | 0 |
| Design Stage | 2 | 2 | 1 |

The wireless power system 100 according to one embodiment can be used for PEV/EV on-board chargers. As described herein, the wireless power system 100 in one embodiment may provide a converter topology that can be operated with a constant frequency, without any closed loop control, and without additional converter stages The wireless power system 100 in one embodiment may provide a hybrid frequency wireless power converter that is configured to control an onboard battery in an open loop manner without changing any control parameters, such as frequency and phase shift. Grid 50 Hz/60 Hz frequency energy transfer can be achieved via this converter configuration. The wireless power system 100 may reduce infrastructure cost and complexity for AC-to-AC converter technologies, particularly wireless energy transfer systems for onboard charger systems. The system THD and power factor with EMI concerns can be reduced relative to conventional approaches with a unified power factor and a front stage filter at the constant switching frequency. The bulky capacitor used conventionally can be eliminated, thus reducing volume and weight.

Although the described AC-to-AC converter configuration can be used for WPT PEV/EV onboard charger systems, the wireless power system 100 can be used in grid applications such as grid-tied energy mobility systems. As such, the AC-to-AC hybrid frequency converter can be used for grid frequency wireless energy transfer. Example commercial applications include Wireless PEV/EV Charger Systems; AC/AC grid energy wireless energy transfer systems; UAV wireless charger systems through the grid; AC/AC electronic wireless charger systems for laptop, tablet, or phone; AC/AC electronic wireless charger systems for any appliances or home equipment; dynamic wireless charger systems; and energy storage mobility systems.

A method for wirelessly or conductively (non-wireless) providing AC or DC power to an AC or DC load is provided herein. The method may involve unidirectional or bi-directional power transfer, and may include one or more converters described herein. The method may be implemented in conjunction with a vehicle, such as an electric vehicle or a plug-in hybrid electric vehicle or electric/plug-in hybrid combat vehicle. Additionally, or alternatively, the method may be implemented in conjunction with an energy storage element that can be a stationary or mobile energy storage system. Examples of systems that include such an energy storage element include low or high voltage battery chargers for cell phones, laptops, tablets, power tools, gardening tools, handheld vacuum cleaners, kitchen gadgets. The method may be implemented in conjunction with any type of battery charger or adapter, such as chargers for portable electronics, including cameras, laptops, cell phones, household appliances with grid isolation requirements, air mobility vehicles being electric/hybrid propulsion aircraft, drone, UAV, satellite, laser, LED. The method may be implemented in conjunction with single-phase or three-phase grid systems that include medium or low grid voltage networks, fuel cell or solar or wind turbine renewable energy conversion systems, microturbines as grid connected applications, and High Voltage (HV) systems.

It is noted that the wireless power system 100 is described herein, for purposes of disclosure, with a one-way transfer of power from the wireless power supply 110 to the wireless power receiver 120. It is to be understood that, in an alternative embodiment, power transfer for the wireless power system 100 may be two-way in accordance with one or more embodiments described herein. For instance, the receive switching circuitry, similar to the switching circuitry 116, may be included in the wireless power receiver 120 and be capable of driving the receiver 122 with power stored in the load 130 to transfer such power to the wireless power supply 110 and to the source 50.

The wireless power transmitter circuitry 111, 114 and the receiver circuitry 120, 124 in the illustrated embodiment of FIG. 2 form an AC-to-AC bidirectional converter with the different resonant tuning circuitry; being a configuration of L and C networks arranged to form a resonant network. A variety of configurations are available, including but not limited to series-series compensation, parallel-parallel compensation, LCC-LCC compensation, LCL-LCL compensation, series-parallel compensation, parallel-series compensation, series-LCC compensation, LCC-series compensation, parallel-LCC compensation, LCC-parallel compensation, series-LCL compensation, LCL-series compensation, parallel-LCL compensation, and LCL-parallel compensation, or any combination thereof.

An AC-to-AC bidirectional converter in accordance with one embodiment can be applied with a highly coupled or loosely coupled transformer and can be configured for single phase, three phase, polyphase (e.g., multiphase), star connection, delta connection, zig-zag connection, phase-shift connection, unipolar circular coil, unipolar rectangular coil, bipolar double-D coil, bipolar coil as rectangular, bipolar coil as double-D, omni directional 3D coil, LLC transformer, CLL transformer, or any combination thereof.

The AC-to-AC bidirectional converter in one embodiment can be applied to low voltage (LV) and medium voltage (MV) grid networks and transmission lines as step-up or step-down as a solid-state transformer, enabling power to be transferred conductively or wirelessly back to the AC grid.

II. Three-Phase AC-to-AC Conversion, Optionally Bidirectional

As discussed herein, energy storage systems (ESSs) can support several applications with fast response time from grid support services to renewable energy and transportation. Providing ESSs in conjunction with renewable energy sources is often used to improve the grid energy fluctuation by providing ancillary services to distribution operators. It is noted that a considerable amount of ESSs are often used with the increasing number of solar and wind farms to provide grid reliability and stability including grid network delays, reactive power support, and peak load shaving. However, unpredictable load variation and uncertain energy fluctuation of renewable sources can impact the grid operations if the ESSs are not suitably managed.

Integrated microgrid systems can be used with mobile ESSs to lessen the effects of unpredictable load variation and uncertain energy fluctuation. In this way, renewable energy sources can be locally managed to reduce impact to the upstream grid, and impulsive load oscillation can be controlled more effectively, for instance EV charging profiles, which impose unpredictable load flection to the grid. An advantage of mobile ESSs is the ability for use in a wide range of locations in any distribution network as mobile services in a timely manner. During peak hours, ESSs can be discharged in one region and can be charged in the other region during normal times, relieving the burden of the grid operation in different regions and time periods. Integrating microgrids with the mobile ESSs can effectively make the power network economic and flexible, reducing the peak load curve with coordination (potentially optimal coordination).

Contactless power transfer (CPT) or WPT in accordance with one embodiment may be provided in a mobile ESS or another power system, as described herein. A mobile ESS may be configured for WPT in a manner that is less susceptible to potential deficiencies of wired power systems. For instance, during power outages or peak load time, infrastructure of mobile ESSs may be heavily relied upon to deploy power to the affected sites. Deploying a wired system becomes more laborious and complicated as the wired system becomes more bulky due to increases in the power capacity. For instance, the wired system may require a specific-type of connector or a plug system that may not be available at the time of deployment. A WPT in accordance with one embodiment, on the other hand, offers flexible speedy deployment and an inherent galvanic isolation, both of which are useful in harsh environments and inclement weather conditions for emergency power systems. In one embodiment, with the elimination of physical electrical contacts, a bidirectional WPT may enable back and forth energy transfer between grid and ESSs.

Figure 40:
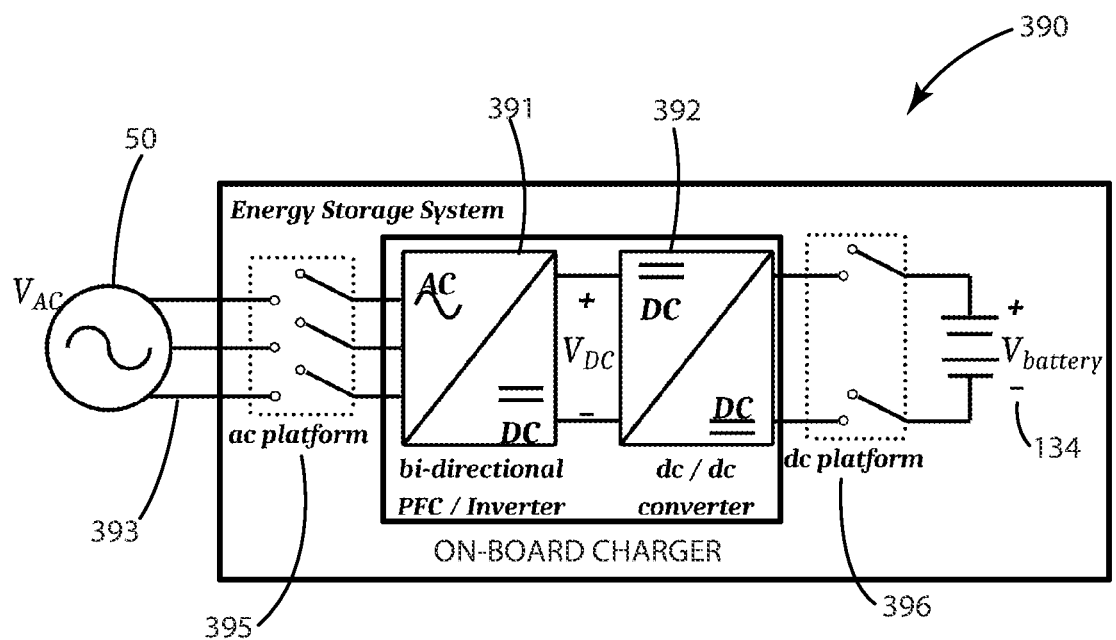
FIG. 40 depicts an energy storage system in accordance with one embodiment of the present disclosure.

An ESS in accordance with one embodiment is depicted in FIG. 40 and generally designated 390. The ESS 390 may form at least part of a load of a wireless power system in accordance with one embodiment of the present disclosure. Additionally, or alternatively, a wireless power system may be incorporated into the ESS 390 such that a portion of the ESS 390 forms a load of the wireless power system. The ESS 390 in the illustrated embodiment includes an AC-to-DC converter 391 and a DC-to-DC converter 392 operable to receive power from a source 50 via an ESS input 393 to provide power to a load in the form of a battery 134. In the illustrated embodiment, the AC-to-DC converter 391 and the DC-to-DC converter 392 are bidirectional such that the source 50 may become a load with the power from the battery 134 being used by the AC-to-DC converter 391 and the DC-to-DC converter 392 to supply power to the source 50. In one embodiment, the power provided by the source 50 may be output from a wireless power system (e.g., wireless power system 100, 300, 1100, 1100') in accordance with one or more embodiments described herein. The source 50 may be coupled to a wireless power system capable of bi-directionally sourcing and receiving power from the ESS 390. In an alternative embodiment, the AC-to-DC converter 391 and/or the DC-to-DC converter 392 may be replaced with a wireless power system in accordance with one embodiment of the present disclosure.

In the illustrated embodiment of FIG. 40, the ESS 390 includes two different connection terminals, an AC connection terminal assembly 395 and a DC connection terminal assembly 396. The AC-to-DC converter 391 may be bidirectional and integrated as part of an on-board system (e.g., an on-board charger) of the ESS 390, converting AC energy to DC energy for charging or inverting DC energy to the AC grid in two directions as depicted. A WPT system configured for AC-to-AC conversion, according to one embodiment, can be integrated between an ESS 390 and a grid via a coupler coil with single stage configuration.

It is noted that a WPT system including a DC platform may involve multiple power conversion states for bidirectionality. For instance, the WPT system may include at least four power conversion stages as bidirectional: 1) an AC-to-DC stage to or from grid power, 2) a DC-to-AC high frequency resonate or rectifier, 3) an AC-to-AC converter through coupling coils, and 4) an AC-to-DC rectifier or high frequency resonating stage on the vehicle or energy storage system or another system.

In one embodiment, three-phase grid power converters can be used for power factor correction or an inverter for both directions in the AC-to-DC converter that provides unity power factor (PF) and low total harmonic distortion (THD) to the grid. This AC-to-DC converter stage may involve DC link voltage regulation to operate at substantially constant DC voltage with larger DC link capacitors at the input or output of the AC-to-DC converter. High frequency sinusoidal current may be generated by a DC-to-AC converter (e.g., an inverter) or AC-to-DC stages during reverse power flow. The current may be applied to a resonant stage and coupling coils for transference of energy in both directions. High frequency AC current in a secondary side coil may be converted to DC through an AC-to-DC converter stage (e.g., an active converter or passive rectifier) for charging the battery 134 or producing high frequency sinusoidal current in reverse power flow from the battery 134.

In one embodiment, as described herein, DC converter stages of the ESS 390 may be replaced with a direct AC-to-AC converter with WPT capabilities. The AC-to-AC converter with such WPT capabilities may enable bidirectional operation. This configuration may reduce the number of conversion stages and may reduce cost grid application of ESSs 390.

Figure 41:
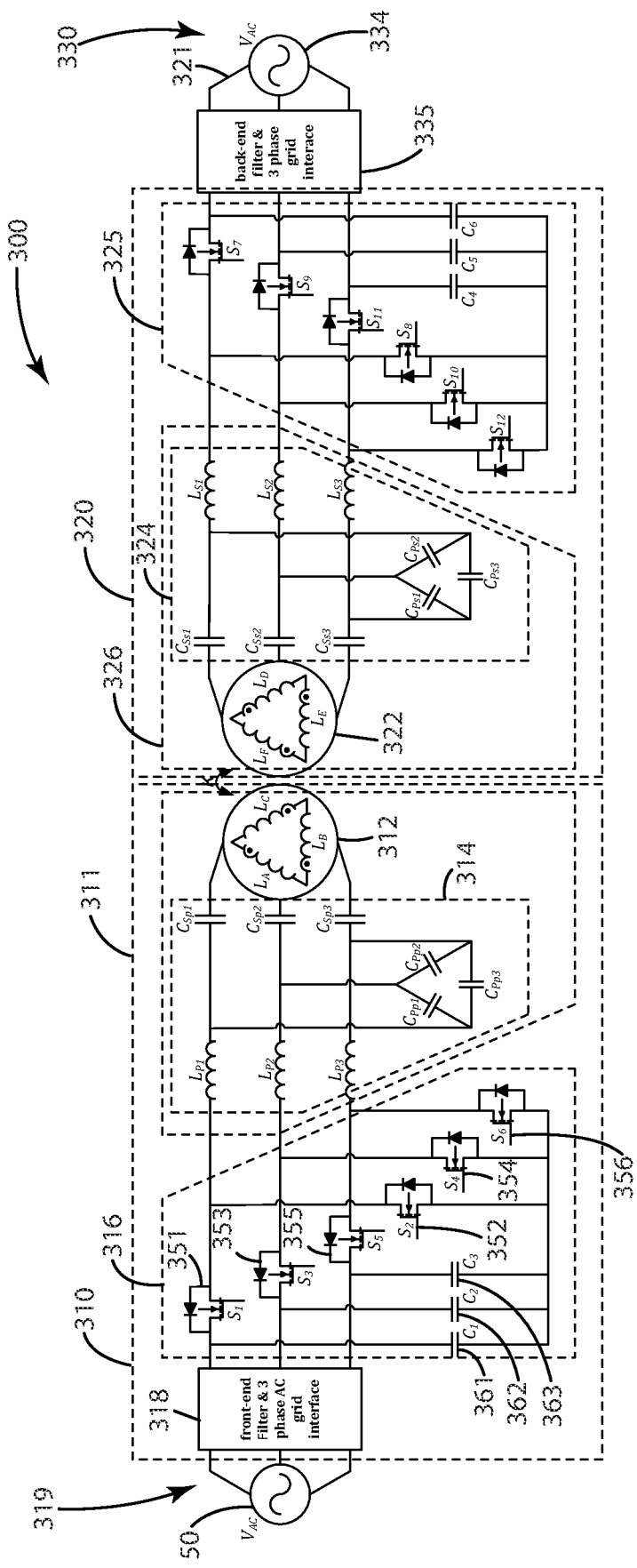
FIG. 41 shows a three phase bi-directional AC-to-AC converter incorporated into a wireless power system in accordance with one embodiment.

In the illustrated embodiment of FIG. 41, a wireless power system is shown and generally designated 300. The wireless power system 300 in the illustrated embodiment may be considered an AC-to-AC converter, similar to the AC-to-AC converter aspects of the wireless power system 100 with the exception of the wireless power system 300 being configured for three-phase AC-to-AC conversion in connection with a source 50 that is a three-phase source (e.g., a three-phase grid connection). The wireless power system 300 in the illustrated embodiment includes power supply circuitry 319, similar to the power supply circuitry 119, operable to provide a connection between the source 50 and a wireless power supply 310 of the wireless power system 300. The power supply circuitry 319 may be conductors that couple each phase-leg of the source 50 to the wireless power supply 310.

The wireless power supply 310 may include switching circuitry 316 operable to selectively provide power to a wireless power transmitter 311 for transferring power inductively to a wireless power receiver 320. The wireless power receiver 320 may be coupled to a load 330, which in the illustrated embodiment is provided as an AC load 334 with interface circuitry 335 provided between the AC load 334 and the wireless power receiver 320. The interface circuitry 335 may include back-end filter and three-phase grid interface circuitry. The AC load 334, as described herein in conjunction with one embodiment, may be operable to source power back to the wireless power receiver 320 for power transfer from the wireless power receiver 320 to the wireless power supply 310. The wireless power receiver 320 may include receiver switching circuitry 325 operable to selectively provide power to receiver circuitry 326 including the receiver 322 such that the receiver 322 is operable as a transmitter to provide power wirelessly to the transmitter 312. The receiver switching circuitry 325, operating to transmit power via the receiver 322 to the transmitter 312, may be switched in a manner similar to that described in connection with the switching circuitry 316 of the wireless power supply 310.

The wireless power supply 310 may include a transmitter 312 operable to couple with a receiver 322 of the wireless power receiver 320 for wirelessly transferring power, such as by magnetic coupling or inductive coupling. As described herein, the transmitter 312 and the receiver 322 may vary depending on the application.

In the illustrated embodiment, the transmitter 312 and the receiver 322 are configured similar respectively to one or more embodiments of the transmitter 1112 and receiver 1122 described herein in conjunction with the wireless power supply system 1100, 1100'. For instance, the transmitter 312 and the receiver 322 may be configured for three-phase coupling to transfer power wirelessly therebetween. As discussed herein, the transfer of power may be one-way from the transmitter 312 to the receiver 322, or two-way (e.g., bidirectional) from the transmitter 312 to the receiver 322 and from the receiver 322 to the transmitter 312.

The wireless power supply 310 may be operable to receive power from a source 50, which may be AC or DC depending on the application as described herein, with the source 50 in the illustrated embodiment being a three-phase AC source.

The wireless power system 300 in the illustrated embodiment may be incorporated into a system described herein to operate as an AC-to-AC converter, potentially operating in place of an AC-to-AC converter described in such system, or in place of two or more converter stages that effectively provide AC-to-AC conversion, such as an AC-to-DC converter followed by a DC-to-AC converter. In the illustrated embodiment, for purposes of discussion, the wireless power system 300 is described in conjunction with a mobile ESS forming a wireless mobility energy storage system (WMESS)—however, it is to be understood that the wireless power system 300 is not limited to this application and can be implemented in any type of application where power transfer occurs (uni-directionally or bi-directionally), such as for vehicle charging applications.

In one embodiment of the wireless power system 300, three-phase AC grid frequency can be converted to high frequency through three-phase coupler coils (e.g., the transmitter 312 and the receiver 322). The wireless power system 300 may reduce complexity of AC/AC grid energy convergence relative to conventional WPT applications, thereby reducing the system infrastructure cost. As described herein, the switching circuitry 316 of the wireless power supply 310 facilitate operation of a three-phase converter by being driven by phase shifted gate signals between switching legs with 50% duty cycle opposite gate signals during positive and negative cycles of the grid.

In one embodiment, the wireless power system 300 may be operable to enhance system PF and reduce THD relative to conventional systems. The wireless power system 300, in one embodiment, may be configured to achieve enhanced PF and THD reduction with a constant operating frequency in conjunction with a pre-stage filter 318 (e.g., a front-end filter). Operation of the wireless power system 300 and a corresponding state model are shown and described herein, including the operating cycle and descriptions provided in conjunction with the illustrated embodiments of FIGS. 41, 42, and 43A-D.

The three-phase AC/AC converter provided by the wireless power system 300 in the illustrated embodiment of FIG. 2 may include a pre-stage filter 318 (e.g., a front-end stage filter) and power supply circuitry 319 configured to provide an electrical connection to the source 50. In the illustrated embodiment, the power supply circuitry 319 provides a three-phase grid interfaces for connection to the source 50 as a three-phase source.

The wireless power system 300 may include switching circuitry 316 as described herein. The switching circuitry 316 may include a bidirectional three-phase active switch configuration, including switches 351-356 ($S_1$-$S_6$) and capacitors 361, 362, 363. The wireless power system 300 may include a transmitter 312 having one or more coils for wireless power transfer with one or more coils of the receiver 322, which may involve unidirectional or bidirectional transfer of power in a wireless manner. The coils of the transmitter 312 and the receiver 322 may be operable as three-phase coupling coils (or a closely coupled three-phase transformer in the case of a wired charger). The transmitter 312 may be coupled to a transmitter LCC resonant tuning compensation circuit 314, and the receiver 322 may be coupled to a receiver LCC resonant tuning compensation circuit 324. The wireless power receiver 320 may include interface circuitry 335 (e.g., back-end stage filter) and a connection interface 321 for connection to a load 330, which are provided respectively as a three-phase grid interface and an AC load 334 in the illustrated embodiment. The AC load 334, for purposes of discussion, is an ESS capable of receive and transmitting power via the wireless power system 300.

A. AC-to-AC Switching Methodology

In the illustrated embodiment, the grid-side frequency and a high frequency switching signal may be superimposed through the resonant compensation and coupling coils, such that a fundamental frequency of the energy is transferred to the AC load 334 (e.g., one or more ESSs) with a 60 Hz sinusoidal carrier signal. The three-phase converter state and switch transitions are depicted for the wireless power system 300 in the illustrated embodiments of FIGS. 42 and 43A-D, respectively. For purposes of disclosure, the operation and state analysis shown and described in conjunction with FIGS. 42 and 43A-D are provided such that losses are assumed to be negligible due to the pre-stage filter 318, the interface circuitry 335, and power supply circuitry 319 and connection interface 321 (e.g., both sides of three-phase grid interface system). Additionally, for purposes of discussion, the bidirectional active switches (e.g., switching circuitry 316 and receiver switching circuitry 325) and the gate drive system for activating the bidirectional switches are assumed to be ideal and switching losses are substantially ignored. It is further noted that for purposes of discussion and analysis, the receiver switching circuitry 325 (e.g., back stage active switches) are provided in an OFF-state and body diodes of the receiver switching circuitry 325 are conducting.

Mode 1 [t0<t<t1]. The voltage and current waveforms of the active switches and decoupling capacitors are shown during a first interval 1 (or mode 1) in the illustrated embodiment of FIG. 42 with respect to a source 50 having three-phases identified as phase A, phase B, and phase C. While the phase A grid voltage is in positive half-cycle and phase B and phase C are in negative half-cycle, the active switches $S_2$, $S_3$, and $S_6$ are transitioned to an ON-state and body diode of switch $S_6$ is in an ON-state as demonstrated in FIG. 43A. The coupling capacitor $C_1$ is charged and $C_2$, $C_3$ are discharged to the resonant LCC compensation and front-end stage filter and grid interface. The current flows through the second and third phase series inductors $L_{P2}$, $L_{P3}$ and returns from the first phase series inductor $L_{P1}$. The parallel capacitor between second and third phases $C_{Pp2}$ is charged and $C_{Pp1}$ and $C_{Pp3}$ are discharged through the first phase series inductor $L_{P1}$ and series capacitor $C_{Sp1}$. In this way, the series capacitor $C_{Sp1}$ is charged through the coupler transformer. The current flows from phase A winding $L_A$ to the phase B and phase C windings $L_B$, $L_C$ in coupler transformer and series capacitors $C_{Sp2}$, $C_{Sp3}$ are discharged through the parallel capacitors.

Figure 42:
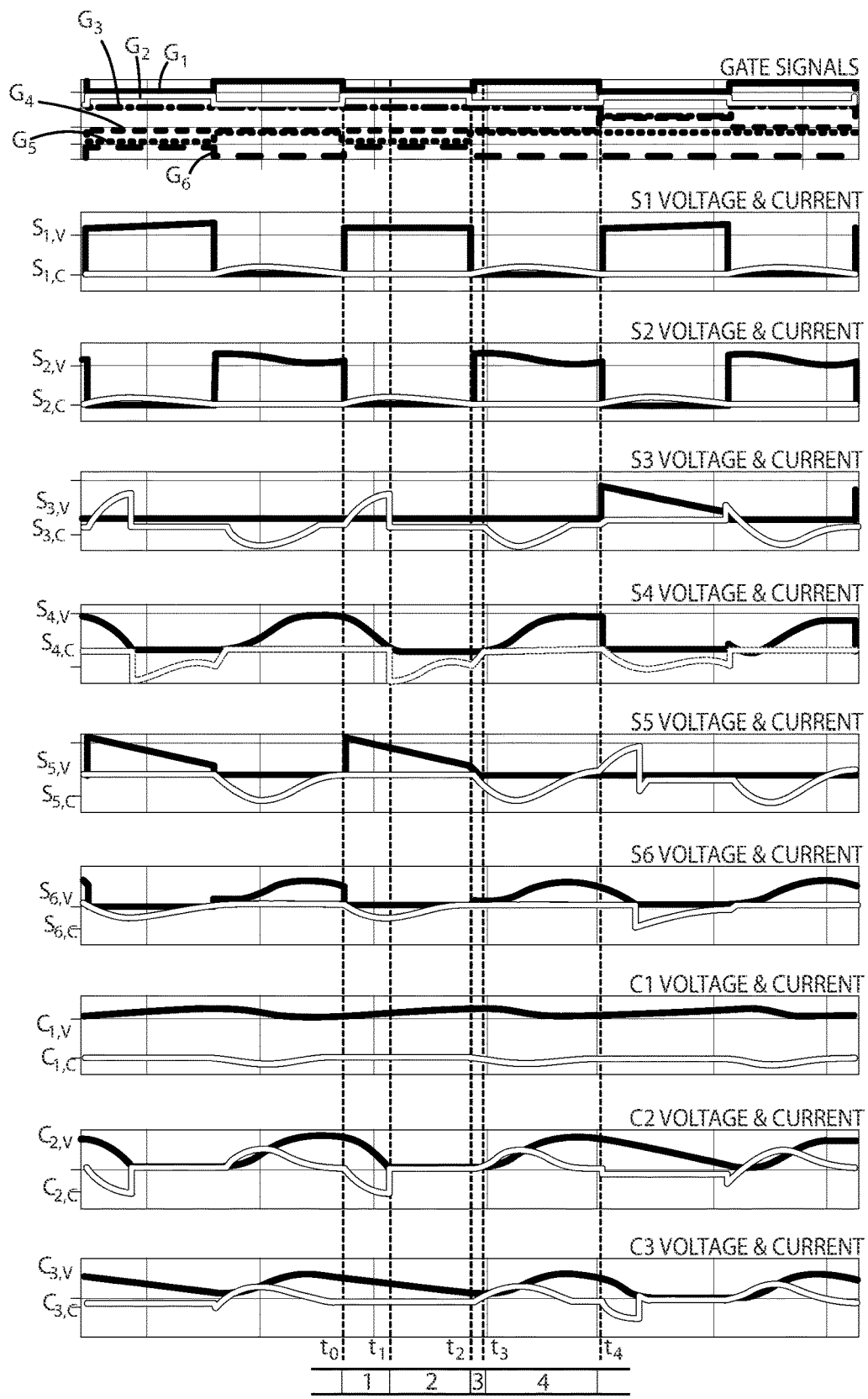
FIG. 42 shows three-phase voltage and current waveforms for operation of the wireless power system of FIG. 42 in accordance with one embodiment.
Figure 43A:
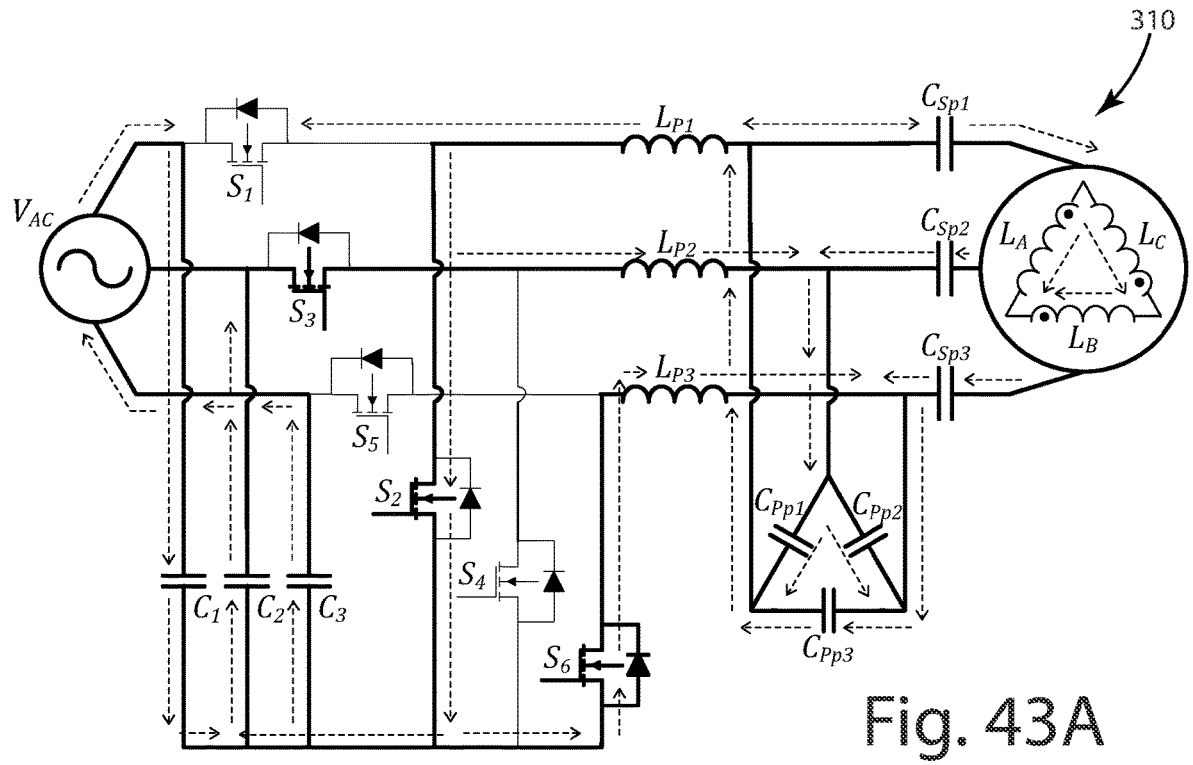
FIGS. 43A-D depict modes of operation of the wireless power system of FIG. 42 in accordance with one embodiment.
Figure 43B:
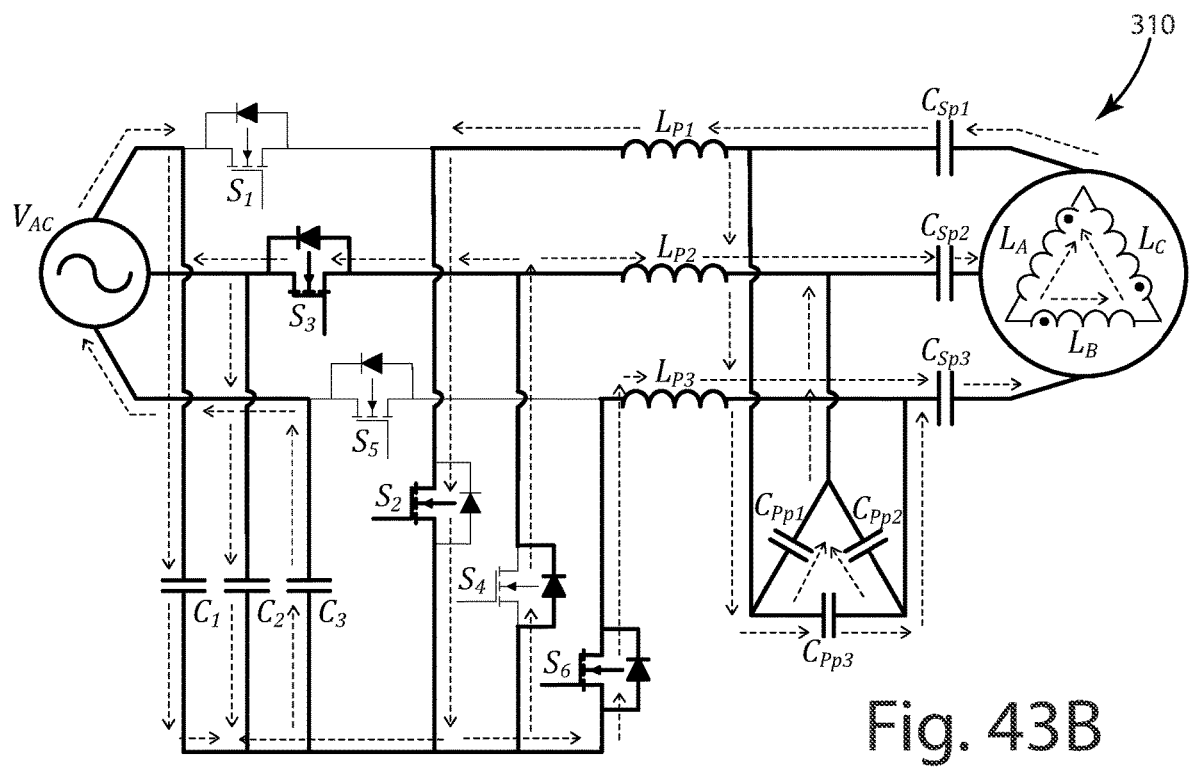
Figure 43C:
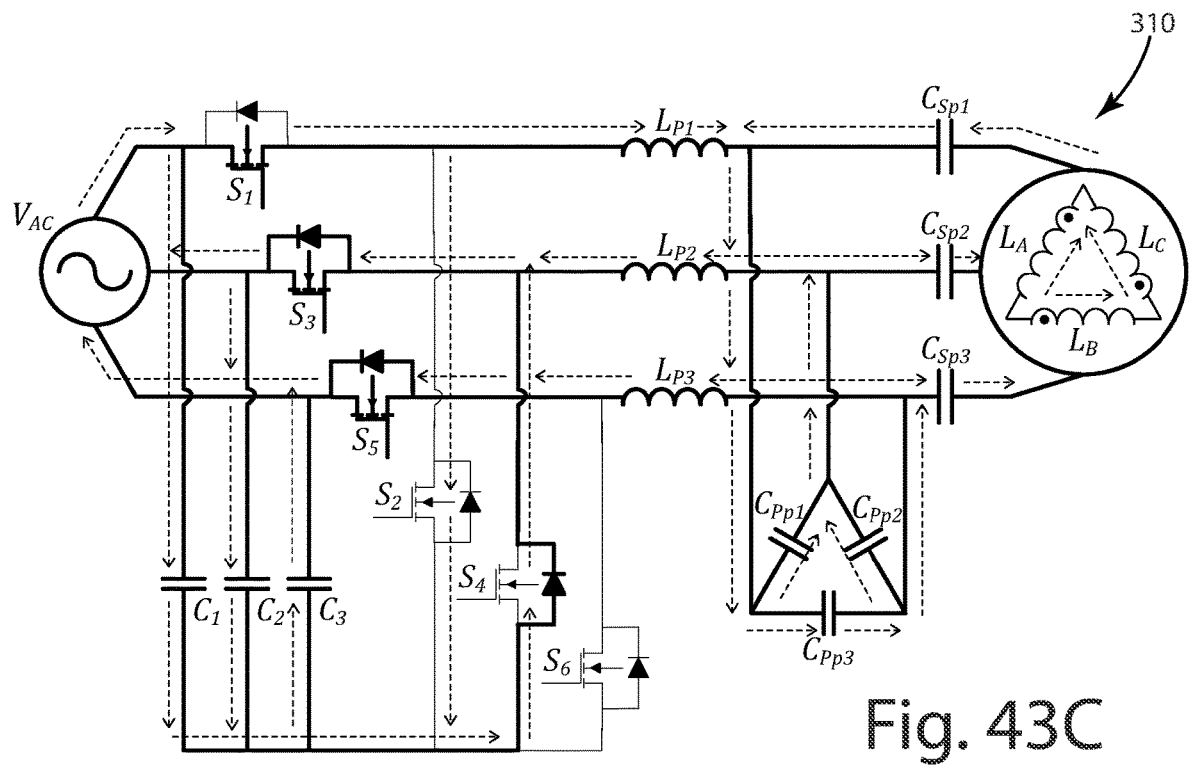
Figure 43D:
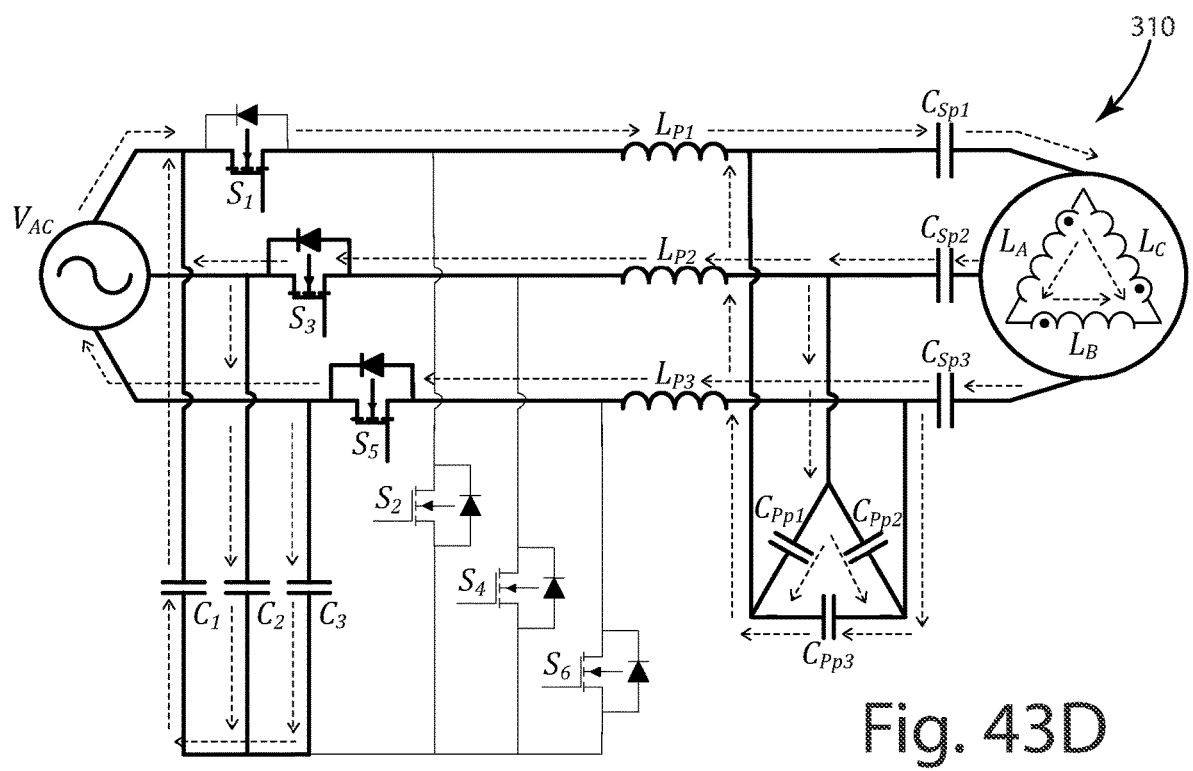

Mode 2 [t1<t<t2]. As stated in the second interval 2 (or mode 2) in FIG. 42, $S_2$, $S_3$, and $S_6$ are transitioned to an ON-state and body diodes of switches $S_3$, $S_4$, $S_6$ are in an ON-state. The coupler capacitors $C_1$ and $C_2$ are charged and $C_3$ is discharged through front-end filter and grid interface and LCC resonant tuning circuit as seen in FIG. 43B. The current flows through resonant tank series inductors $L_{P2}$, $L_{P3}$, and returns from the series inductor $L_{P1}$ and while, the parallel capacitors $C_{Pp1}$ and $C_{Pp3}$ are charged, $C_{Pp2}$ is discharged. The current flows through the series capacitors and charges $C_{Sp2}$ and $C_{Sp3}$ and $C_{Sp1}$ is discharged through the parallel capacitors and series inductor $L_{P1}$. The current goes through the three-phase coupler transformer phase B winding $L_B$ and phase C winding $L_C$ and returns from phase A winding $L_A$ to the series capacitor $C_{Sp1}$.

Mode 3 [t2<t<t3]. The converter active switches $S_1$, $S_3$, and $S_5$ transitioned to an ON-state, and body diodes of $S_3$, $S_4$, and $S_5$ are conducting in interval 3 (or mode 3) as shown in FIG. 42. Similar to the previous mode 2, the coupler capacitors $C_1$ and $C_2$ are charged and $C_3$ is discharged. The resonant tank current flows through the first phase series inductor $L_{P1}$ to the parallel capacitors and returns to series inductors $L_{P2}$ and $L_{P3}$. While the parallel capacitors $C_{Pp1}$ and $C_{Pp3}$ are charged and the parallel capacitor $C_{Pp2}$ is discharged. The series capacitors $C_{Sp2}$ and $C_{Sp3}$ are charged and the first phase series capacitor $C_{Sp1}$ is discharged to the parallel capacitors as demonstrated in FIG. 43C. The coupler coil current flows through the phase B winding $L_B$ and phase C winding $L_C$ and returns from phase A winding $L_A$ to the series capacitor $C_{Sp1}$.

Mode 4 [t3<t<t4]. As described in FIG. 42, the converter active switches $S_1$, $S_3$, and $S_5$ are transitioned to an ON-state and body diodes of $S_3$ and $S_5$ are in an ON-state in interval 4 (or mode 4). The coupling capacitors $C_2$ and $C_3$ are charged and $C_1$ is discharged to the first phase series inductor $L_{P1}$. The resonant tank current returns from the second and third phase series inductors $L_{P2}$, $L_{P3}$ to the coupling capacitors and front-end filter grid interface as presented in FIG. 43D. The parallel capacitor $C_{Pp2}$ is charged and the parallel capacitors $C_{Pp1}$ and $C_{Pp3}$ are discharged through the first phase series capacitor $C_{Sp1}$. In this way, the series capacitor $C_{Sp1}$ is charged to the three-phase coupler transformer and the series capacitors $C_{Sp2}$ and $C_{Sp3}$ are discharged to the parallel capacitors and the series inductors $L_{P2}$ and $L_{P3}$. The coupler coil current flows from phase A winding $L_A$ and returns to phase B winding $L_B$ and phase C winding $L_C$ through the series capacitors $C_{Sp2}$ and $C_{Sp3}$.

Figure 47:
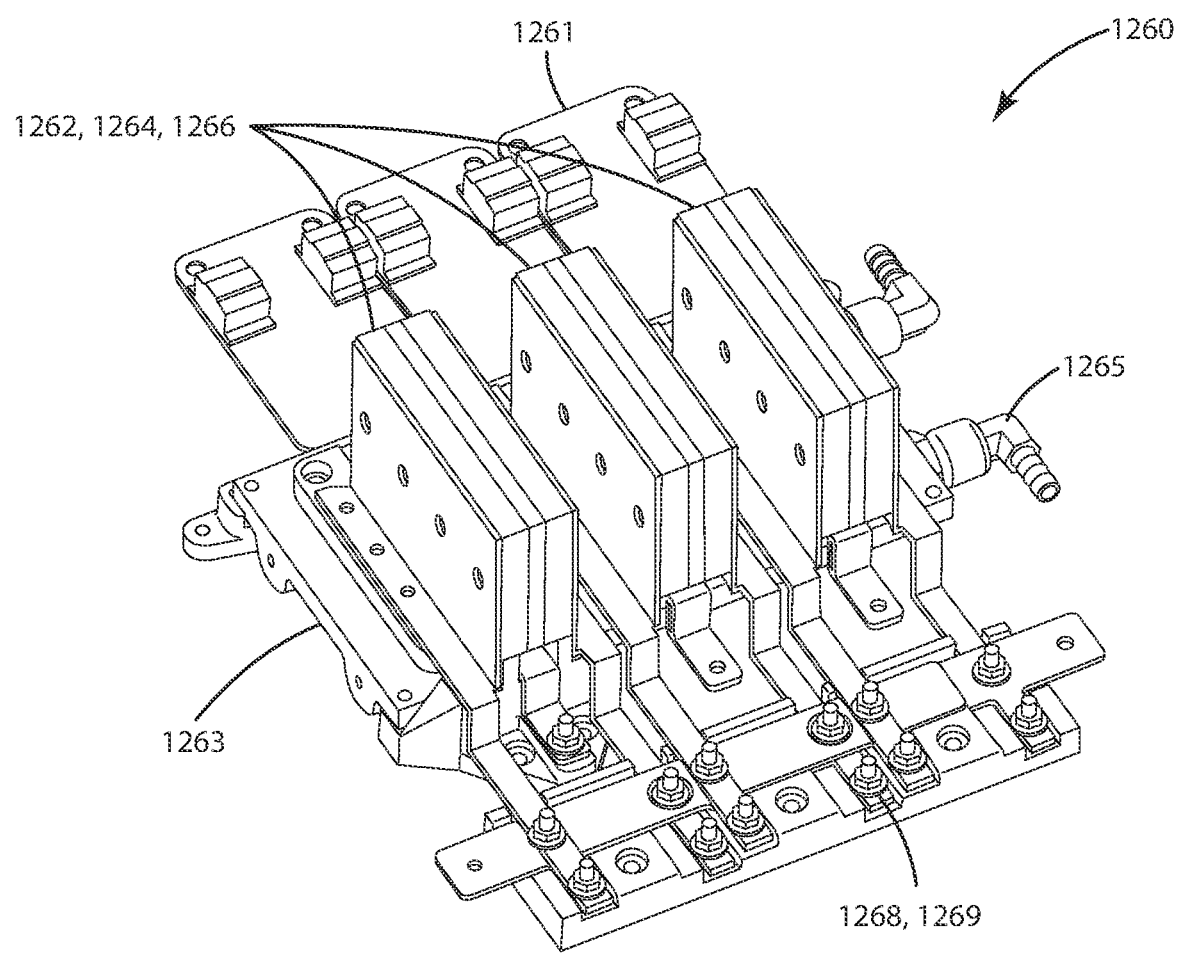
FIG. 47 shows a three phase converter configuration in accordance with one embodiment of the present disclosure.

In the illustrated embodiment of FIG. 47, switching circuitry of a wireless power supply 310 or wireless power receiver 320 is shown without the transmitter 312 or receiver 322 and generally designated 1260.

The switching circuitry 1260 may include switches $S_1$-$S_6$ on the primary side or switches $S_7$-$S_{12}$ on the secondary side, depending on operation of the switching circuitry 1260 as part of the wireless power supply 310 or the wireless power receiver 320. The switching circuitry 1260 may include such switches as part of a power module 1263 (e.g., an SiC power module) along with gate drive circuitry 1261 operable to control the power module 1263 to drive a transmitter 312 or receiver 322 to transmit and/or to receive power. The switching circuitry 1260 in the illustrated embodiment includes a cooling system 1265, and decupling capacitors 1262, 1264, 1266 (e.g., C1-C3 or C4-C6). The switching circuitry 1260 may be similar to the inverter 1160 described herein, but configured to operate in conjunction with an AC-to-AC conversion system instead of a conversion configuration that involves DC.

In one embodiment, the wireless power system 300 may facilitate simplifying construction of a front-end side without requiring any PFC converter, which adds cost in engineering work and in materials. Also, the wireless power system 300 in one embodiment may eliminate phase inductors and DC bulk relative to a conventional PFC stage. Accordingly, a wireless power system 300 in one embodiment may reduce the weight, volume, and cost of a three-phase WPT power assembly.

B. System Analysis

The wireless power system 300, in one embodiment, may be considered and analyzed as a three-phase balanced system, with the input voltages for phase to phase $v_{ab}$, $v_{bc}$, $v_{ca}$ being represented with the maximum values of the phase voltages in a time domain as, $$v_{ab}(t) = \sqrt{3}\, V_{a,max} \sin\left(2\pi f_{60} t + \frac{\pi}{6}\right) \tag{9}$$

$$v_{bc}(t) = \sqrt{3}\, V_{b,max} \sin\left(2\pi f_{60} t - \frac{\pi}{2}\right) \tag{10}$$

$$v_{cb}(t) = \sqrt{3}\, V_{c,max} \sin\left(2\pi f_{60} t + \frac{5\pi}{6}\right) \tag{11}$$

where $f_{60}$ is the fundamental grid voltage frequency. It is noted that the wireless power system 300 can achieve unity power factor, and that the input currents $i_a$, $i_b$, $i_c$ can be described with the maximum values of the input currents in a time domain as, $$i_a(t) = I_{a,max} \sin(2\pi f_{60} t) \tag{12}$$

$$i_b(t) = I_{b,max} \sin\left(2\pi f_{60} t - \frac{2\pi}{3}\right) \tag{13}$$

$$i_c(t) = I_{c,max} \sin\left(2\pi f_{60} t + \frac{2\pi}{3}\right) \tag{14}$$

In one embodiment, in order to provide unity power factor at a minimum load condition, the coupling capacitors may be configured for the maximum output power of the wireless power system 300. Each phase power $p_a$, $p_b$, $p_c$ of the wireless power system 300 can be defined considering the decoupling capacitors charge and discharge of the energy within one switching period as, $$p_a(t) = \frac{1}{2} C_1 \left(V_{a,max} \sin\left(2\pi f_{60} t + \frac{\pi}{6}\right)\right)^2 f_{sw} \tag{15}$$

$$p_b(t) = \frac{1}{2} C_2 \left(V_{b,max} \sin\left(2\pi f_{60} t - \frac{\pi}{2}\right)\right)^2 f_{sw} \tag{16}$$

$$p_c(t) = \frac{1}{2} C_3 \left(V_{c,max} \sin\left(2\pi f_{60} t + \frac{5\pi}{6}\right)\right)^2 f_{sw} \tag{17}$$

where $f_{sw}$ is the operating frequency of the resonant system. Considering the same value of the decoupling capacitors $C_d$ (=$C_1$=$C_2$=$C_3$) and the maximum amplitude of the phase voltages $V_{pmax}$ (=$V_{a,max}$=$V_{b,max}$=$V_{c,max}$), the total input instantaneous power can be given by sum of the phase input powers as, $$p_{in}(t) = p_a(t) + p_b(t) + p_c(t) = \frac{1}{2}C_d \qquad (18)$$
$$V_{pmax}^2 \left[ \sin^2\left(2\pi f_{60}t + \frac{\pi}{6}\right) + \sin^2\left(2\pi f_{60}t - \frac{\pi}{2}\right) + \sin^2\left(2\pi f_{60}t + \frac{5\pi}{6}\right) \right] f_{sw}$$

The total input instantaneous power may be equal to the three-phase balanced system that provides unity input power factor through the wireless coupling coils and resonant compensation to the output. The input power may be obtained by averaging over time as, $$P_{in} = \tfrac{3}{4} C_d V_{pmax}^2 f_{sw} \qquad (19)$$

In one embodiment, because the three-phase output phase voltages are constant at the constant output power and constant input maximum phase voltages $V_{pmax}$, the decoupling capacitor $C_d$ value can be calculated by the average total output power $P_O$ as, $$C_d = \frac{4P_O}{3V_{pmax}^2 f_{sw}\eta} \qquad (20)$$

where $\eta$ is the converter efficiency.

Figure 44:
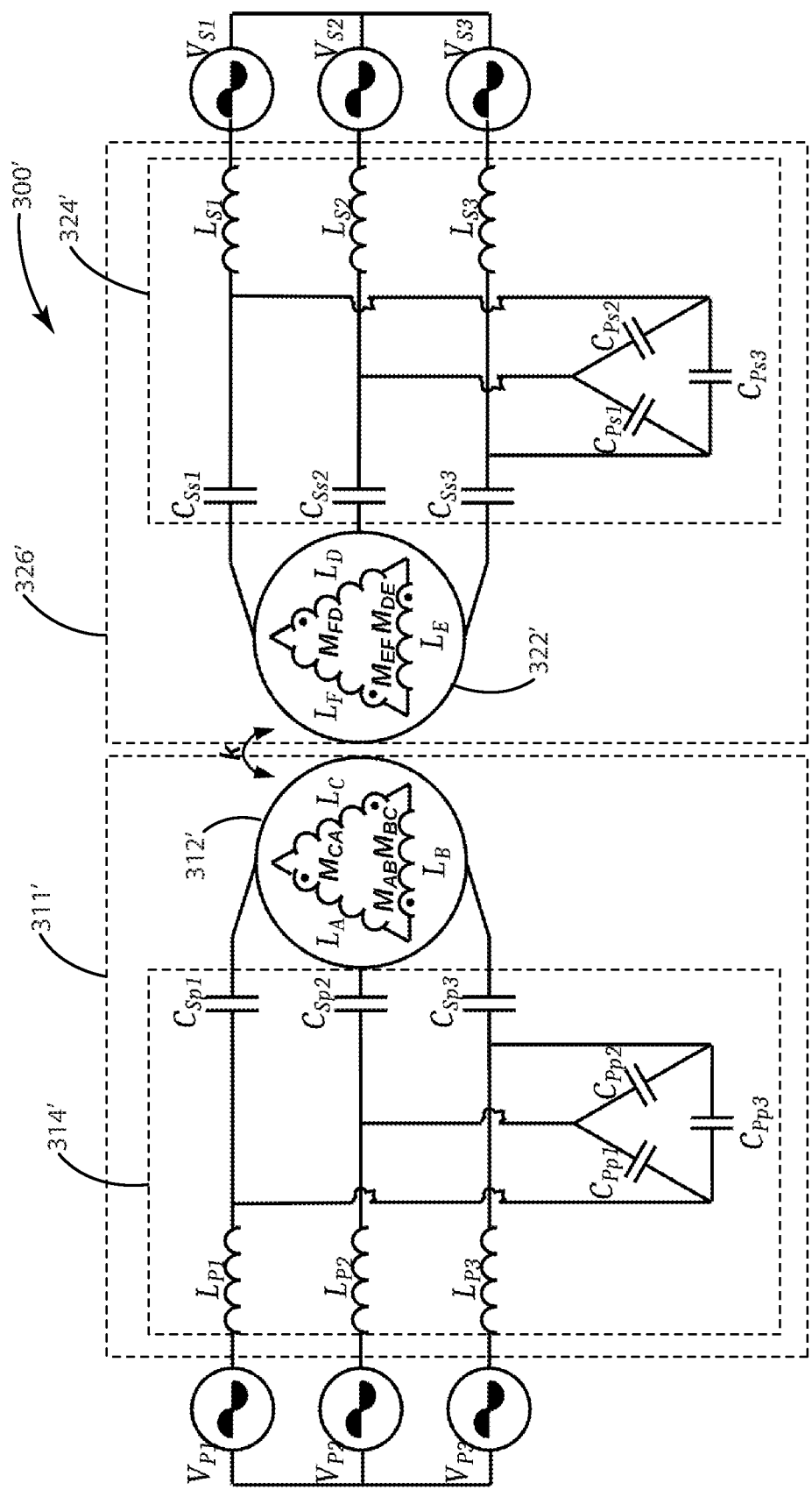
FIG. 44 shows an equivalent circuit of the wireless power system of FIG. 42.

An equivalent circuit of a resonant system provided by the wireless power system 300, in one embodiment, is provided in the illustrated embodiment of FIG. 44 and generally designated 300'. The resonant system 300' includes a transmitter 312' and a receiver 322', similar respectively to the transmitter 312 and receiver 322. The resonant system 300' may also include a wireless power transmitter 311', receiver circuitry 326', compensation circuitry 314', and compensation circuitry 324', similar respectively to the wireless power transmitter 311, receiver circuitry 326, compensation circuit 314, and compensation circuit 324 described in conjunction with the wireless power system 300.

The phase input voltages $v_{P1}$, $v_{P2}$, and $v_{P3}$ can be extracted as, $$v_{P1}(t) = \frac{2}{\pi\sqrt{2}} V_{a,max} \sin(2\pi f_{60}t) \sum_{n=1,3,...}^{\infty} \frac{1}{n} \sin(n2\pi f_{sw}t) \qquad (21)$$

$$v_{P2}(t) = \frac{2}{\pi\sqrt{2}} V_{b,max} \sin\left(2\pi f_{60}t + \frac{2\pi}{3}\right) \sum_{n=1,3,...}^{\infty} \frac{1}{n} \sin(n2\pi f_{sw}t) \qquad (22)$$

$$v_{P3}(t) = \frac{2}{\pi\sqrt{2}} V_{c,max} \sin\left(2\pi f_{60}t - \frac{2\pi}{3}\right) \sum_{n=1,3,...}^{\infty} \frac{1}{n} \sin(n2\pi f_{sw}t) \qquad (23)$$

The average value of the equivalent input voltage $V_P$ (=$V_{P1}$=$V_{P2}$=$V_{P3}$) can be written considering the balance system as, $$V_P = \frac{1}{\pi} V_{pmax} \qquad (24)$$

Since the system in balanced, the resonant tank phase currents $I_P$ (=$I_{P1}$=$I_{P2}$=$I_{P3}$) can be found as, $$I_P = \frac{\pi}{3} \frac{P_O}{\eta V_{pmax}} \qquad (25)$$

The equivalent inductance of mutual coupling three-phase delta/delta transformer $L_P$, $L_S$ can be described in matrix form as, $$L_P = \begin{bmatrix} L_A & M_{AB} & M_{CA} \\ M_{AB} & L_B & M_{BC} \\ M_{CA} & M_{BC} & L_C \end{bmatrix} \qquad (26)$$

$$L_S = \begin{bmatrix} L_D & M_{DE} & M_{FD} \\ M_{DE} & L_E & M_{EF} \\ M_{FD} & M_{EF} & L_F \end{bmatrix}$$

where $M_{AB}$, $M_{BC}$, and $M_{CA}$ are the mutual inductance of the transmitter coil between phases $L_A$ and $L_B$, $L_B$ and $L_C$, and $L_C$ and $L_A$, respectively. And, $M_{DF}$, $M_{BF}$, and $M_{ED}$ are the mutual inductance of the receiver side coil between phases $L_D$ and $L_E$, $L_E$ and $L_F$, and $L_F$ and $L_D$, respectively. The series resonant inductors $L_{Ps}$ (=$L_{Ps1}$=$L_{Ps2}$=$L_{Ps3}$) can be calculated as, $$L_{Ps} = \frac{V_{pmax}}{\pi(2\pi f_{sw})I_P} = \frac{3\eta}{\pi^2(2\pi f_{sw})} \frac{V_{pmax}^2}{P_O} \qquad (27)$$

The delta connected parallel capacitors $C_{Pp}$ (=$C_{Pp1}$=$C_{Pp2}$=$C_{Pp3}$) can be stated as, $$C_{Pp} = \frac{1}{3(2\pi f_{SW})^2 L_{Ps}} \qquad (28)$$

The series connected resonant capacitor values $C_{Ps}$ (=$C_{Ps1}$=$C_{Ps2}$=$C_{Ps3}$) can be extracted as, $$C_{Ps} = \frac{1}{(2\pi f_{sw})^2 (L_P/3 - L_{Ps})} \qquad (29)$$

The resonant system 300' may be symmetrical or operated in a bidirectional manner such that the transmitter side is the same as to the receiver side, with the receiver side operating to transfer power to the transmitter. Thus, described voltage, current, and component calculation functions for the transmitter operating to receive power may be the same as in the receiver.

Figure 45A:
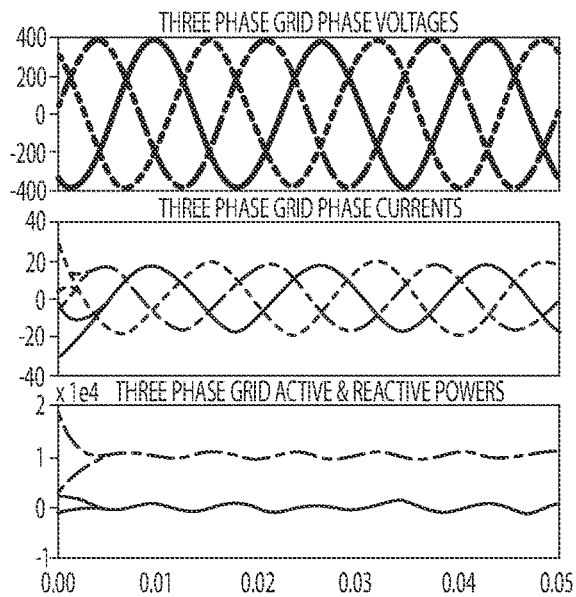
FIG. 45A shows primary side (grid side) three-phase voltage, current, and active power/reactive power for operation of the wireless power system of FIG. 42 in accordance with one embodiment.
Figure 45B:
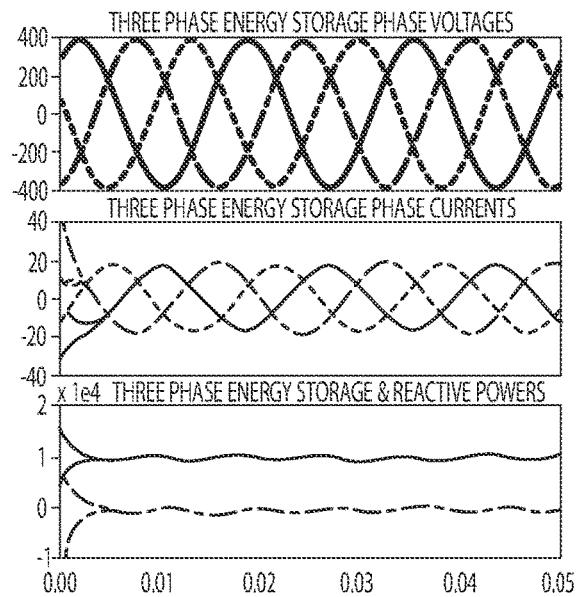
FIG. 45B shows secondary side (energy storage side) three-phase voltage, current, and active power/reactive power for operation of the wireless power system of FIG. 42 in accordance with one embodiment.

Simulation results of a wireless power system 300 in accordance with one embodiment have been obtained for a three-phase system at 10 kW, 277 $V_{AC,RMS}$ AC input, and 277 $V_{AC,RMS}$ AC output voltage and are shown in FIG. 45A-B. The three-phase coupler transformer provided by the transmitter 312 and receiver 322 may be configured for a coupling factor of 0.15 in the simulation. As seen from the results in FIGS. 45A-B, the input and output current THD is below 3% and PF is around 0.99 for both input and output terminals. The three-phase input voltage and current amplitudes are directly transferred to the receiver side of the system in bi-directional operation by converter merit over the grid frequency.

Figure 46A:
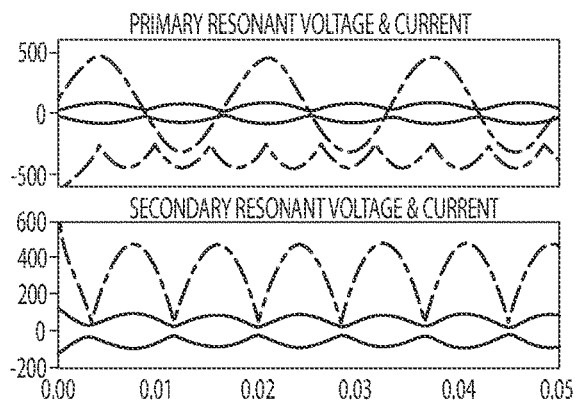
FIG. 46A shows primary and secondary side resonant tank voltage/current waveforms for operation of the wireless power system of FIG. 42 in accordance with one embodiment.
Figure 46B:
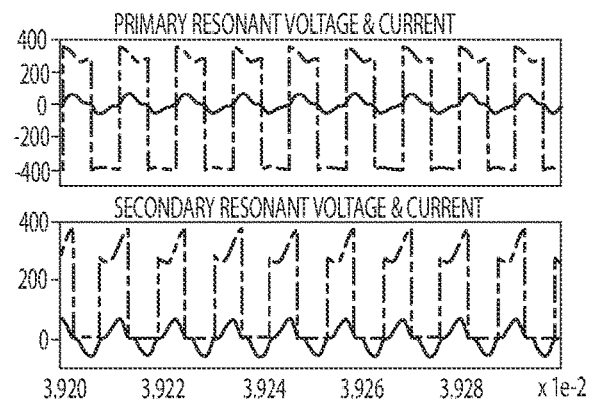
FIG. 46B shows an enlarged view of the primary and secondary side waveforms of FIG. 46A.

The phase A resonant tank voltage and current waveforms are depicted for both input and output resonant tank terminals of the wireless power system 300 in FIGS. 46A-B. As seen in the illustrated embodiment, the high frequency is merged through the grid frequency envelope through the resonant compensation and coupler transformer and transferred to the receiver 322. The envelope grid frequency phase is shifted to the receiver side around 70° as calculated from the simulation. FIG. 46B shows the zoom function of the resonant tank voltage and currents on the primary and secondary side. The wireless power system 300 is on the resonant frequency with third harmonic injected current waveforms from the primary side. And, the receiver side active switching are off and behaves as a rectifier through freewheeling diodes of switches as can be seen in the illustrated embodiment of FIGS. 46A-B.

III. AC-to-DC Conversion or DC-to-AC Conversion

With an increased interest in EVs, which include both all-electric and plug-in hybrid electric vehicles, and their higher penetration anticipated in near future, there is an increased reliance on mobile ESSs. These mobile ESSs can not only deliver emergency backup power but also be employed as spinning/non-spinning reserves or regulation providers as source and load and provide ancillary grid services. The aforementioned features may be provided in conjunction with EVs to further enhance marketability through the profits that a customer can make by providing grid services. In this way, a customer may provide power to the grid.

Bidirectional power transfer for the back and forth energy transfer between sources in a conventional wired charger system can lead to decreased reliability. During power outages, infrastructure can be relied on to power the affected sites. As discussed herein, conventional wired systems can be more bulky to deploy as the power requirements increase, and such conventional wired systems can be reliant on use of a specific connector or plug system that may not be available at the time of deployment. A WPT system in accordance with one embodiment of the present disclosure may provide flexibility and the inherent galvanic isolation, which are beneficial for use in harsh environments and inclement weather conditions for emergency power systems.

A. Single Phase Conversion with DC, Optionally Bidirectional

Figure 48A:
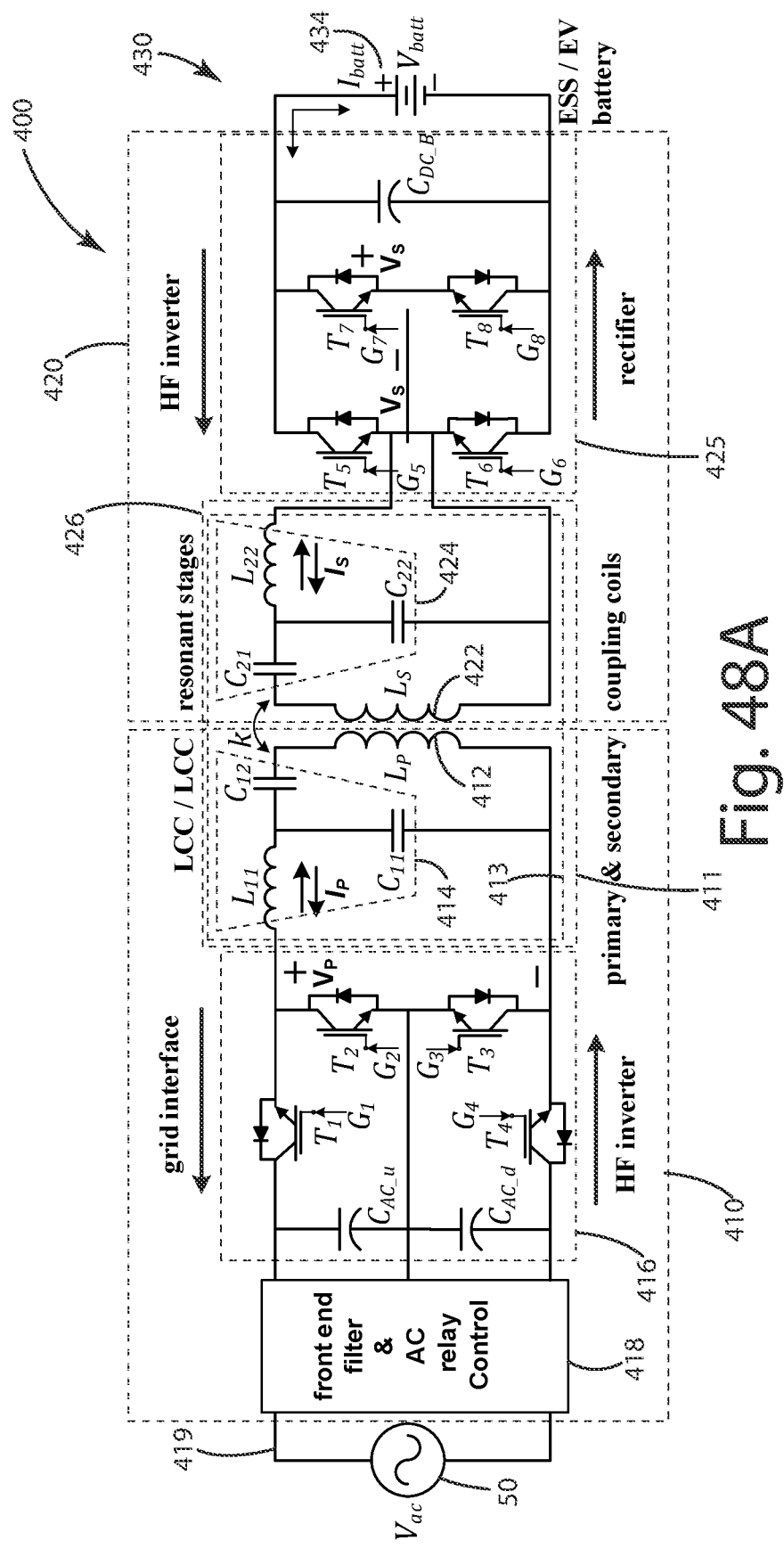
FIG. 48A depicts a single phase bi-directional AC-to-DC and DC-to-AC converter incorporated into a wireless power system in accordance with one embodiment of the present disclosure.

A wireless power system with AC-to-DC converter or DC-to-AC converter capabilities in accordance with one embodiment is shown in FIG. 48A and generally designated 400. The wireless power system 400, for purposes of disclosure, is described in conjunction with bidirectional capabilities; however, it is to be understood that the wireless power system 400 may be configured to unidirectional power transfer in a wireless manner.

The wireless power system 400 in one embodiment may include multiple interfaces for grid support applications between ESSs and/or EV batteries. In this configuration, a 60 Hz AC grid frequency can be converted to DC, and a DC constant source can be transferred to the AC grid source through WPT coils. In one embodiment, half bridge lower and upper legs are driven with opposite gate signals during positive and negative half line cycles of the grid with 50% duty cycle PWM during the power transfer from AC grid to DC. A variable duty cycle sinusoidal 60 Hz envelope current control may be used to convert DC energy to AC grid source in an opposite direction from a receiver to a transmitter coupled to the AC grid. The wireless power supply 400 may reduce system cost relative to conventional configurations and substantially ensures less complexity for bidirectional AC/DC converter technologies, particularly with respect to WPT systems and ESSs/EVs.

For instance, the switching circuitry 416 of the wireless power system 400 may be operated to facilitate converting DC energy to AC energy by modulating with a sinusoidal PWM (S-PWM). The S-PWM may be a switching trajectory to produce an AC signal through the active switches of the switching circuitry 416. This functionality may be provided for DC-AC applications, such as grid inverter or motor drivers. The S-PWM switching methodology may be provided for a WPT application, as single and three phases in conjunction with any converter described herein.

Also, we can expand this S-PWM approach with other approaches. The PWM switching methodology can be used to produce an AC signal in a variety of ways, and is not limited to sinusoidal PWM.

In the illustrated embodiment of FIG. 48A, the wireless power system 400 is configured to allow transferring power from grid to a load 430, such as an ESSs or EV battery. The wireless power system 400 may be bidirectional such that power stored by the load 430 (e.g., an ESS or EV battery) may be discharged wirelessly to the AC grid, which is the source 50 of the wireless power system 400 in the illustrated embodiment. This functionality may be useful for time of use energy cost management applications. For instance, a stationary ESS can be charged from the grid when consumption is relatively low and electricity prices are low; then, a vehicle can be charged in the evening using the energy previously stored in the stationary ESS in order to offset the demand of the vehicle charging. The stationary ESS can also be used during emergencies as a backup power source. As another example, in case a vehicle needs to be charged during grid outages, the energy stored in the ESS can be used.

In the illustrated embodiment of FIG. 48A, the wireless power system 400 is shown in conjunction with a load 430 in the form of a battery 434. The wireless power system 400 may be considered an AC-to-DC converter. The wireless power system 400 in the illustrated embodiment does not include PFC circuitry; however, it is noted that PFC circuitry may be present in one or more embodiments.

The wireless power system 400 in the illustrated embodiment includes a wireless power supply 410 that has a pre-stage filter 418 and power supply circuitry 419, similar respectively to the pre-stage filter 118 and power supply circuitry 119. The power supply circuitry 319 may provide a connection between the source 50 and the wireless power supply 410. The source 50, in the illustrated embodiment is an AC source, which may be single-phase or three-phase as discussed herein.

The wireless power supply 410 may include switching circuitry 416 operable to selectively provide power to a wireless power transmitter 411 for transferring power inductively to a wireless power receiver 420. The wireless power receiver 420 may be coupled to a load 430, which in the illustrated embodiment is provided as a battery 434. The load 430 (e.g., the battery 434), as described herein in conjunction with one embodiment, may be operable to source power back to the wireless power receiver 420 for power transfer from the wireless power receiver 420 to the wireless power supply 410. The wireless power receiver 420 may include receiver switching circuitry 425 operable to selectively provide power to receiver circuitry 426 including the receiver 422 such that the receiver 422 is operable as a transmitter to provide power wirelessly to the transmitter 412. The receiver switching circuitry 425, operating to transmit power via the receiver 422 to the transmitter 412, may be switched in a manner similar to that described in connection with the switching circuitry 416 of the wireless power supply 410.

The switching circuitry 425, in the illustrated embodiment, may be configured to active or passive rectification of AC power output from the receiver circuitry 411 to output DC power for consumption by the load 430. In one embodiment, with the wireless power receiver 420 configured to only receive power, the switching circuitry 425 may be configured for such passive rectification or active rectification.

The wireless power supply 410 may include a transmitter 412 operable to couple with a receiver 422 of the wireless power receiver 420 for wirelessly transferring power, such as by magnetic coupling or inductive coupling. As described herein, the construction of the transmitter 412 and the receiver 422 may vary depending on the application.

In the illustrated embodiment, the transmitter 412 and the receiver 422 are configured similar respectively to one or more embodiments of the transmitter 112 and receiver 122 described herein in conjunction with the wireless power system 100. However, the transmitter 412 and the receiver 422 are not so limited; for instance, the transmitter 412 and receiver 422, as well as the transmitter 112 and the receiver 122, may be configured according to the transmitter 1112 and receiver 1122 of the wireless power system 1100, 1100' for three-phase coupling. In other words, the wireless power system 400 may be configured to receive power from a three-phase source and to transfer such power to a receiver 422 configured to three-phase coupling with the transmitter 412, where three-phase AC power received by the receiver 422 may be converted to DC power by the receiver switching circuitry 425. The receiver 422, in one embodiment, may be configured to transmit three-phase AC power via the three-phase coupling based on DC power received by the load 430.

As described herein, the transmitter 412 and the receiver 422 may be configured for single-phase coupling (or three-phase or multi-phase) to transfer power wirelessly therebetween. The transfer of power may be one-way from the transmitter 412 to the receiver 422, or two-way (e.g., bidirectional) from the transmitter 412 to the receiver 422 and from the receiver 422 to the transmitter 412.

The wireless power system 400 in the illustrated embodiment includes compensation circuitry 414 coupled to the transmitter 412 and compensation circuitry 424 coupled to the receiver 422. The compensation circuitry 414, 424 may be LCC compensation circuitry with passive inductor and capacitor components. In the illustrated embodiment, the wireless power transmitter 411 and receiver circuitry 426, including the compensation circuitry 414, 424, the transmitter 412, and the receiver 422, may be identified as a resonant stage 413 with coupling capabilities for transfer of power wirelessly (e.g., without physical connection between the transmitter 412 and receiver 422). The resonant stage 413 of the wireless power supply 400 may be an LCC/LCC resonant stage. As discussed herein, the wireless power system 400 may be an AC-to-DC converter without power factor correction (PFC), with a resonant network with WPT couplers and resonant tuning circuitry (e.g., the LCC/LCC resonant stage), and a receiver active rectifier for charging the battery 434. The grid interface to the source 50 may be supplied power by the wireless power receiver 420 via the wireless power supply 410, such that the receiver active rectifier (e.g., the receiver switching circuitry 425) becomes an inverter discharging a storage element of the load 430 (e.g., one or more ESSs or a battery 434 of an EV) back to the grid. In this way, a stationary ESS and/or an EV battery can either source or sink the power from the grid in both power flow directions.

Figure 48B:
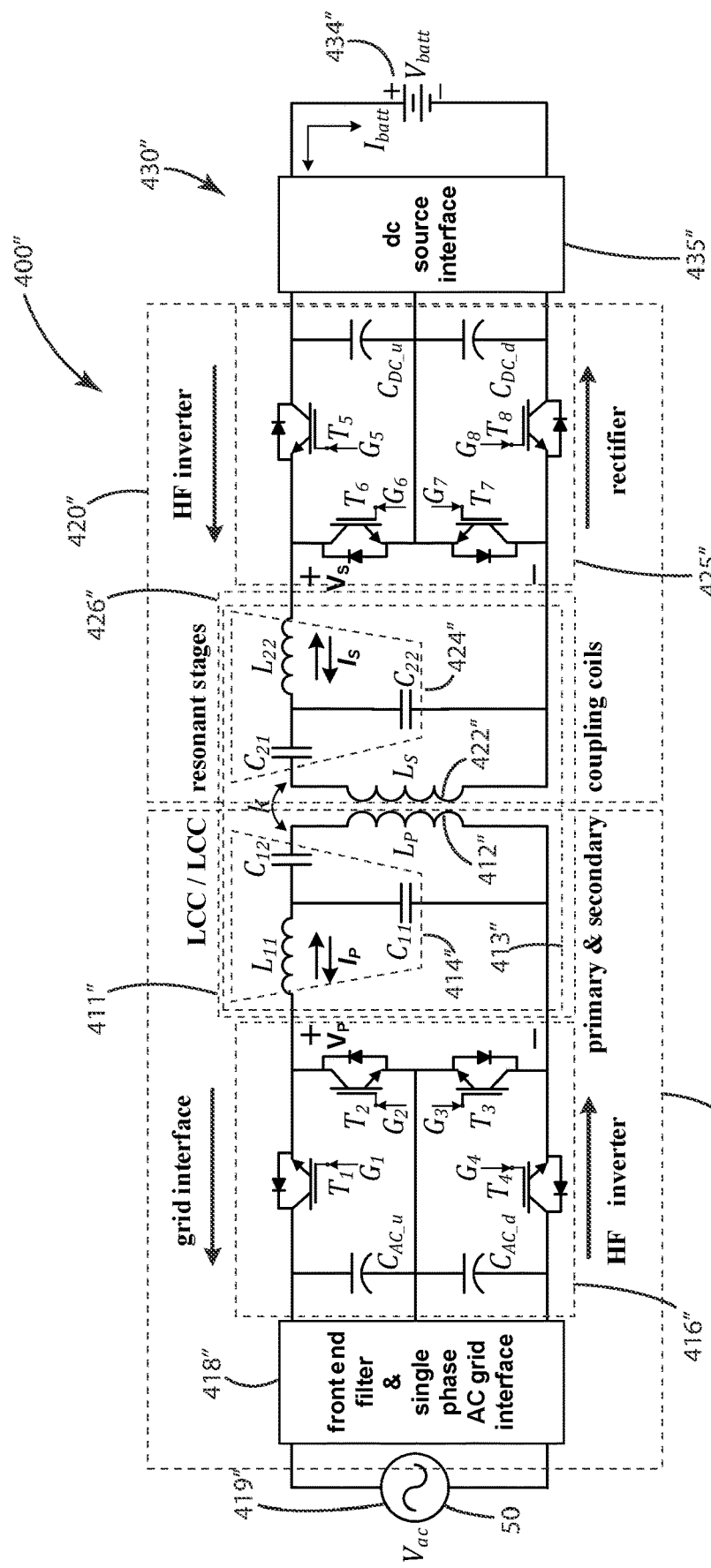
FIG. 48B depicts a single phase bi-directional AC-to-DC and DC-to-AC converter incorporated into a wireless power system in accordance with one embodiment of the present disclosure.

An alternative embodiment of a wireless power system is provided in FIG. 48B and generally designated 400". The wireless power system 400" is similar to the wireless power system 400. in several respects. For instance, the wireless power system 400" includes switching circuitry 416" operable to selectively provide power to a wireless power transmitter 411" of a wireless power supply 410" for transferring power inductively to a wireless power receiver 420", where the wireless power supply 410", the switching circuitry 416", the wireless power transmitter 411", and the wireless power receiver 420" are similar respectively to the wireless power supply 410", the switching circuitry 416", the wireless power transmitter 411", and the wireless power receiver 420". The wireless power system 400" may include a transmitter 412" and receiver 422" similar respectively to the transmitter 412 and receiver 422, and may include a resonant stage 413" similar to the resonant stage 413.

The interface circuitry 418" of the wireless power supply 410" may provide filtering and an interface, via the power supply circuitry 419", to the source 50 for receipt of AC power from the source 50.

In the illustrated embodiment, the load 430" of the wireless power receiver 420" includes interface circuitry 435" operable to receive and transfer power to the battery 434". The interface circuitry 435" may include filter circuitry, such as capacitance.

Similar to the receiver switching circuitry 425, the wireless power receiver 420" may include receiver switching circuitry 425" operable to selectively provide power to receiver circuitry 426" including the receiver 422" such that the receiver 422" is operable as a transmitter to provide power wirelessly to the transmitter 412". The receiver switching circuitry 425", operating to transmit power via the receiver 422" to the transmitter 412", may be switched in a manner similar to that described in connection with the switching circuitry 416 of the wireless power supply 410.

The wireless power supply 400" may compensation circuitry 414" and compensation circuit 424" coupled respectively to the transmitter 412" and the receiver 422".

Figure 49A:
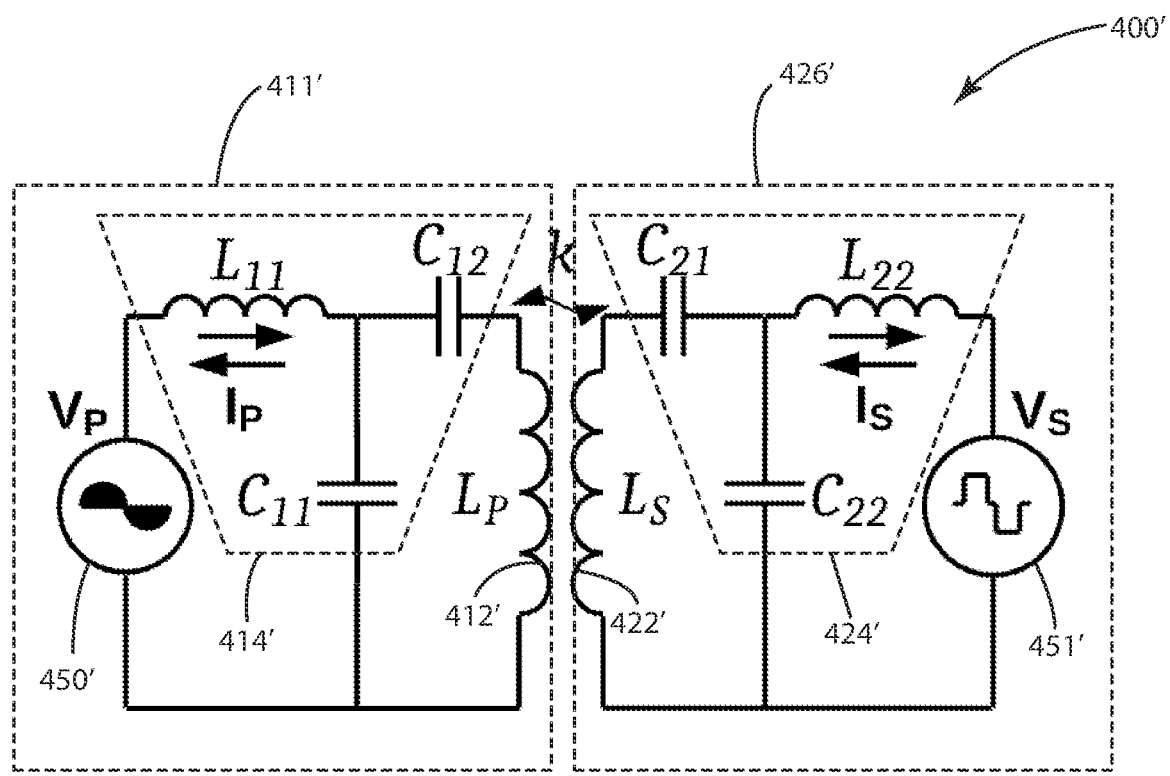
FIGS. 49A-B show equivalent circuits of the wireless power system of FIG. 48A.
Figure 49B:
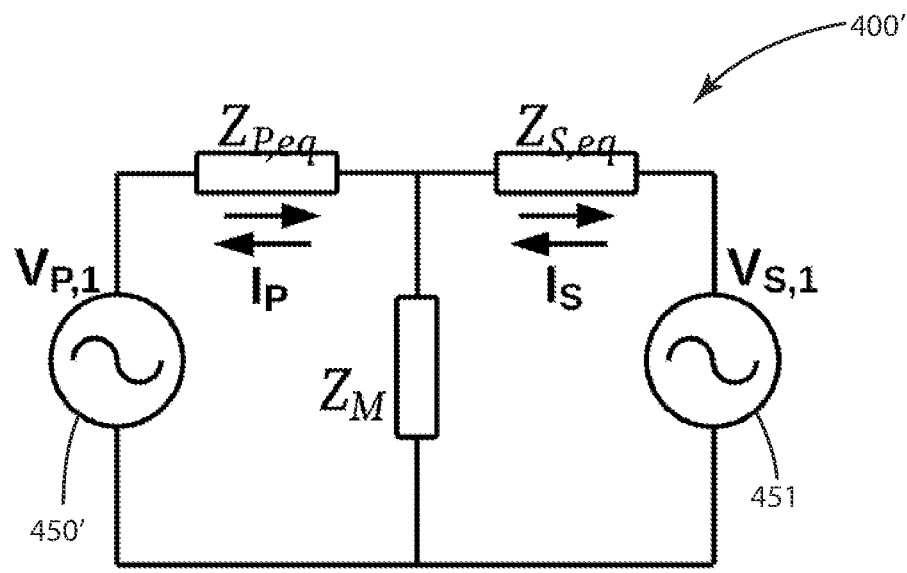
Figure 50A:
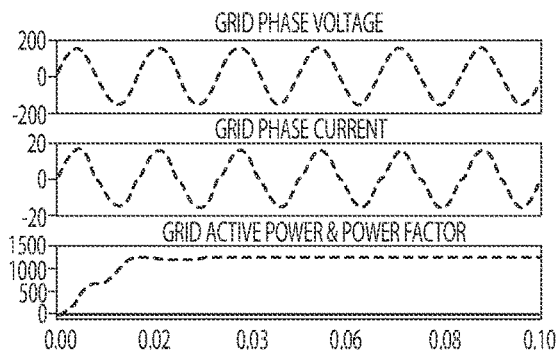
FIG. 50A shows primary side voltage, current, and active power/PF for operation the wireless power system of FIG. 48A to transfer power from the primary side to the secondary side in accordance with one embodiment.
Figure 50B:
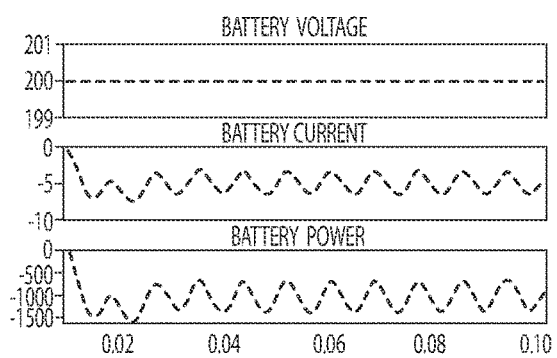
FIG. 50B shows secondary side voltage, current, and power for operation the wireless power system of FIG. 48A to transfer power from the primary side to the secondary side in accordance with one embodiment.
Figure 50C:
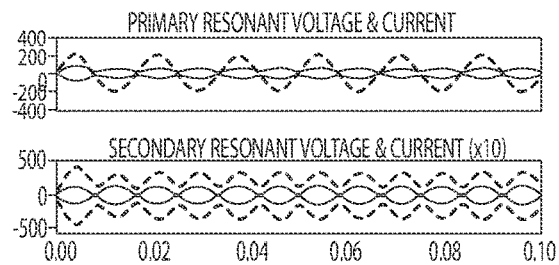
FIG. 50C shows primary and secondary resonant tank voltage and current for operation of the wireless power system of FIG. 48A to transfer power from the primary side to the secondary side in accordance with one embodiment.
Figure 50D:
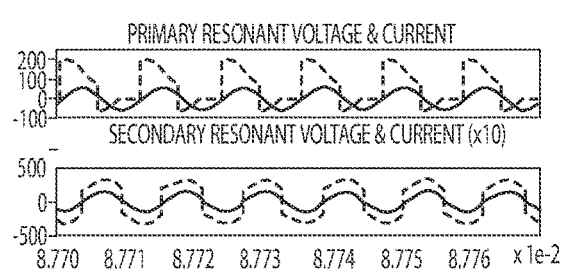
FIG. 50D shows an enlarged view of the waveforms depicted in FIG. 50C.
Figure 51A:
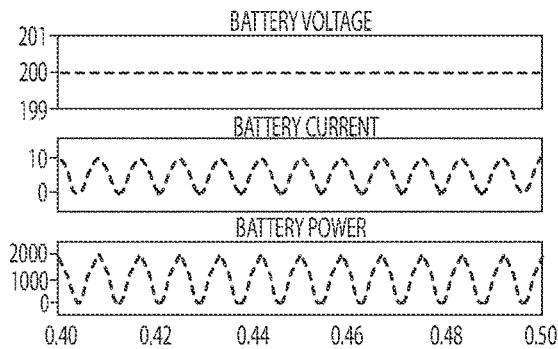
FIG. 51A shows secondary side voltage, current, and power for operation of the wireless power system of FIG. 48A to transfer power from the secondary side to the primary side in accordance with one embodiment.
Figure 51B:
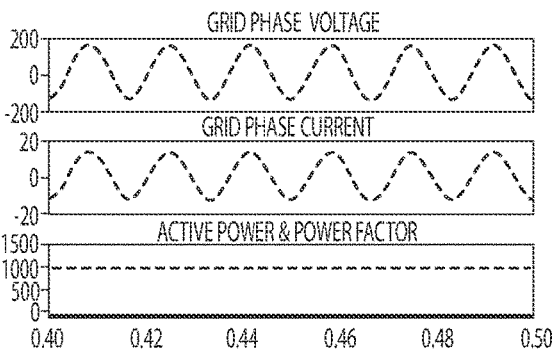
FIG. 51B shows primary side voltage, current, and active power/PF for operation of the wireless power system of FIG. 48A to transfer power from the secondary side to the primary side in accordance with one embodiment.
Figure 51C:
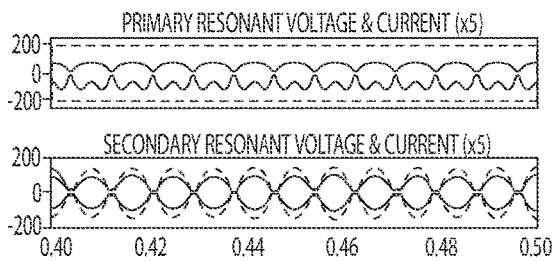
FIG. 51C shows primary and secondary resonant tank voltage and current for operation of the wireless power system of FIG. 48A to transfer power from the secondary side to the primary side in accordance with one embodiment.
Figure 51D:
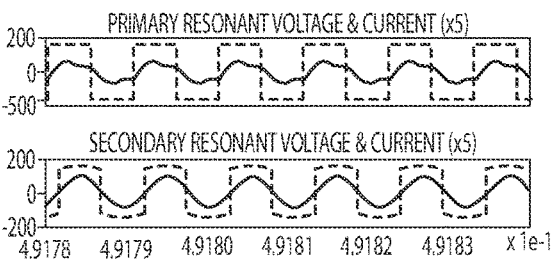
FIG. 51D shows an enlarged view of the waveforms depicted in FIG. 51C.

An equivalent circuit of a resonant system provided by the wireless power system 400, in one embodiment, is provided in the illustrated embodiment of FIGS. 49A-B and generally designated 400'. The resonant system 400' includes a transmitter 412' and a receiver 422', similar respectively to the transmitter 412 and receiver 422. The resonant system 400' may also include a wireless power transmitter 411', receiver circuitry 426', compensation circuitry 414', and compensation circuitry 424', similar respectively to the wireless power transmitter 411, receiver circuitry 426, compensation circuit 414, and compensation circuit 424 described in conjunction with the wireless power system 400. The resonant system 400' includes primary side source 450 and a secondary side load 451.

The WPT coils (e.g., the transmitter 412' and receiver 422') with primary and secondary inductances $L_P$, $L_S$, and coupling coefficient of k can be modeled as a coupled inductor with magnetizing inductance as $$L_M = k\sqrt{L_P L_S} \tag{30}$$

and leakage inductances of the primary coil $L_{l_p}$ and secondary coil $L_{l_s}$ can be defined as $$L_{l_p} = L_P - L_M \tag{31}$$

$$L_{l_s} = L_S - L_M \tag{32}$$

Primary $Z_{P,eq}$ and secondary $Z_{S,eq}$, and mutual $Z_{M,eq}$ equivalent impedances can be defined as $$Z_{P,eq} = j\omega L_{11} + \left[\frac{1}{j\omega C_{11}} / / \left(\frac{1}{j\omega C_{12}} + j\omega L_{l,p} + j\omega L_M\right)\right] \quad (33)$$

$$Z_{M,eq} = j\omega L_M \quad (34)$$

$$Z_{S,eq} = j\omega L_M + \frac{1}{n^2}\left[j\omega L_{l,s} + \frac{1}{j\omega C_{21}} + \left(\frac{1}{j\omega C_{22}} / / j\omega L_{22}\right)\right] \quad (35)$$

where n is the turns ratio between primary and secondary coils which is defined by $n=\sqrt{L_S/L_P}$. In these equations, $\omega=\{2\pi f_{sw}\}$ represents switching frequency of $f_{sw}$. The primary-side sinusoidal voltage $V_P$ is positive or negative, depending on the sign of the fundamental grid voltage with the frequency of $f_{60}$ and can be defined as $$V_P(t) = \begin{cases} v_{P,max}\sin(2\pi f_{60}t), & 0 < \omega \leq \pi \\ -v_{P,max}\sin(2\pi f_{60}t), & \pi < \omega \leq 2\pi \end{cases} \quad (36)$$

The secondary full bridge resonant rectifier/inverter can be described using FHA analysis by $$V_S(t) = \begin{cases} V_{battery}, & 0 < \omega t \leq \pi - \varphi \\ -V_{battery}, & \pi - \varphi < \omega t \leq 2\pi - \phi \end{cases} \quad (37)$$

where φ defines the phase shift function between the full bridge resonant inverter legs. The load resistance at the output of the secondary side tuning network can be described as $$R_{L,batt} = \frac{8}{\pi^2} \frac{V_{batt}^2}{P_{batt}} \quad (38)$$

and equivalent ac resistance at the input of the resonant tank can be defined as $$R_{L,ac} = \frac{8}{\pi^2} \frac{V_{ac,rms}^2}{P_{ac}} \quad (39)$$

Using the Kirchhoff's law, primary and secondary resonant network in a matrix form can be expressed by $$\begin{bmatrix} V_{ac,rms} \\ V_{batt} \end{bmatrix} = \begin{bmatrix} Z_{P,eq} & -Z_{M,eq} \\ -Z_{M,eq} & Z_{S,eq} \end{bmatrix} \begin{bmatrix} I_{ac,rms} \\ I_{batt} \end{bmatrix} \quad (40)$$

If the system components satisfy resonant frequency compensation requirements $\omega_o$, as $$\omega_o = 1/\sqrt{L_{11}C_{11}} = 1/\sqrt{L_{22}C_{22}} = 1/\sqrt{L_P - L_{11})C_{12}} = 1/\sqrt{(L_S - L_{22})C_{21}} \quad (41)$$

The corresponding voltage transfer functions of the bidirectional system in charging and discharging mode can be expressed by $$|M_{V,charge}| = \left|\frac{V_{batt}}{V_{ac,rms}}\right| = \quad (42)$$

$$\left|\frac{\omega^2 L_M C_{11}}{(1-(\omega/\omega_o)^2 + j\omega C_{22}R_{L,batt})(1/C_{21} + j\omega L_S) + j\omega L_{22} + R_{L,ac}}\right|$$

$$|M_{V,discharge}| = \left|\frac{V_{ac,rms}}{V_{batt}}\right| = \quad (43)$$

$$\left|\frac{\omega^2 L_M C_{22}}{(1-(\omega/\omega_o)^2 + j\omega C_{11}R_{L,ac})(1/C_{12} + j\omega L_P) + j\omega L_{11} + R_{L,batt}}\right|$$

Simulation results of a wireless power system 400 in accordance with one embodiment have been obtained and are shown in the illustrated embodiment of FIGS. 50A-D and 51A-D.

In one embodiment, during a charging mode, the AC grid system supplies directly to the battery 434 through the wireless power system 400, including a high frequency hybrid converter and resonant compensation with coupling wireless transformer. In a reversed power flow operation, the wireless power receiver 420 is operated in inverter mode using power from the battery 434, powering the secondary-side coil with 60 Hz current source. The induced voltage in primary side coil integrates to the grid through front stage filter and relays (e.g., the pre-filter 418 and the switching circuitry 416). The results of the wireless power system 400 for both operating modes are presented in FIGS. 50A-D and 51A-D, respectively.

It is noted that, in one embodiment, sinusoidal battery charging and discharging can be achieved, and sinusoidal current amplitude can be manageable by DC link capacitor value by virtue of merit topology. Sinusoidal current charging and discharging may be controlled.

Figure 52A:
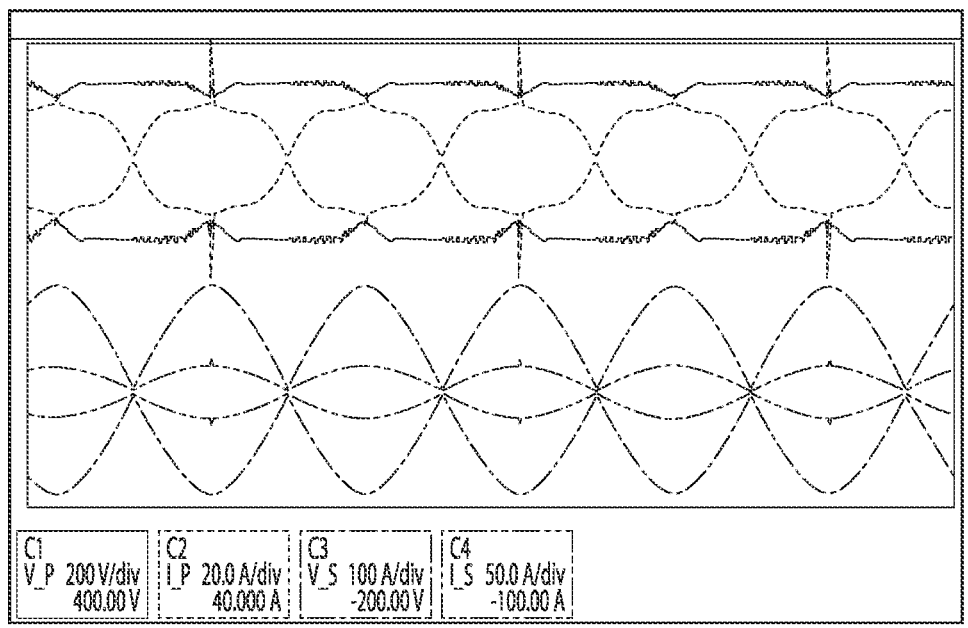
FIG. 52A shows primary and secondary resonant tank voltage and current waveforms for operation of the wireless power system of FIG. 48A in accordance with one embodiment.
Figure 52B:
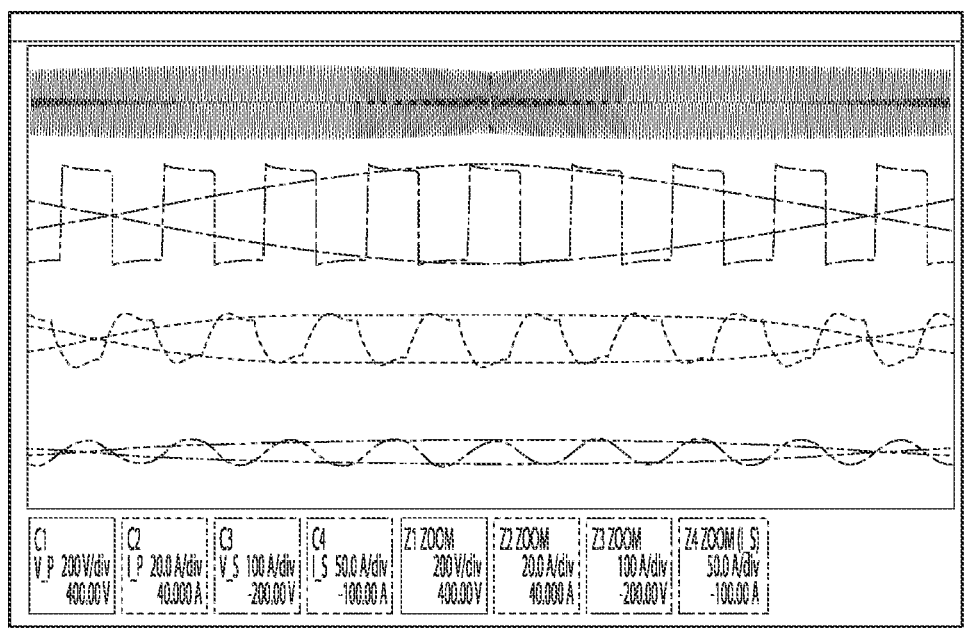
FIG. 52B shows an enlarged view of the waveforms of FIG. 52A.

Test results for a wireless power system 400 (e.g., a bidirectional WPT system) for using in one embodiment in junction with grid integration and a battery are provided in FIGS. 52A-B. The primary and secondary sides as well as the primary and secondary coils in the test were provided with 6 inches of magnetic air gap separation. The wireless power system 400 in this configuration may include two sets of switching circuitry similar to the switching circuitry 1260 but configured for single-phase operation and coupled respectively to a transmitter 412 and a receiver 422.

In FIGS. 52A-B, results of the battery to grid operation in one embodiment is shown, where FIG. 52A shows the LCC topology primary/secondary resonant voltage and current waveforms, and FIG. 52B shows the resonant voltage and current parameters in zoom function.

B. Three-Phase Conversion with DC, Optionally Bidirectional

Wireless energy transfer (WET) technology in EV charging applications is considered convenient for industrial and commercial systems given the variability in environment and weather conditions. As EV charger power density increases, WET technology is more suitable in higher power applications than conventional wired systems, which employ bulky systems. It is also noted that the usage of WET while a vehicle is in motion can provide infrastructure more suitable for user acceptance, shorter charging cycles, and increased range of driving. Thus, WET technology offers high reliable, clean, and convenient energy transfer from a ground system to the vehicle through an inductively coupled transformer within an air gap for stationary and dynamic charging systems.

In one embodiment, a WET system from grid to a vehicle battery may include a direct AC-to-AC converter, such that the system can avoid a more AC-to-DC conversion stage and a DC link with a bulky capacitor.

Figure 53:
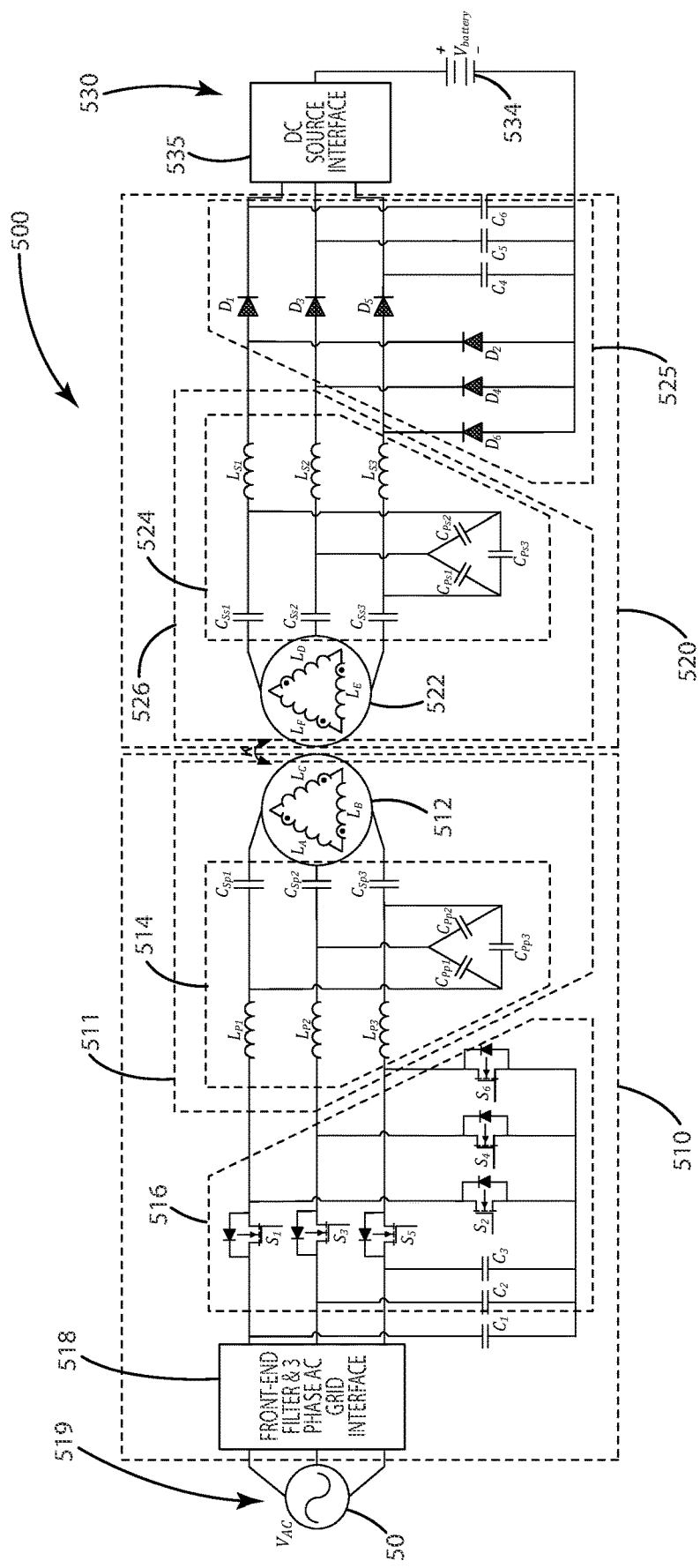
FIG. 53 shows a three phase bi-directional AC-to-DC converter incorporated into a wireless power system in accordance with one embodiment of the present disclosure.

A wireless power system that can operate as part of a WET system between a grid and vehicle battery in accordance with one embodiment is shown in FIG. 53 and generally designated 500. The wireless power system 500, for purposes of disclosure, is described in conjunction with unidirectional capabilities; however, it is to be understood that the wireless power system 500 may be configured for bidirectional power transfer in a wireless manner.

The wireless power system 500 in the illustrated embodiment may provide three-phase AC-to-DC conversion capabilities in the context of wireless power transfer. The wireless power system 500 may be incorporated into an EV charging system; however, the wireless power system 500 is not so limited and may be incorporated into any type of power transfer application. In the wireless power system 500 in one embodiment, a 60 Hz AC grid frequency as a source 50 can be converted to a high frequency AC through three-phase coupler coils and then converted to the DC without a front-end converter stage. As comparing to a conventional EV charger system, the wireless power system 500 in one embodiment reduces the design complexity and cost.

The wireless power system 500, in one embodiment, may comply with target parameters for grid side PF and THD while operating at a constant operating frequency. Three-phase converter switches of the wireless power system 500 may be driven with 50% duty cycle and 120° phase shifted PWM opposite gate signals during positive and negative half line cycles of three-phase grid for upper and lower switching legs. The system state model and theoretical analysis of the converter are described herein for delta connected three-phase LCC-LCC tuning topology.

In the illustrated embodiment of FIG. 53, the wireless power system 500 is shown in conjunction with a load 530 in the form of a battery 434. The wireless power system 500 may be considered an AC-to-DC converter. The wireless power system 500 in the illustrated embodiment does not include PFC circuitry; however, it is noted that PFC circuitry may be present in one or more embodiments.

The wireless power system 500, in one embodiment, may allow for transferring power directly from grid (e.g., source 50) to an EV battery (e.g., a load 530). The wireless power system 500 may provide power transfer without a front-end PFC converter.

The wireless power system 500 in one embodiment includes a three-phase filter (e.g., a filter inductor or alternative filter configuration as an input filter and/or an output filter), three-phase active switches, three-phase LCC/LCC resonant compensation circuit, a pair of three-phase coupling coils, six pulse rectifier or three-phase active switches for bi-directional option, output decoupling filter capacitor, and three-phase filter (e.g., a common mode choke or alternative filter configuration as an input filter and/or an output filter), and battery load. The grid-side frequency and high frequency switching are superimposed through three-phase LCC resonant compensation circuits and coupling coils and rectified through the output decoupling capacitors and output filter to the EV battery load.

The wireless power system 500 in the illustrated embodiment includes a wireless power supply 510 that has a pre-stage filter 518 (e.g., a front-end filter [such as a three-phase filter inductor or an alternative filter configuration as an input filter and/or an output filter] and a three-phase grid interface) and power supply circuitry 519, similar respectively to the pre-stage filter 318 and power supply circuitry 319. The power supply circuitry 519 may provide a connection between the source 50 and the wireless power supply 510. The source 50, in the illustrated embodiment is an AC source, which may be single-phase or three-phase as discussed herein.

The wireless power supply 510 may include switching circuitry 516 (e.g., three-phase active switches) operable to selectively provide power to a wireless power transmitter 511 (e.g., a primary side of three-phase coupling coils) for transferring power inductively to a wireless power receiver 520. The wireless power receiver 520 may be coupled to a load 530, which in the illustrated embodiment is provided as a battery 534. The wireless power receiver 520 may include receiver switching circuitry 525 (e.g., a six pulse rectifier or three-phase active switches for bi-directional option and output decoupling filter capacitors) operable to provide power received by a receiver 522 of the wireless power receiver 520 to the load 530, including interface circuitry 535 (e.g., a backend filter [such as a common mode choke or an alternative filter configuration as an input filter and/or an output filter] and a DC source interface) and the battery 534.

The switching circuitry 524, in the illustrated embodiment, may be configured for active or passive rectification of AC power output from receiver circuitry 511 to facilitate output DC power for consumption by the load 530.

The wireless power supply 510 may include a transmitter 512 operable to couple with a receiver 522 of the wireless power receiver 520, forming a pair of three-phase coupling coils, for wirelessly transferring power. As described herein, the construction of the transmitter 512 and the receiver 522 may vary depending on the application.

In the illustrated embodiment, the transmitter 512 and the receiver 522 are configured similar respectively to one or more embodiments of the transmitter 312, 1112 and receiver 322, 1122 described herein in conjunction with the wireless power system 300, 1100, 1100'.

As described herein, the transmitter 512 and the receiver 522 may be configured for three-phase coupling (or multi-phase) to transfer power wirelessly therebetween. The transfer of power may be one-way from the transmitter 512 to the receiver 522, or two-way (e.g., bidirectional) from the transmitter 512 to the receiver 522 and from the receiver 522 to the transmitter 512.

The wireless power system 500 in the illustrated embodiment includes compensation circuitry 514 coupled to the transmitter 512 and compensation circuitry 524 coupled to the receiver 522. The compensation circuitry 514, 524 may be LCC compensation circuitry with passive inductor and capacitor components.

A method of operating the wireless power system 500 in accordance with one embodiment is described herein in conjunction with FIGS. 54 and 55A-D, with converter switch transition and state analysis provided for three-phase wireless power transfer system. For purposes of disclosure, input and output filter losses are assumed to be negligible, three-phase active switches and gate drive system are considered ideal and switching losses are not concerned. Also, the secondary side rectifier diode losses are assumed negligible.

Figure 54:
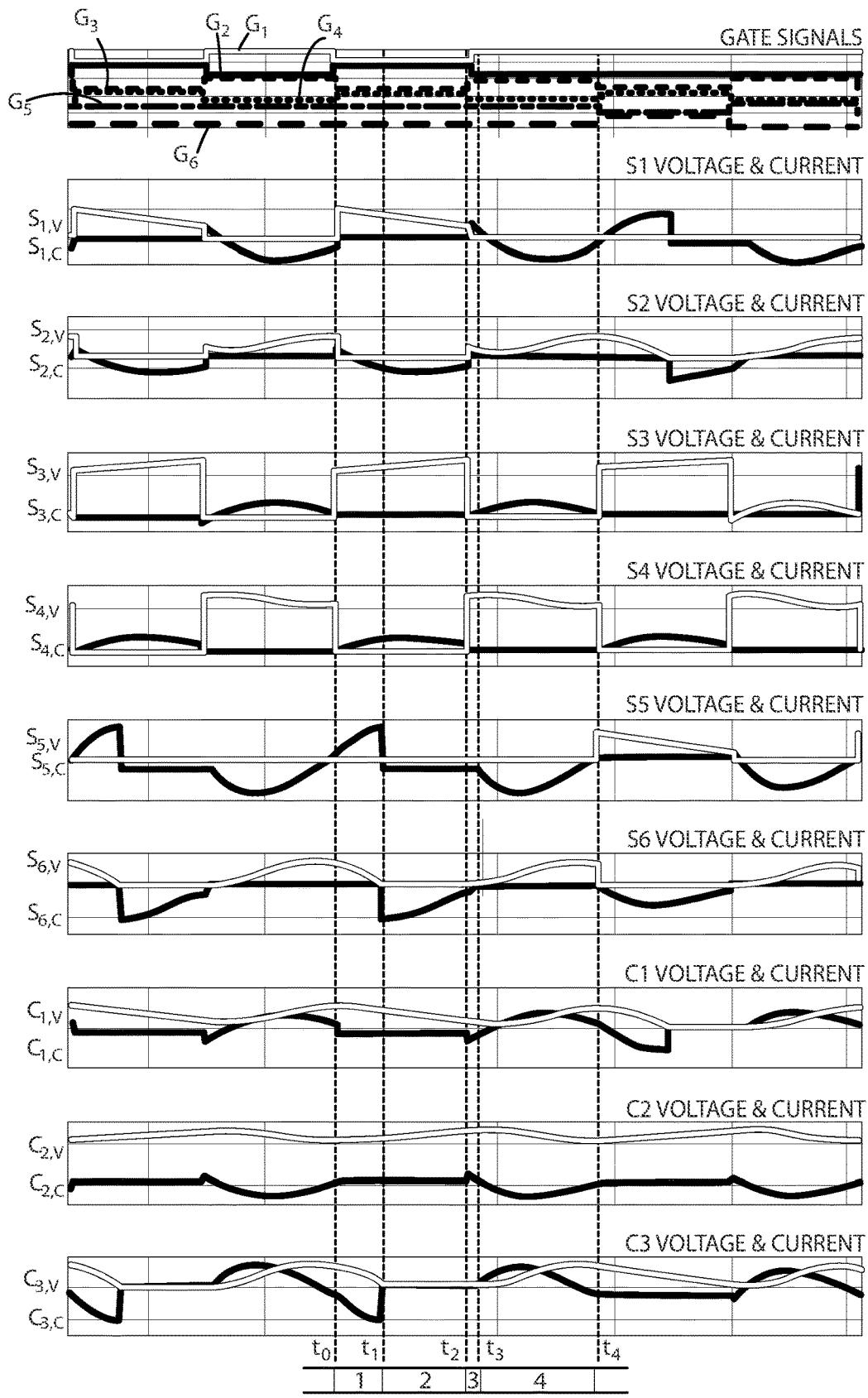
FIG. 54 shows three-phase voltage and current waveforms for operation of the wireless power system of FIG. 53 in accordance with one embodiment.

Mode 1 [t0<t<t1]. The current flow of the active switches, decoupling capacitors, resonant compensation, and coupler coil are presented during an interval 1 (mode 1) in FIGS. 54 and 55A. While the phase B grid voltage is in positive half-cycle and phase A and phase C are in negative half-cycle, the active switches $S_2$, $S_4$, and $S_5$ are transitioned to an ON-state and body diode of switch $S_2$ is in an ON-state as shown in FIG. 54. The coupling capacitor $C_2$ is charged and capacitors $C_1$, $C_3$ are discharged to the input filter $L_{f1}$, $L_{f3}$ and active switch $S_5$. The current flows through the first and third phase series inductors $L_{P1}$, $L_{P3}$ and returns from the second phase series inductor $L_{P2}$. The parallel capacitor between first and second phases $C_{Pp1}$ is charged and $C_{Pp2}$ and $C_{Pp3}$ are discharged through the second phase series inductor $L_{P2}$ and series capacitor $C_{Sp2}$. In this way, the series capacitor $C_{Sp2}$ is charged through the coupler transformer. The current flows from phase B winding $L_B$ and phase C windings $L_C$ and returns to phase A windings $L_A$ in coupler transformer and series capacitors $C_{Sp1}$, $C_{Sp3}$, discharged through the parallel capacitors.

Figure 55A:
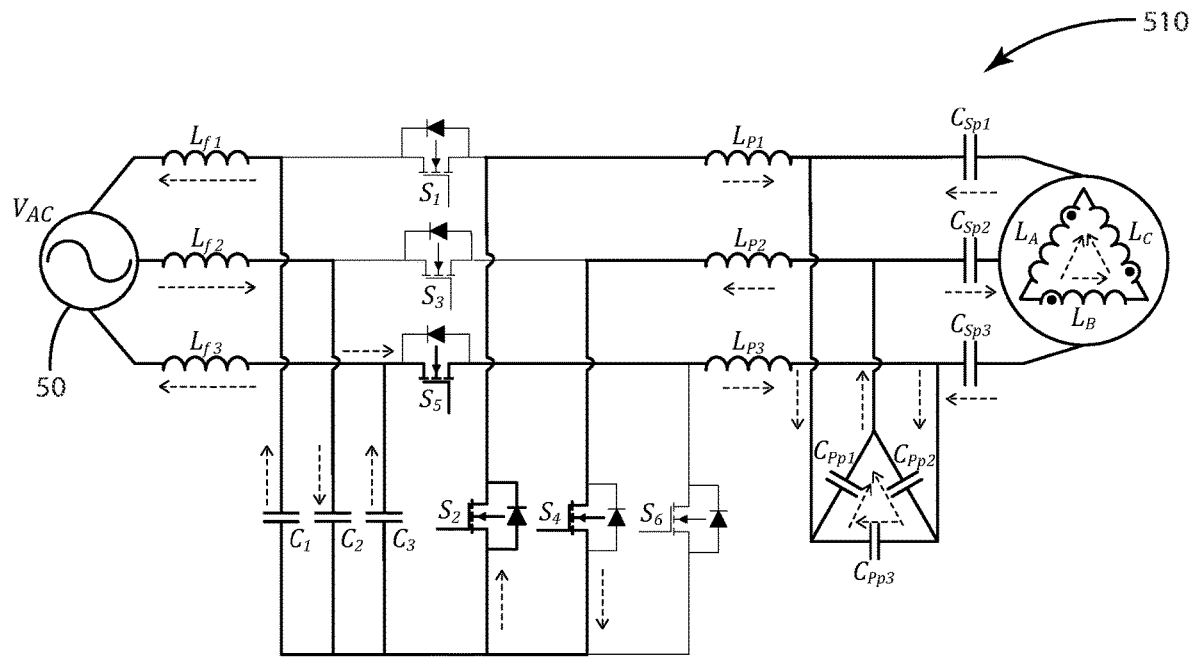
FIGS. 55A-D depict modes of operation of the wireless power system of FIG. 53 in accordance with one embodiment.
Figure 55B:
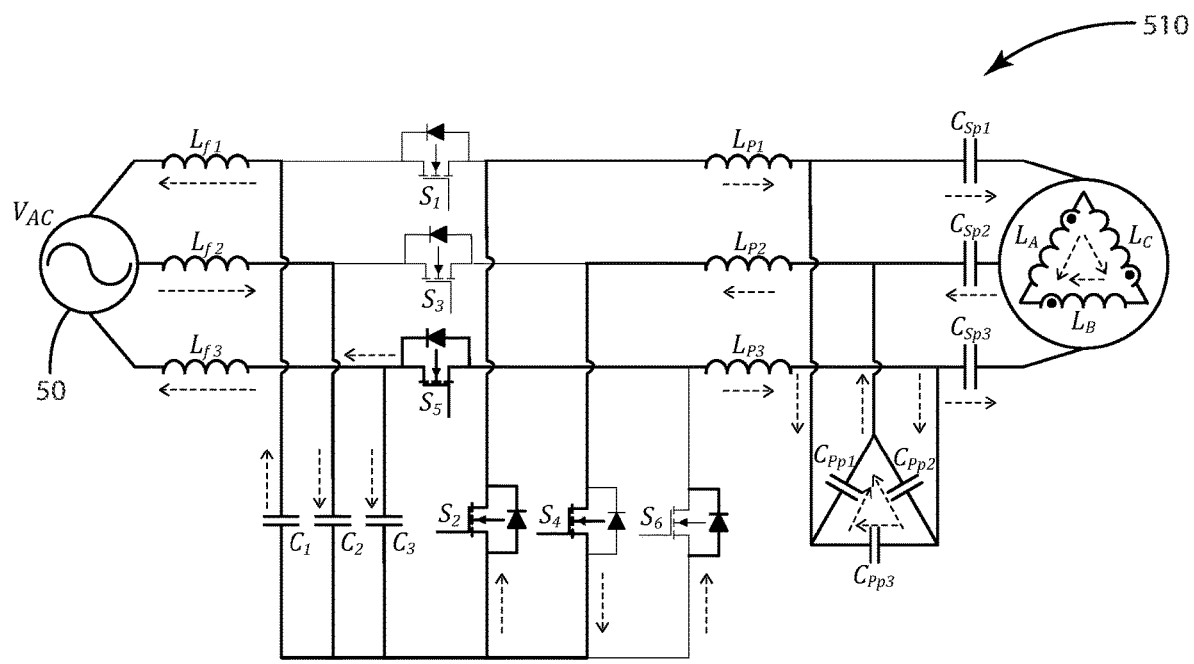
Figure 55C:
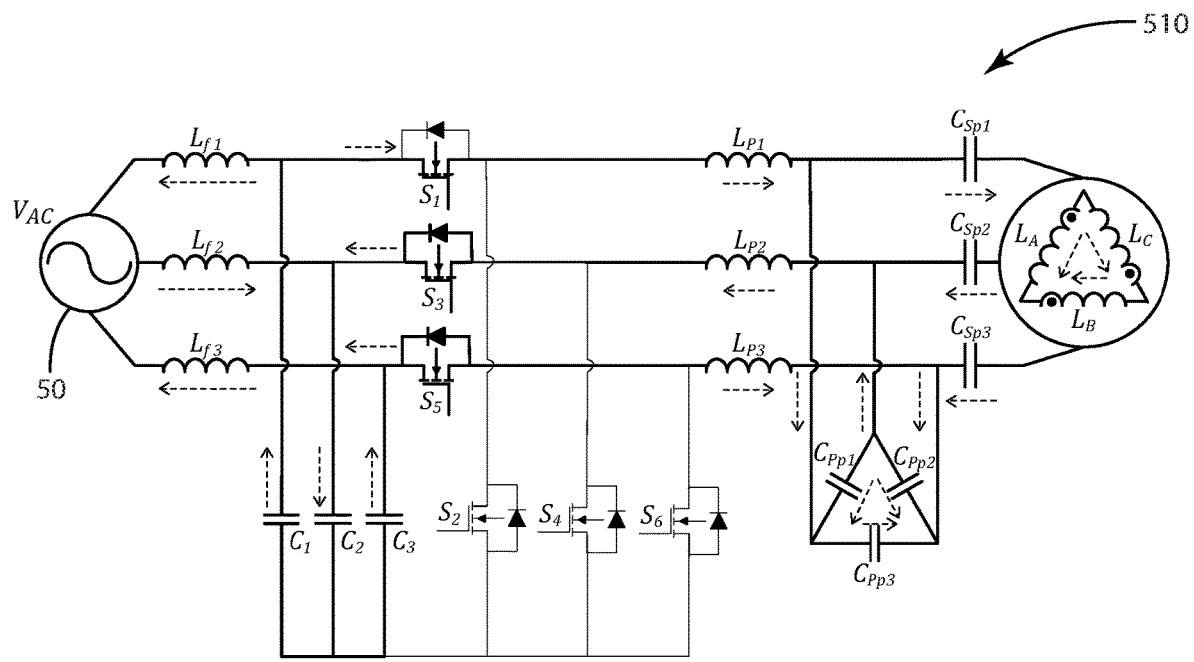
Figure 55D:
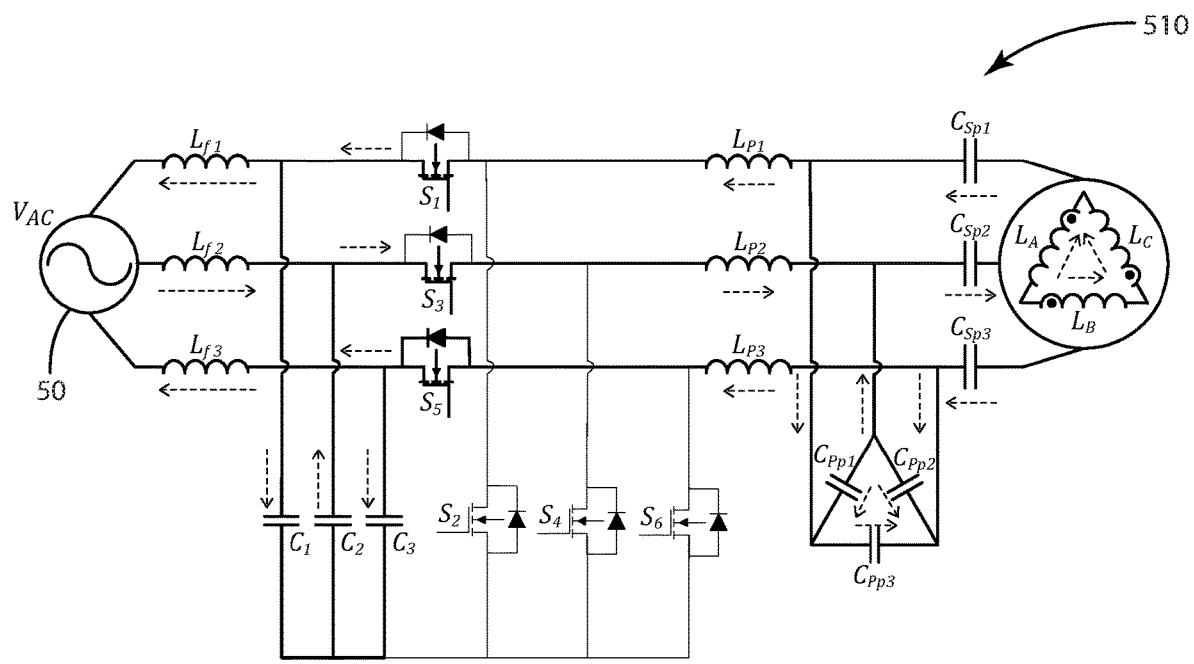

Mode 2 [$t_1$<t<$t_2$]. As outlined in interval 2 (mode 3) in FIG. 54, $S_2$, $S_4$, and $S_5$ are transitioned to an ON-state and body diodes of switches $S_2$, $S_5$, $S_6$ are in an ON-state. The coupler capacitors $C_2$ and $C_3$ are charged and $C_1$ is discharged through input filter $L_{f1}$ as seen in FIG. 55B. The current flows through resonant tank series inductors $L_{P1}$, $L_{P3}$, and returns from the series inductor $L_{P2}$. While, the parallel capacitors $C_{Pp1}$ is charged, $C_{Pp2}$ and $C_{Pp3}$ are discharged. The current flows through the series capacitors and charges $C_{Sp1}$ and $C_{Sp3}$, and $C_{Sp2}$ is discharged through the series inductor $L_{P2}$. The current goes through the three-phase coupler transformer phase A winding $L_A$, and returns from phase B winding $L_B$, and phase C winding $L_C$ to the series capacitor $C_{Sp2}$.

Mode 3 [$t_2$<t<$t_3$]. The converter active switches $S_1$, $S_3$, and $S_5$ are transitioned to an ON-state, and body diodes of $S_3$ and $S_5$ are conducting in interval 3 (mode 4) as shown in FIG. 54. Similar to the previous mode, the coupler capacitors $C_2$ and $C_3$ are charged and $C_1$ is discharged. The resonant tank current flows through the series inductors $L_{P1}$ and $L_{P3}$ to the parallel capacitors and returns to series inductor $L_{P2}$. While the parallel capacitors $C_{Pp2}$ and $C_{Pp3}$ are charged and the parallel capacitor $C_{Pp1}$ is discharged to the series inductor $L_{P2}$. The series capacitors $C_{Sp1}$ and $C_{Sp3}$ are charged and the first phase series capacitor $C_{Sp2}$ is discharged to the series inductor $L_{P2}$ as demonstrated in FIG. 55C. The coupler coil current flows through the phase A winding $L_A$ and returns from phase B winding $L_B$, and phase C winding $L_C$ to the series capacitor $C_{Sp2}$.

Mode 4 [t3<t<t4]. As shown in FIG. 54, the converter active switches $S_1$, $S_3$, and $S_5$ are transitioned to an ON-state and body diode of $S_5$ are in an ON-state in interval 4 (mode 4). The coupling capacitors $C_1$ and $C_3$ are charged and $C_2$ is discharged to the second phase series inductor $L_{P2}$. The resonant tank current returns from the first and third phase series inductors $L_{P1}$, $L_{P3}$ to the coupling capacitors and input filter inductors as presented in FIG. 55D. The parallel capacitor $C_{Pp2}$ and $C_{Pp3}$ are charged and the parallel capacitors $C_{Pp1}$ is discharged through the second phase series capacitor $C_{Sp2}$. In this interval, the series capacitor $C_{Sp2}$ is charged through the three-phase coupler transformer and the series capacitors $C_{Sp1}$ and $C_{Sp3}$ are discharged to the parallel capacitors and the series inductors $L_{P1}$ and $L_{P3}$. The coupler coil current flows from phase B winding $L_B$ and phase C winding $L_C$ and returns from phase A to the series capacitors $C_{Sp1}$ and $C_{Sp3}$.

The input phase voltages respect to the ground $v_{an}$, $v_{bn}$, $v_{cn}$ of a wireless power system 500 in one embodiment can be represented considering the three-phase balance system with the rms values of the input phase voltages in a time domain as, $$v_{an}(t) = \sqrt{2}\, V_{an,rms}\sin(2\pi f_{60}t) \tag{44}$$

$$v_{bn}(t) = \sqrt{2}\, V_{bn,rms}\sin\left(2\pi f_{60}t + \frac{2\pi}{3}\right) \tag{45}$$

$$v_{cn}(t) = \sqrt{2}\, V_{cn,rms}\sin\left(2\pi f_{60}t - \frac{2\pi}{3}\right) \tag{46}$$

where $f_{60}$ is the fundamental of the grid frequency. The input phase currents of the system $i_a$, $i_b$, $i_c$ can be described with the rms values of the input currents since the proposed converter can achieve the unity power factor and in a time domain as, $$i_a(t) = \sqrt{2}\, I_{a,rms}\sin(2\pi f_{60}t) \tag{47}$$

$$i_b(t) = \sqrt{2}\, I_{b,rms}\sin\left(2\pi f_{60}t + \frac{2\pi}{3}\right) \tag{48}$$

$$i_c(t) = \sqrt{2}\, I_{c,rms}\sin\left(2\pi f_{60}t - \frac{2\pi}{3}\right) \tag{49}$$

The system coupling capacitors should be designed at the maximum output power to provide the unity power factor at the minimum load conditions. The system phase powers $p_a$, $p_b$, $p_c$ can be defined considering the decoupling capacitors charge and discharge of the energy within one switching period as, $$p_a(t) = \frac{1}{2}C_1\left(\sqrt{2}\,V_{an,rms}\sin(2\pi f_{60}t)\right)^2 f_{sw} \tag{50}$$

$$p_b(t) = \frac{1}{2}C_2\left(\sqrt{2}\,V_{bn,rms}\sin\left(2\pi f_{60}t + \frac{2\pi}{3}\right)\right)^2 f_{sw} \tag{51}$$

$$p_c(t) = \frac{1}{2}C_3\left(\sqrt{2}\,V_{cn,rms}\sin\left(2\pi f_{60}t - \frac{2\pi}{3}\right)\right)^2 f_{sw} \tag{52}$$

where $f_{sw}$ is the resonant system switching frequency. The total input instantaneous power can be calculated considering the equivalent amplitude of the phase voltages $V_{ph}$ (=$V_{an,rms}$=$V_{bn,rms}$=$V_{cn,rms}$) and the same value of the decoupling capacitors $C_d$ (=$C_1$=$C_2$=$C_3$) by sum of the phase input powers as, $$p_{in}(t) = p_a(t) + p_b(t) + p_c(t) = \tag{53}$$
$$C_d V_{ph}^2\left[\sin^2(2\pi f_{60}t) + \sin^2\left(2\pi f_{60}t + \frac{2\pi}{3}\right) + \sin^2\left(2\pi f_{60}t - \frac{2\pi}{3}\right)\right]f_{sw}$$

The total input average power can be obtained considering the unity power factor through the resonant compensation and wireless coupling coils to the output, and three-phase balanced system as, $$P_{in} = \tfrac{3}{2} C_d V_{ph}^2 f_{sw} \tag{54}$$

The decoupling capacitor $C_d$ value can be calculated averaging total output power $P_O$ since the three-phase input phase voltages $V_{ph}$ are constant at the constant output power $P_O$ as, $$C_d = \frac{2P_O}{3V_{ph}^2 f_{sw} \eta} \tag{55}$$

where η is the converter efficiency. The input filter inductor value $L_f$ (=$L_{f1}$=$L_{f2}$=$L_{f3}$) of the system can be calculated considering the input impedance of the system seen from the output of the input filter. In order to avoid phase shift of input current, the filter inductor should be highly lower than the input impedance of the converter at the line frequency $f_{60}$. Since the input is considered unity power factor at the minimum load condition, the input impedance can be considered almost resistive load characteristic $R_{in}$. The minimum input impedance can be found at the maximum output power conditions and the filter inductor $L_f$ is, $$L_f \ll \frac{V_{ph}^2 \eta}{2\pi f_{60} P_O} \tag{56}$$

Figure 56:
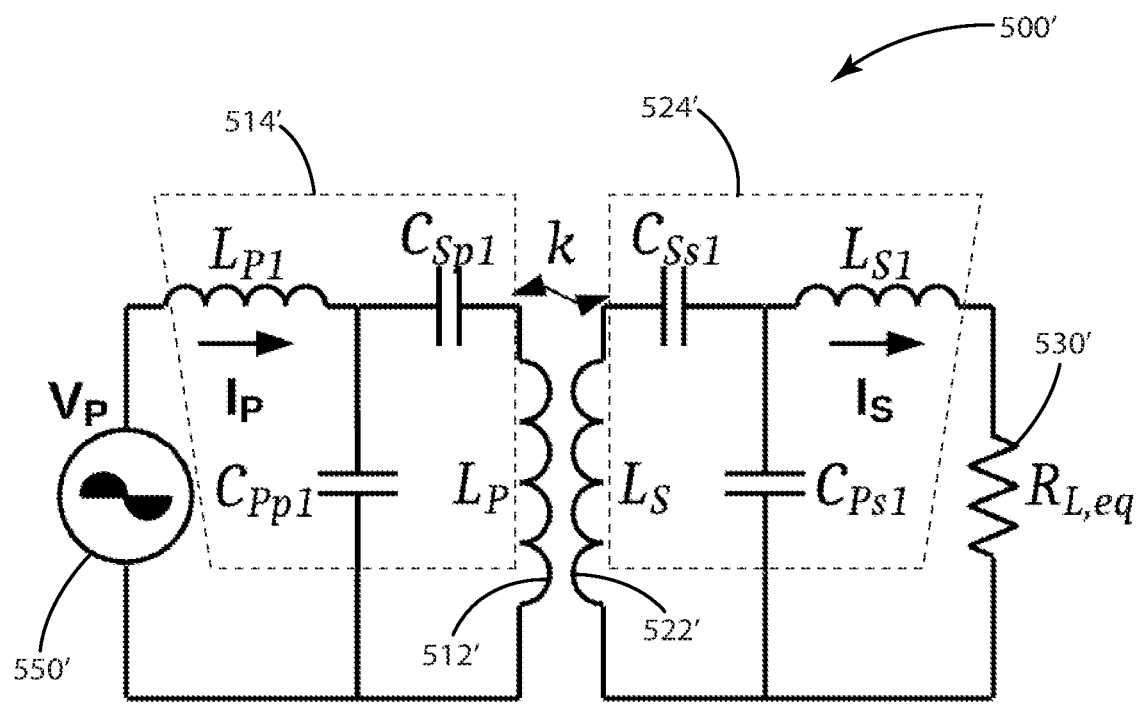
FIG. 56 shows an equivalent circuit of the wireless power system of FIG. 53 in accordance with one embodiment.
Figure 57A:
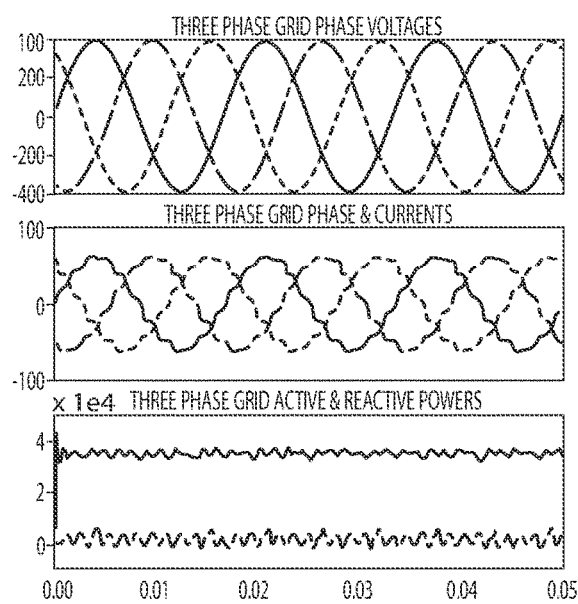
FIG. 57A shows primary side voltage, current, and active power/reactive power for operation of the wireless power system of FIG. 53 in accordance with one embodiment.
Figure 57B:
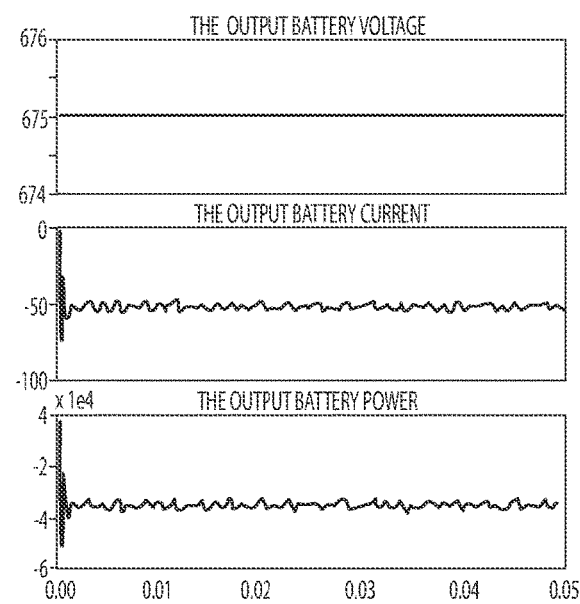
FIG. 57B shows secondary side voltage, current, and power for operation of the wireless power system of FIG. 53 in accordance with one embodiment.

An equivalent circuit of a resonant system provided by the wireless power system 500, in one embodiment, is provided in the illustrated embodiment of FIG. 56 and generally designated 500'. The resonant system 500' includes a transmitter 512' and a receiver 522', similar respectively to the transmitter 512 and receiver 522. The resonant system 500' may also include compensation circuitry 514' and compensation circuitry 524', similar respectively to compensation circuitry 514, and compensation circuit 524 described in conjunction with the wireless power system 500.

The phase input voltage $V_P$ can be written as, $$v_p(t) = \frac{2}{\pi} V_{an,rms} \sin(2\pi f_{60} t) \sum_{n=1,3,\ldots}^{\infty} \frac{1}{n} \sin(n 2\pi f_{sw} t) \tag{57}$$

The average magnitude of the equivalent input voltage $V_P$ can be expressed since the system in balanced as, $$V_P = \frac{2}{\pi\sqrt{2}} V_{ph} \tag{58}$$

The resonant tank phase current $I_P$ (=$I_{P1}$=$I_{P2}$=$I_{P3}$) can be specified considering the balance system as, $$I_P = \frac{\pi\sqrt{2}}{2} \frac{P_O}{\eta V_{ph}} \tag{59}$$

The equivalent self-inductance $L_P$, $L_S$ of coupling transformer can be stated in matrix form as, $$L_P = \begin{bmatrix} L_A & M_{AB} & M_{CA} \\ M_{AB} & L_B & M_{BC} \\ M_{CA} & M_{BC} & L_C \end{bmatrix}, L_S = \begin{bmatrix} L_D & M_{DE} & M_{FD} \\ M_{DE} & L_E & M_{EF} \\ M_{FD} & M_{EF} & L_F \end{bmatrix} \tag{60}$$

where $L_A$, $L_B$, $L_C$ are transmitter phase inductances and $M_{AB}$, $M_{BC}$, $M_{CA}$ are mutual inductances between phases $L_A$ and $L_B$, $L_B$ and $L_C$, and $L_C$ and $L_A$, respectively. While, $L_D$, $L_E$, $L_F$ are receiver coil phase inductances and $M_{DE}$, $M_{EF}$, and $M_{FD}$ are the mutual inductances between phases $L_D$ and $L_E$, $L_E$ and $L_F$, and $L_F$ and $L_D$, respectively. The coupler coil magnetizing inductance can be computed with the coupling coefficient factor of k as, $$L_M = k\sqrt{L_P L_S} \tag{61}$$

and leakage inductances of the transmitter coil $L_{Lp}$ and receiver coil $L_{Ls}$ are, $$L_{Lp} = L_P - L_M \tag{62}$$

$$L_{Ls} = L_S - L_M \tag{20}$$

The equivalent load resistance $R_{L,eq}$ at the receiver side output can be obtained as $$R_{L,eq} = \frac{2}{3} \frac{V_{battery}^2}{P_O} \tag{63}$$

The transmitter and receiver resonant network in a matrix form can be shown as, $$\begin{bmatrix} V_P \\ V_{battery} \end{bmatrix} = \begin{bmatrix} j\omega L_{P1} + \left[\frac{1}{j\omega C_{Pp1}}//\left(\frac{1}{j\omega C_{Sp1}} + j\omega L_{L,p} + j\omega L_M\right)\right] & -j\omega L_M \\ -j\omega L_M & j\omega L_M + \frac{1}{n^2}\left[j\omega L_{L,s} + \frac{1}{j\omega C_{Ss1}} + \left(\frac{1}{j\omega C_{Ps1}}//j\omega L_{S1}\right)\right] \end{bmatrix} \begin{bmatrix} I_P \\ I_S \end{bmatrix} \tag{64}$$

where ω={2π$f_{sw}$} represents switching frequency of $f_{sw}$ and n is the turns ratio between transmitter and receiver coils which is expressed by n=$\sqrt{L_S/L_P}$. The resonant frequency of the compensation system can be stated with the system components as, $$\omega_o = 1/\sqrt{L_{P1} C_{Pp1}} = 1/\sqrt{L_{S1} C_{Ps1}} \tag{65}$$

and $$\omega_o = 1/\sqrt{(L_P - L_{P1}) C_{Sp1}} = 1/\sqrt{(L_S - L_{S1}) C_{Ss1}} \tag{66}$$

The corresponding voltage transfer functions of the bidirectional system in charging mode can be expressed by $$|M_{V,gain}| = \left|\frac{V_S}{V_P}\right| = \left|\frac{\omega^2 L_M C_{Pp1}}{\left(1 - (\omega/\omega_o)^2 + j\omega C_{Ss1} R_{L,eq}\right)(1/C_{Ps1} + j\omega L_S) + j\omega L_{S1} + R_{in}}\right| \tag{67}$$

Simulation results of a wireless power system 500 in accordance with one embodiment have been obtained and are shown in FIGS. 57A-B and 58A-B. The results are provided with respect to sourcing power from a three-phase grid system for delivery to a battery 534. As demonstrated in FIG. 57B, the three-phase grid frequency may be transferred to the DC voltage and current amplitudes in the receiver side by the wireless power supply 510.

Figure 58A:
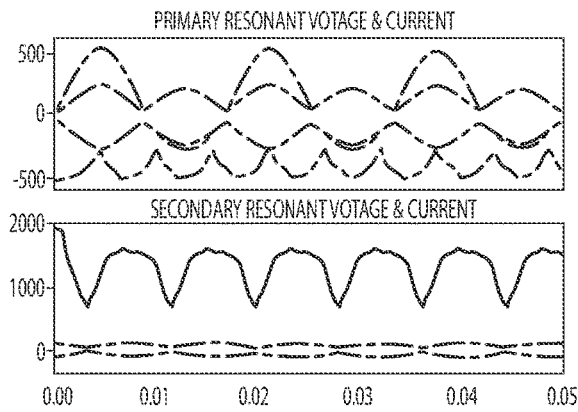
FIG. 58A shows primary and secondary side resonant tank voltage and current waveforms for operation of the wireless power system of FIG. 53 in accordance with one embodiment.
Figure 58B:
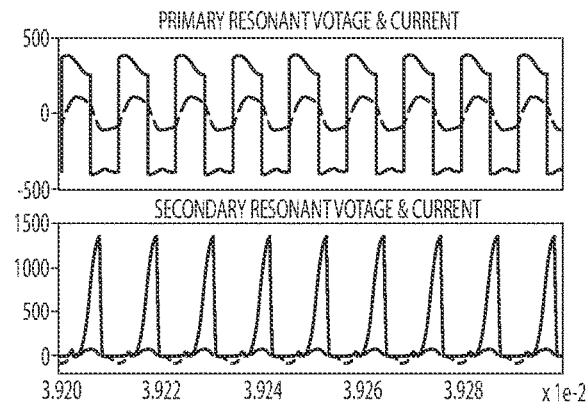
FIG. 58B shows an enlarged view of the waveforms of FIG. 58A.

FIGS. 58A-B shows the first phase resonant tank voltage and current waveforms across primary and secondary resonant tank input/output terminals in accordance with one embodiment of the wireless power system 500. The grid frequency may be combined with the high frequency component through the converter, resonant stage, and coupler transformer and transferred to the receiver as shown in the illustrated embodiment. The primary and secondary resonant voltage and current waveforms are zoomed and presented in FIG. 58B. The resonant tank transmitter is on the resonant frequency with a third harmonic injected as seen from the current zoom functioning waveform in the primary side. The transferred power through the coupler transformer is rectified through the diodes, capacitors, and filter common mode choke to the battery terminals. High frequency voltage and current waveforms across the secondary resonant tank can be seen as demonstrated in zoom from the figure.

The system resonant hardware of the wireless power supply 500 in one embodiment may include a transmitter/receiver three-phase coupler coil and LCC resonant compensation, with the coupler coil similar to any of the one or more three-phase coupler coil arrangements described herein.

Figure 59A:
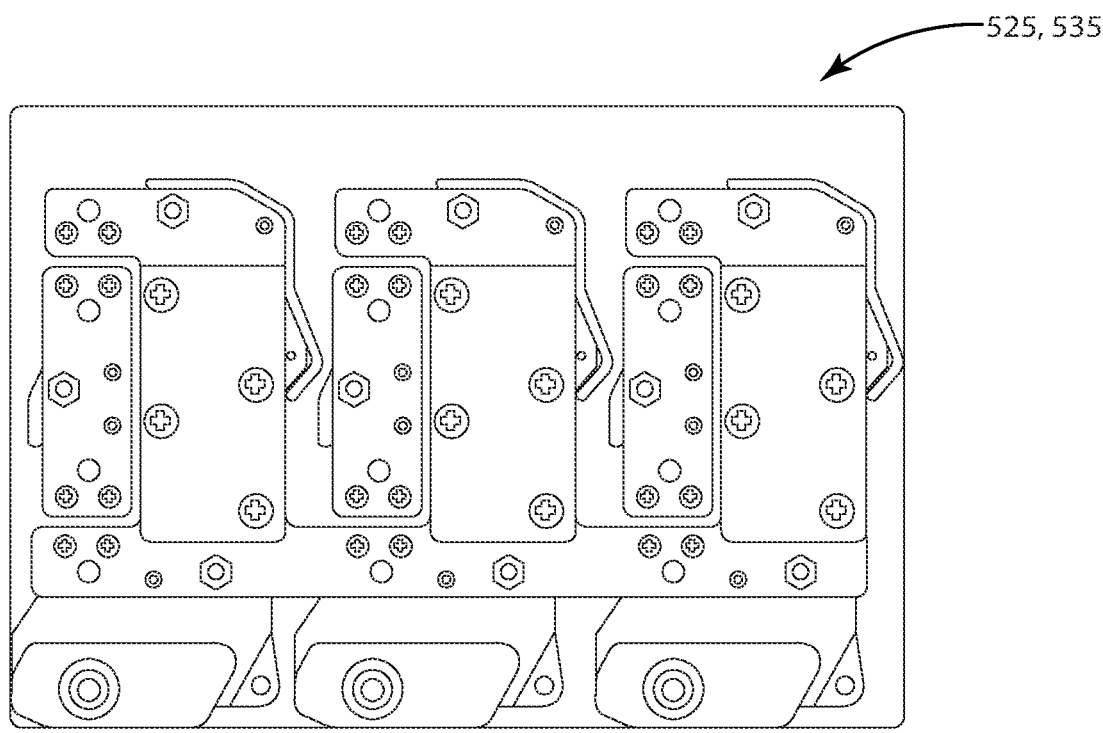
FIGS. 59A-B show bottom and top views of a rectification circuit and filter in accordance with one embodiment.
Figure 59B:
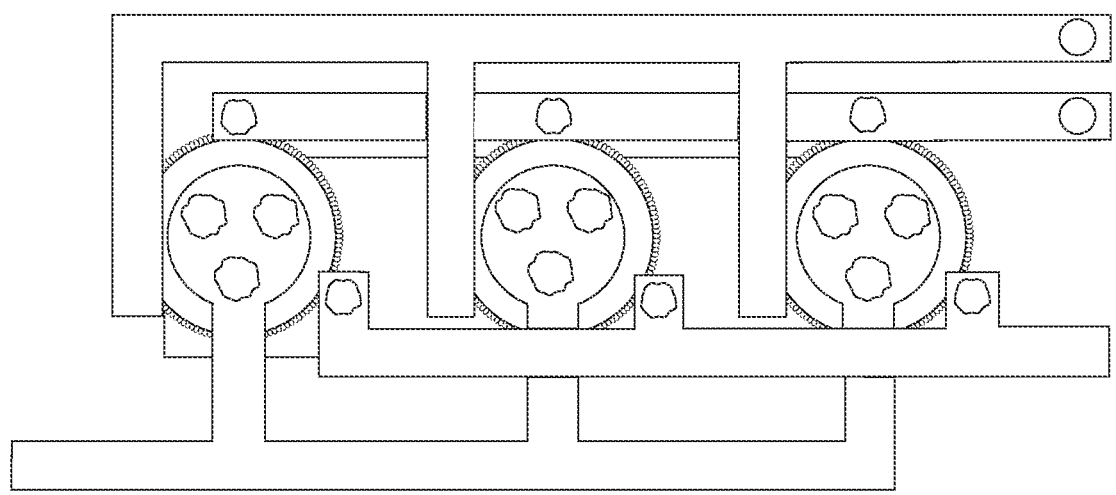

The rectifier and common mode choke of the wireless power system may be based on an active and/or passive arrangement, an embodiment of which is shown in FIGS. 59A-B.

The 60 Hz frequency three-phase grid system may be inverted to a high-frequency signal by switching circuitry 516 (e.g., inverter) and energy transfer may be achieved through the coupler coil system with resonant compensation to the output for battery charging. The converter arrangement of the wireless power supply 500, in one embodiment, can eliminate a front PFC stage ensuring grid side harmonic and power factor standard levels with less number of active/passive components.

IV. DC-to-DC Conversion, Optionally Bidirectional

A. Single Phase DC-to-DC Conversion, Optionally Bidirectional

Figure 60:
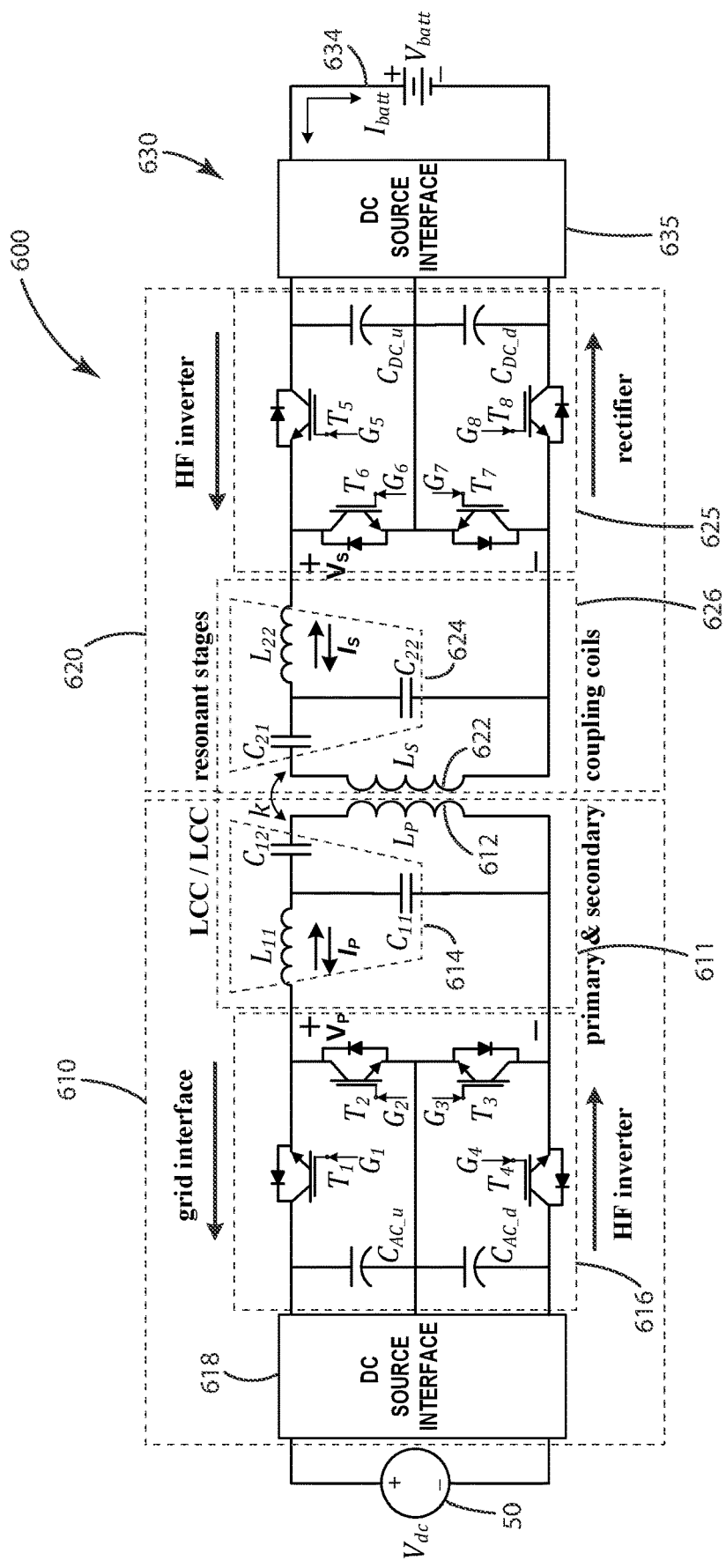
FIG. 60 shows a single phase bi-directional DC-to-DC converter incorporated into a wireless power system in accordance with one embodiment.

A wireless power system with DC-to-DC converter or DC-to-DC converter capabilities in accordance with one embodiment is shown in FIG. 60 and generally designated 600. The wireless power system 600, for purposes of disclosure, is described in conjunction with bidirectional capabilities; however, it is to be understood that the wireless power system 600 may be configured to unidirectional power transfer in a wireless manner.

The wireless power system 600 in one embodiment may include multiple interfaces for grid support applications between ESSs and/or EV batteries. In this configuration, the source 50 may be configured as a DC source.

In the illustrated embodiment of FIG. 60, the wireless power system 600 is configured to allow transferring power the source 50 to a load 630, such as an ESSs or EV battery. The wireless power system 600 may be bidirectional such that power stored by the load 630 (e.g., an ESS or EV battery) may be discharged wirelessly to the source 50. This functionality may be useful for time of use energy cost management applications.

In the illustrated embodiment of FIG. 60, the wireless power system 600 is shown in conjunction with a load 630 including a battery 634. The wireless power system 600 may be considered a DC-to-DC converter.

The wireless power system 600 in the illustrated embodiment includes a wireless power supply 610. Optionally, the wireless power supply 610 includes a pre-stage filter 618. For instance, a DC interface may bypass a pre-stage filter, such that the pre-stage filter may be absent. The wireless power supply 610 may include power supply circuitry 619, which may be similar respectively to the pre-stage filter 418 and power supply circuitry 419. The power supply circuitry 619 may provide a connection between the source 50 and the wireless power supply 610. The source 50, in the illustrated embodiment is a DC source.

The wireless power supply 610 may include switching circuitry 616 operable to selectively provide power to a wireless power transmitter 611 for transferring power inductively to a wireless power receiver 620. The upper and lower half bridge switches of the switching circuitry 616 are activated as similar to a phase-shift converter described herein. The upper and lower half bridge switches are phase shifted as opposite and complementary between the switching half-bridges.

The wireless power receiver 620 may be coupled to a load 630, which in the illustrated embodiment is provided as a battery 634 via interface circuitry 635. The load 630 (e.g., the battery 634), as described herein in conjunction with one embodiment, may be operable to source power back to the wireless power receiver 620 for power transfer from the wireless power receiver 620 to the wireless power supply 610. The wireless power receiver 620 may include receiver switching circuitry 625 operable to selectively provide power to receiver circuitry 626 including the receiver 622 such that the receiver 622 is operable as a transmitter to provide power wirelessly to the transmitter 612. The receiver switching circuitry 625, operating to transmit power via the receiver 622 to the transmitter 612, may be switched in a manner similar to that described in connection with the switching circuitry 616 of the wireless power supply 610.

The switching circuitry 625, in the illustrated embodiment, may be configured to facilitate output of DC power (e.g., active or passive rectification) for consumption by the load 630. In one embodiment, with the wireless power receiver 620 configured to only receive power, the switching circuitry 625 may be configured for passive rectification or active rectification.

The wireless power supply 610 may include a transmitter 612 operable to couple with a receiver 622 of the wireless power receiver 620 for wirelessly transferring power, such as by magnetic coupling or inductive coupling. As described herein, the construction of the transmitter 612 and the receiver 622 may vary depending on the application.

In the illustrated embodiment, the transmitter 612 and the receiver 622 are configured similar respectively to one or more embodiments of the transmitter 112 and receiver 122 described herein in conjunction with the wireless power system 100. However, the transmitter 612 and the receiver 622 are not so limited; for instance, the transmitter 612 and receiver 622 may be configured according to the transmitter 1112 and receiver 1122 of the wireless power system 1100, 1100' for three-phase coupling. The receiver 622, in one embodiment, may be configured to transmit three-phase AC power via the three-phase coupling based on DC power received by the load 630.

As described herein, the transmitter 612 and the receiver 622 may be configured for single-phase coupling (or three-phase or multi-phase) to transfer power wirelessly therebetween. The transfer of power may be one-way from the transmitter 612 to the receiver 622, or two-way (e.g., bidirectional) from the transmitter 612 to the receiver 622 and from the receiver 622 to the transmitter 612.

The wireless power system 600 in the illustrated embodiment includes compensation circuitry 614 coupled to the transmitter 612 and compensation circuitry 624 coupled to the receiver 622. The compensation circuitry 614, 624 may be LCC compensation circuitry with passive inductor and capacitor components. In the illustrated embodiment, the wireless power transmitter 611 and receiver circuitry 626, including the compensation circuitry 614, 624, the transmitter 612, and the receiver 622, may be identified as a resonant stage 613 with coupling capabilities for transfer of power wirelessly (e.g., without physical connection between the transmitter 612 and receiver 622).

B. Three-Phase DC-to-DC Conversion, Optionally Bidirectional

Figure 61:
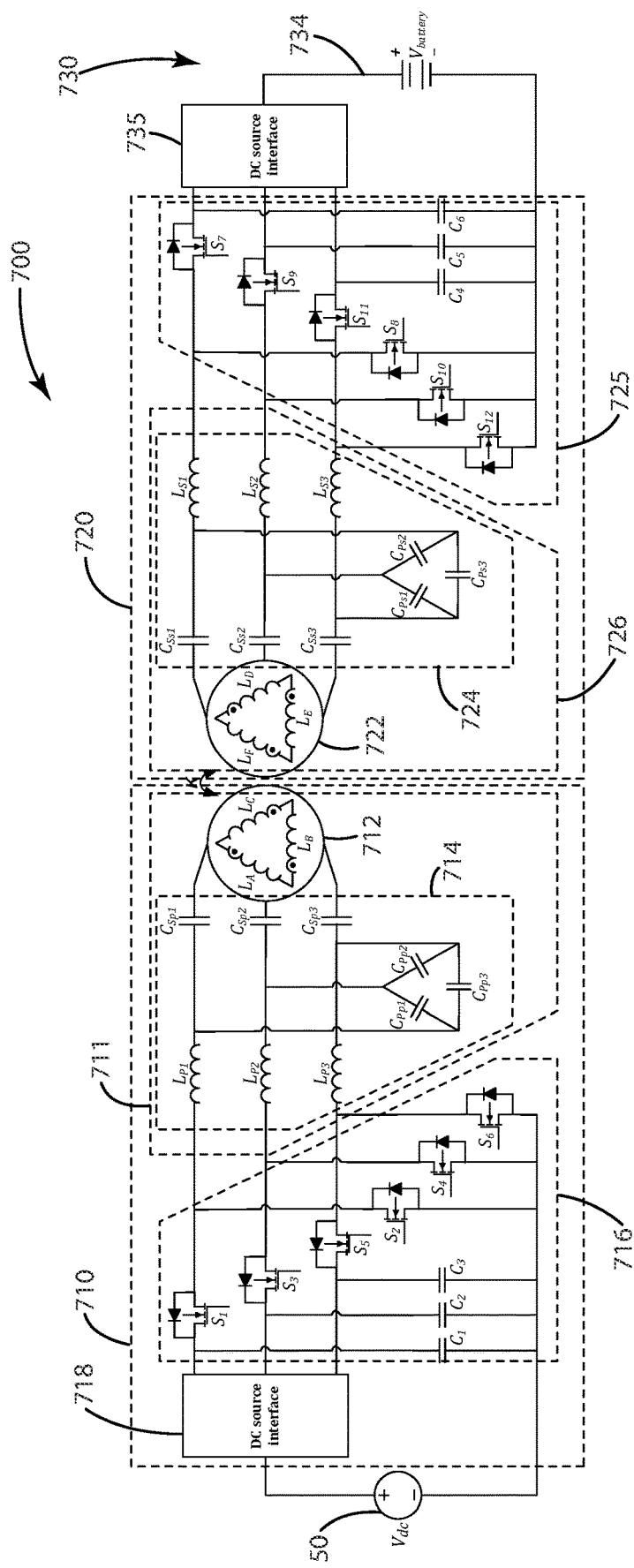
FIG. 61 shows a three phase bi-directional DC-to-DC converter incorporated into a wireless power system in accordance with one embodiment.
Figure 62A:
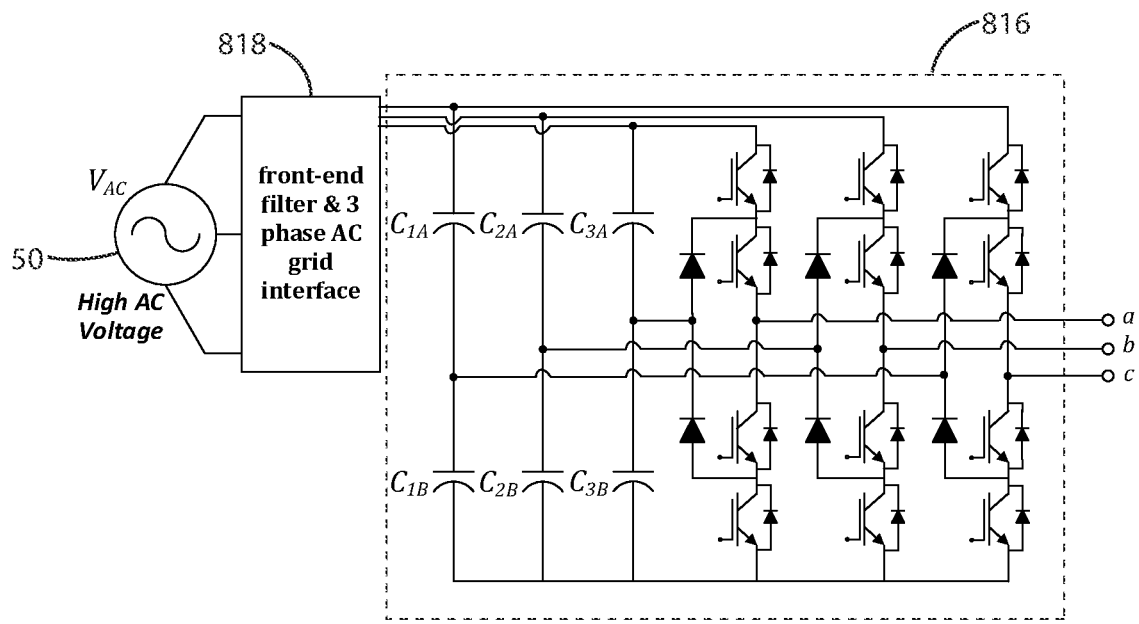
FIGS. 62A-D shows multi-level type converter configurations.
Figure 62B:
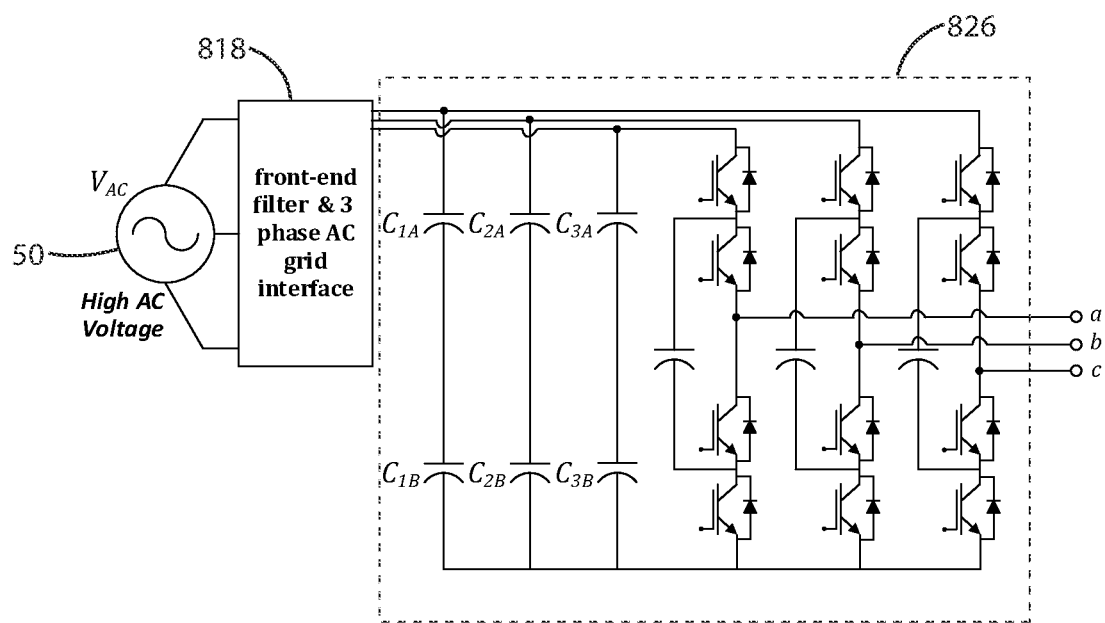
Figure 62C:
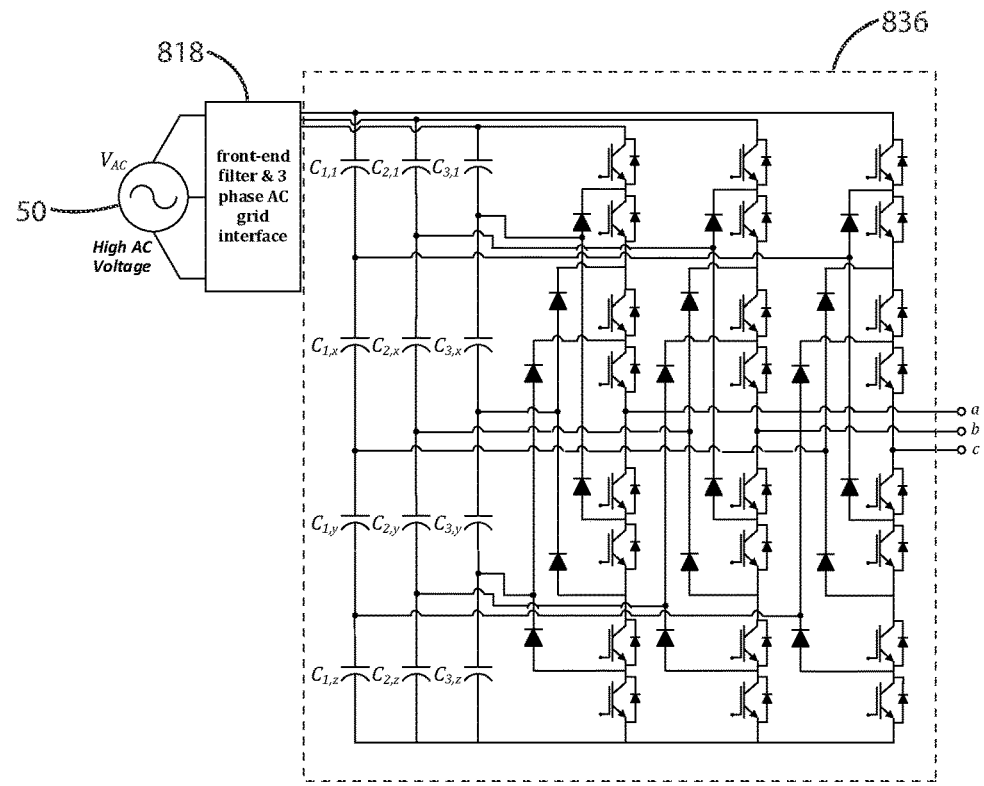
Figure 62D:
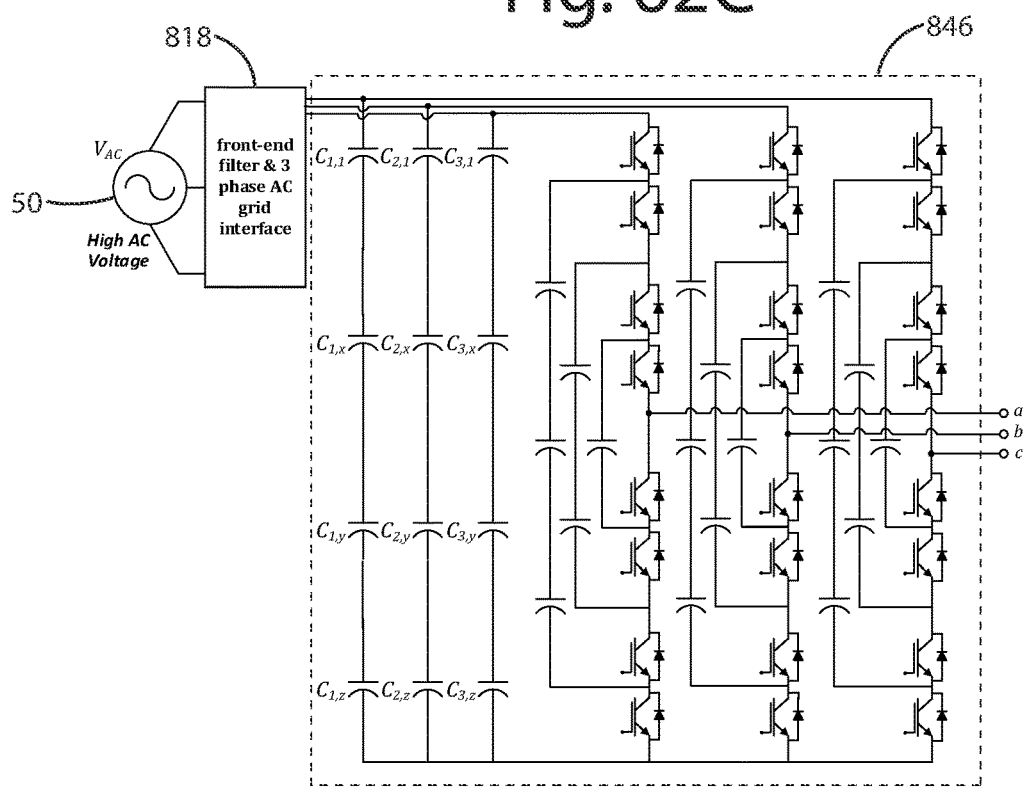

A wireless power system in accordance with one embodiment is shown in FIG. 61 and generally designated 700. The wireless power system 700, for purposes of disclosure, is described in conjunction with bidirectional capabilities; however, it is to be understood that the wireless power system 700 may be configured for unidirectional power transfer in a wireless or wired manner. For instance, the wireless power system 700 may be configured such that the transmitter 712 and receiver 722 are physically coupled, forming a wired configuration. It is further noted that any of the wireless power systems described herein may be configured differently in a similar manner such that the transmitter and receiver are physically coupled to form a wired configuration.

The wireless power system 700 in the illustrated embodiment may provide three-phase DC-to-DC conversion capabilities in the context of wireless power transfer. The wireless power system 700 may be incorporated into an EV charging system; however, the wireless power system 700 is not so limited and may be incorporated into any type of power transfer application. In the wireless power system 700, in one embodiment, the source 50 can be converted to a high frequency AC through three-phase coupler coils and then converted to the DC.

In the illustrated embodiment of FIG. 61, the wireless power system 700 is shown in conjunction with a load 730 in the form of a battery 734. The wireless power system 700 may be considered an DC-to-DC converter. The wireless power system 700 may allow for transferring power directly from the source 50 to a battery 734 (e.g., a load 730).

The wireless power system 700 in the illustrated embodiment includes a wireless power supply 710 that has a pre-stage filter 718 (e.g., a front-end filter) and power supply circuitry 719. The power supply circuitry 719 may provide a connection between the source 50 and the wireless power supply 710.

The wireless power supply 710 may include switching circuitry 716 (e.g., three-phase active switches) operable to selectively provide power to a wireless power transmitter 711 (e.g., a primary side of three-phase coupling coils) for transferring power inductively to a wireless power receiver 720. The switching circuitry 716 may be controlled such that half bridges are driven with a phase-shift function between the half-bridges and complementary signals.

The wireless power receiver 720 may be coupled to a load 730, which in the illustrated embodiment is provided as a battery 734. The wireless power receiver 720 may include receiver switching circuitry 725 (e.g., a six pulse active rectifier that provides bidirectional power transfer and output decoupling filter capacitors) operable to provide power received by a receiver 722 of the wireless power receiver 720 to the load 730, including interface circuitry 735 (e.g., a backend filter [such as a common mode choke or an alternative filter circuit configuration] and a DC source interface) and the battery 734.

The switching circuitry 724, in the illustrated embodiment, may be configured for active or passive rectification of AC power output from receiver circuitry 711 to facilitate output of DC power for consumption by the load 730.

The wireless power supply 710 may include a transmitter 712 operable to couple with a receiver 722 of the wireless power receiver 720, forming a pair of three-phase coupling coils, for wirelessly transferring power. As described herein, the construction of the transmitter 712 and the receiver 722 may vary depending on the application.

In the illustrated embodiment, the transmitter 712 and the receiver 722 are configured similar respectively to one or more embodiments of the transmitter 312, 512, 1112 and receiver 322, 512, 1122 described herein in conjunction with the wireless power system 300, 500, 1100, 1100'.

As described herein, the transmitter 712 and the receiver 722 may be configured for three-phase coupling (or multiphase) to transfer power wirelessly therebetween. The transfer of power may be one-way from the transmitter 712 to the receiver 722, or two-way (e.g., bidirectional) from the transmitter 712 to the receiver 722 and from the receiver 722 to the transmitter 712.

The wireless power system 700 in the illustrated embodiment includes compensation circuitry 714 coupled to the transmitter 712 and compensation circuitry 724 coupled to the receiver 722. The compensation circuitry 714, 724 may be LCC compensation circuitry with passive inductor and capacitor components.

V. AC-to-DC Conversion and DC-to-DC Conversion, Optionally Bidirectional

A wireless power system 100, 300, 400, 400", 500, 600, 700 in accordance with one embodiment may be configured to facilitate obtaining and/or converting DC voltage for a variety of applications, including fast charging applications. For instance, the AC output from the wireless power system 100 may be converted to a DC output. Additionally, or alternatively, the AC input to the wireless power system 100 may be generated from a DC input.

Reducing emissions, increasing collective fuel economy, and decreasing the energy consumption across transportation systems are considered imperatives for national security and energy independence. To this end, passenger vehicle electrification is an aim for a large share of the national fleet. EVs have potential to reduce the petroleum consumption and greenhouse gas emissions with their inherently high efficiency as compared to conventional vehicles. The system level benefits of the electric vehicle ecosystem are further enhanced due to increased penetration of renewable energy sources feeding the national power grid. Furthermore, EVs significantly support the penetration of smart mobility technologies, most notably connected and autonomous vehicles. Range anxiety and extremely long charging times are considered the primary barriers against additional market penetration of electrified mobility solutions. For instance, not having the ability to refuel or recharge quickly is often cited as the primary reason for consumers' hesitation to use an EV. High power charging stations are required in order to be on the same level as conventional vehicle refueling practices.

Extreme fast charging (XFC) can be considered relevant to electromobility with a potential to significantly reduce charging times. For instance, with XFC (e.g., charge rates higher than or equal to 3 C), it is possible to reduce EV charging times to 10 minutes for a 50% increase in the battery state-of-charge (SOC). In the EV market, some original equipment manufacturers (OEMs) are manufacturing EVs with 20-30 kWh battery packs, such as Nissan Leaf, Mitsubishi-MiEV, Kia Soul EV, Karma Automotive Revero, BMW i3, Mercedes-Benz BlueZERO, Mercedes B250e, Chevrolet Spark, Hyundai Ioniq, Fiat 500e, Ford Focus Electric, and Volkswagen e-Golf. For these vehicles, a 3 C charge rate is about 100 kW maximum. On the other hand, some EVs have been entering the market with much larger battery capacities with increased range such as SF Motors, Tesla, Lucid Motors, and Faraday Future. For these vehicles, the battery capacity is about 100 kWh, and the 3 C charge rate corresponds to 300 kW charge power. Additionally, EVs are also being prepared to implement higher voltage battery packs, such as an 800 V battery pack used in the Porsche Mission-e, to reduce the charge current. Relatively low range EVs and the high range EVs that come with significantly higher battery capacities may be charged via a wireless power system 100 in accordance with one embodiment of the present disclosure.

Conventionally, an ABB Terra high power DC fast charger is available up to 350 kW, powered from a three-phase 400 $V_{AC}$ distribution grid. The DC output voltage range is 150 V to 920 V with maximum output current 375 A at 95% efficiency. The EVTEC espresso & charge is also powered from three-phase 400 $V_{AC}$, and can go up to 150 kW with the output voltage range from 170 V to 500 V and maximum output current 300 A at 93% efficiency. Also, the Tesla Super Charger can be powered from 200 $V_{AC}$ to 480 $V_{AC}$, and is rated 135 kW with output voltage range 50 V to 410 V and maximum output current 330 A at 92% efficiency. Recently, Tesla announced its latest 250 kW V3 supercharger to the public. At these high power levels, the DC cabling and connector construction is often too heavy to physically manipulate in plug-in EV chargers, making such DC cabling and connector constructions prohibitive for the consumer applications. Integrating liquid cooling for the cabling and/or connector construction is a possibility, but this type of cooling adds reliability concerns due to possible leaks, additional insulation, and periodic maintenance requirements at the charging stations. An automated plug system may help to overcome consumer issues with the weight of the heavy cabling and connector; however, automation for connecting DC cabling to a vehicle is not seen as being practical for commercialization due to the excessive number of independently moving joints, actuators, and servo motors, all of which reduce system reliability. A wireless power transfer (WPT) charging approach, such as a wireless power system 100, 300, 400, 400", 500, 600, 700 according to one embodiment of the present disclosure, may enable use of lighter cabling and connectors for charging EVs and autonomous vehicles relative to the conventional DC fast charger constructions.

It is noted that establishing wireless XFC systems involves several aspects, such as logistics and infrastructure requirements, design and deployment of the grid interface converters, grid power factor (PF) quality and total harmonic distortion (THD), availability of the power to integrate with renewable energy or energy storage systems (if needed), and distribution voltage level at the point of grid connection. For purposes of disclosure, the description of the wireless power system 100 according to one embodiment is focused on the power electronics hardware aspects; wireless power converter architectures and their component electrical characteristics, resonant compensation circuits, coupler transformer, component hardware, and thermal management. For instance, discussed herein in conjunction with a wireless power system 100, 300, 400, 400", 500, 600, 700 are one or more XFC systems 200, 200', 200", system low and medium voltage converters and series/parallel converter trade analysis, component level, passive and active power components, coupler transformer, EMF shielding techniques, gate drivers, and thermal analysis.

An XFC system 200, 200', 200" that incorporates a wireless power system 100, 300, 400, 400", 500, 600, 700 in accordance with one embodiment may allow EVs to achieve a 50% SOC increase in 10 minutes. About 300 kW may be covered by the wireless power system 100 in one embodiment is shown in Table II, alongside several conventional charging configurations. For purposes of comparison, time to charge for 200 miles may be based on the assumption that the vehicle energy consumption is 285 Wh per mile, and time to charge for 200 miles may be based on the output power level of the charger, without taking the charger efficiency into account.

TABLE II

|  | Level 1 | Level 2 | Tesla Super Charger | espresso& charge | Tesla V3 | XFC | ABB Terra |
|---|---|---|---|---|---|---|---|
| Power level (kW) | 1.4 | 7.2 | 135 | 150 | 250 | 300 | 350 |
| Time to charge for 200 miles (minutes) | 2143 | 417 | 22.2 | 20 | 12 | 10 | 8.6 |

As provided in Table II, an XFC system 200, 200', 200" may involve a higher power rating than the conventional charging methods, which results in a higher current rating. That high current level has the potential to make the XFC system 200, 200', 200" significantly inefficient due to high power losses; moreover, cost and reliability of an XFC system 200, 200', 200" has the potential to be less compared to conventional charging infrastructures with a central step-down line-frequency (LF) transformer. Parallel connection of converter structures may be provided in one embodiment for XFC in order to reduce the current within the XFC framework. In this parallel converter arrangement, the current can be divided between parallel connected converters to help reduce the power losses in the system. In one embodiment, a medium-voltage (MV) level source may be used and the converters can be connected to in series combinations to match the high voltage in the front-end. Due to the inversely proportional relationship between voltage and current under a constant power level, higher voltage levels result in lower current ratings with lower power losses, which are the dominant loss factor in the high-power applications.

An XFC system 200, 200', 200" may include a wireless power system 100, 300 in accordance with one embodiment, and may be capable of supplying power for charging at a high rate of charge. The wireless power system 100, 300, 500, 700 described herein may be unidirectional or bidirectional; it is noted that for purposes of disclosure, the XFC system 200, 200', 200" is described in conjunction with incorporating a unidirectional configuration of the wireless power system 100, 300, 500, 700.

The XFC system 200, 200', 200", in one embodiment, may include three-phase series/parallel converter structures, which are applicable for providing XFC at charge rates of 300 kW. The XFC capabilities are discussed herein relative to several aspects, including power losses and therefore component level electrical characteristics. Series and LCC resonant compensation circuits may be incorporated into the wireless power system 100 with three-phase couplers for various configurations, including star connections and delta (Y/Δ) connections.

Figure 12:
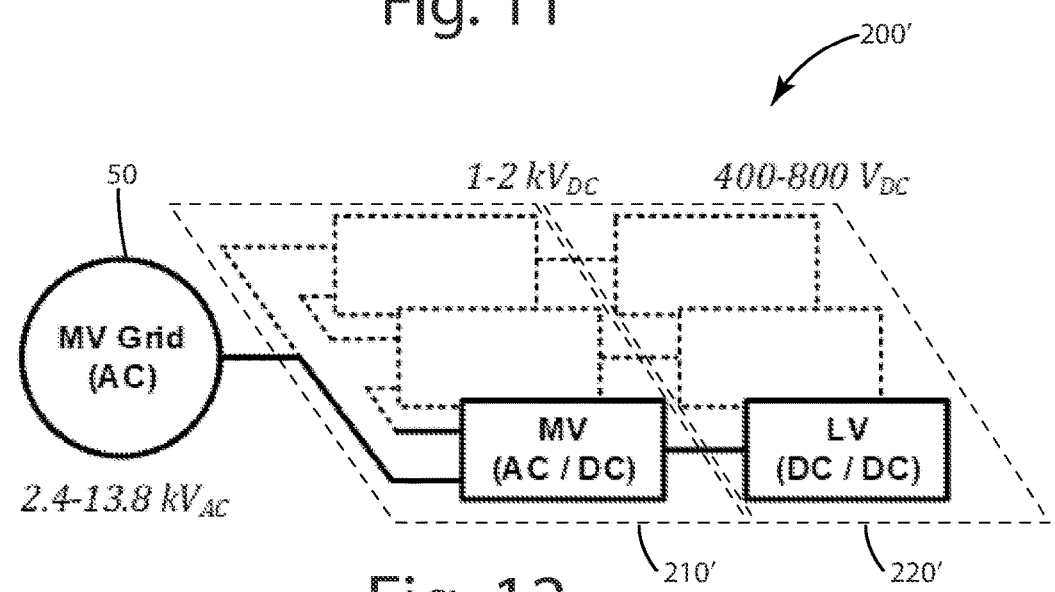
FIG. 12 shows a wireless power system having a series connection of AC-to-DC and DC-to-DC converters from a medium voltage (MV) grid connection in accordance with one embodiment.
Figure 13:
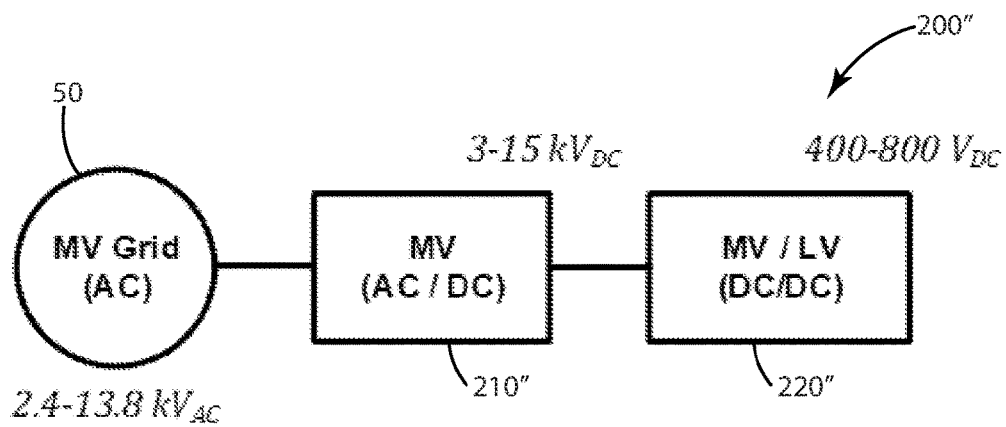
FIG. 13 shows a wireless power system having a direct AC-to-DC and DC-to-DC conversion from an MV grid connection in accordance with one embodiment.
Figure 14A:
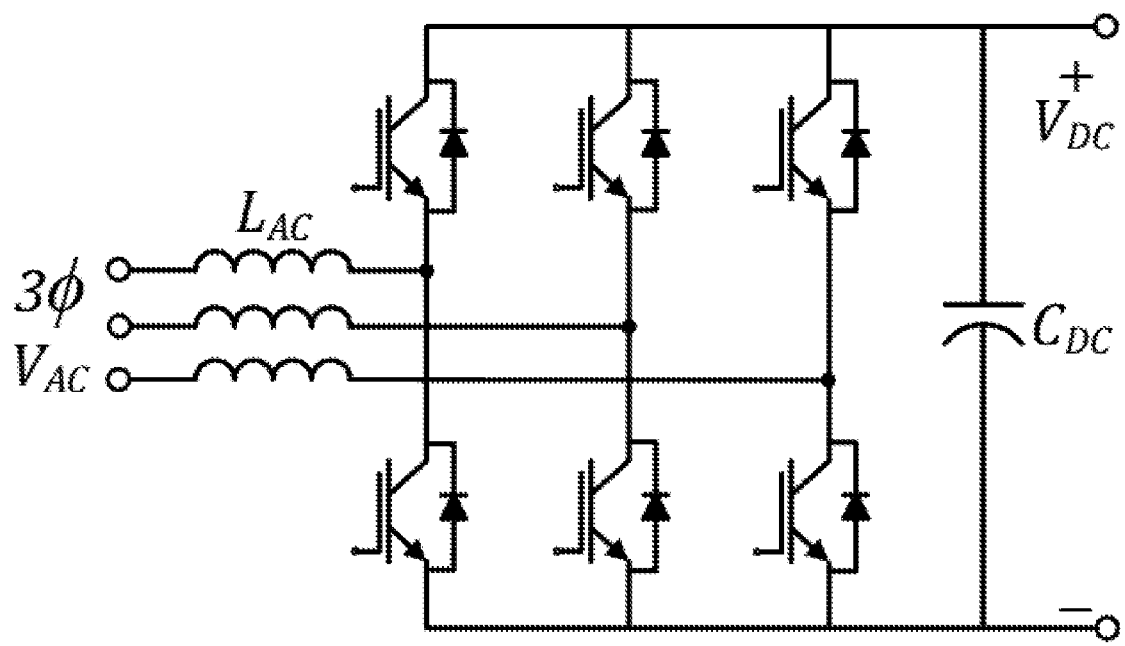
FIG. 14A shows a three-phase active PFC rectifier configuration in accordance with one embodiment.
Figure 14B:
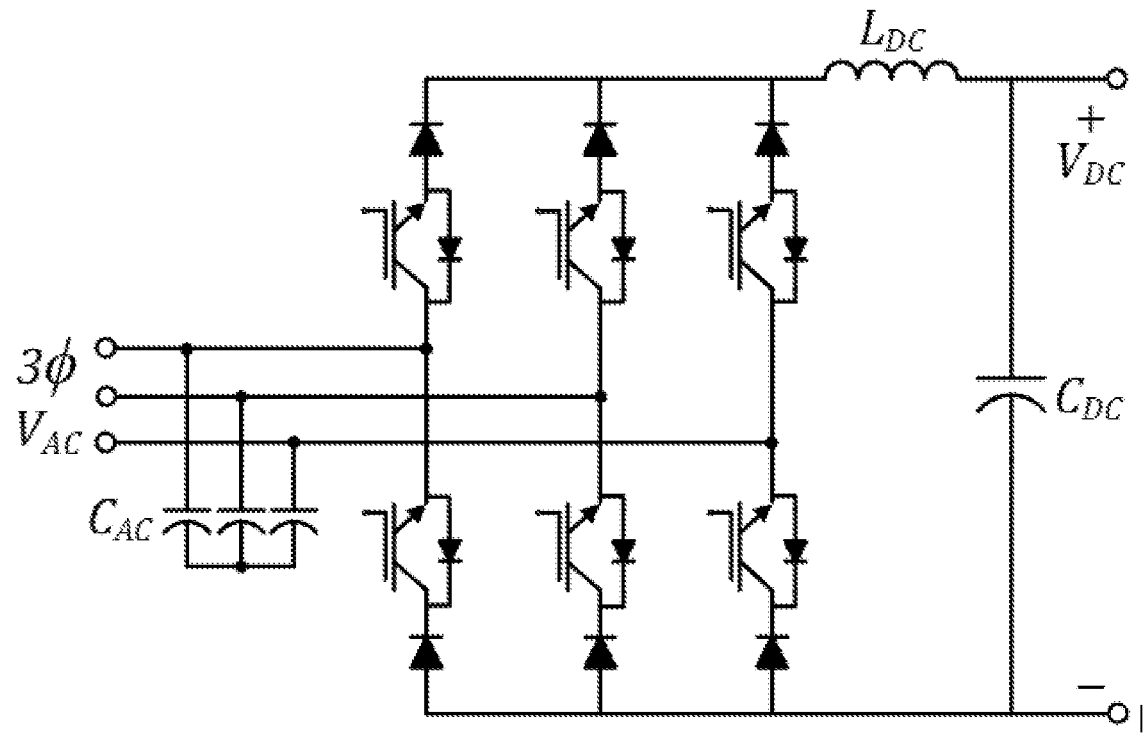
FIG. 14B shows a three-phase buck type PFC rectifier configuration in accordance with one embodiment.
Figure 14C:
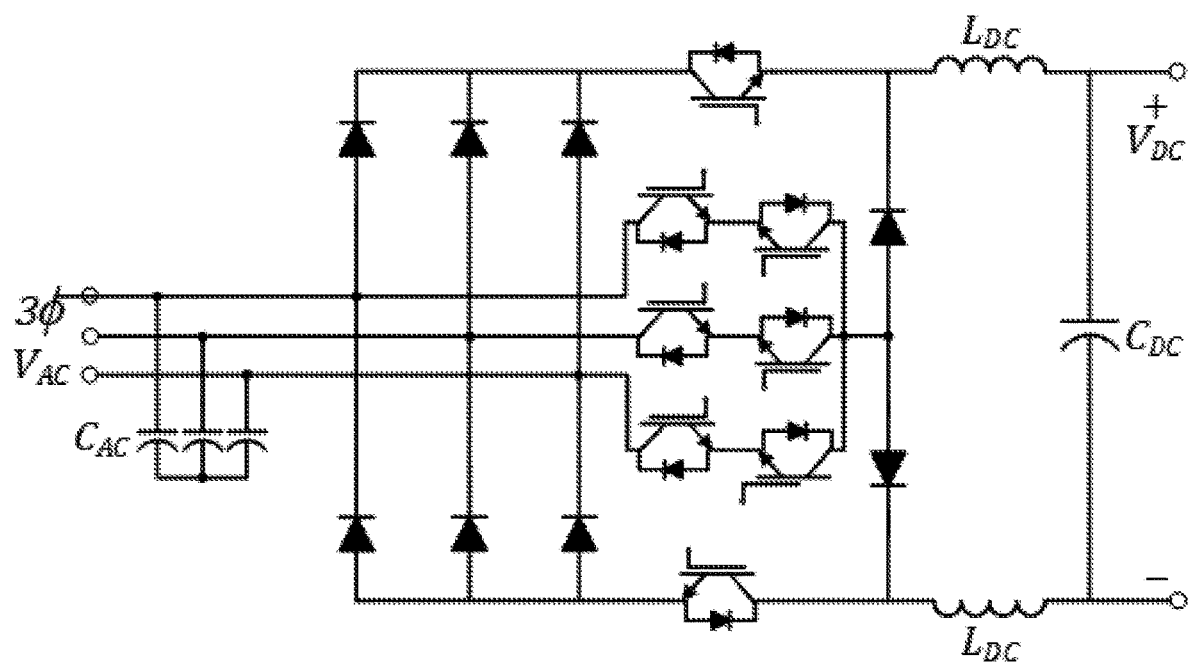
FIG. 14C shows a three-phase buck type Swiss PFC rectifier configuration in accordance with one embodiment.
Figure 14D:
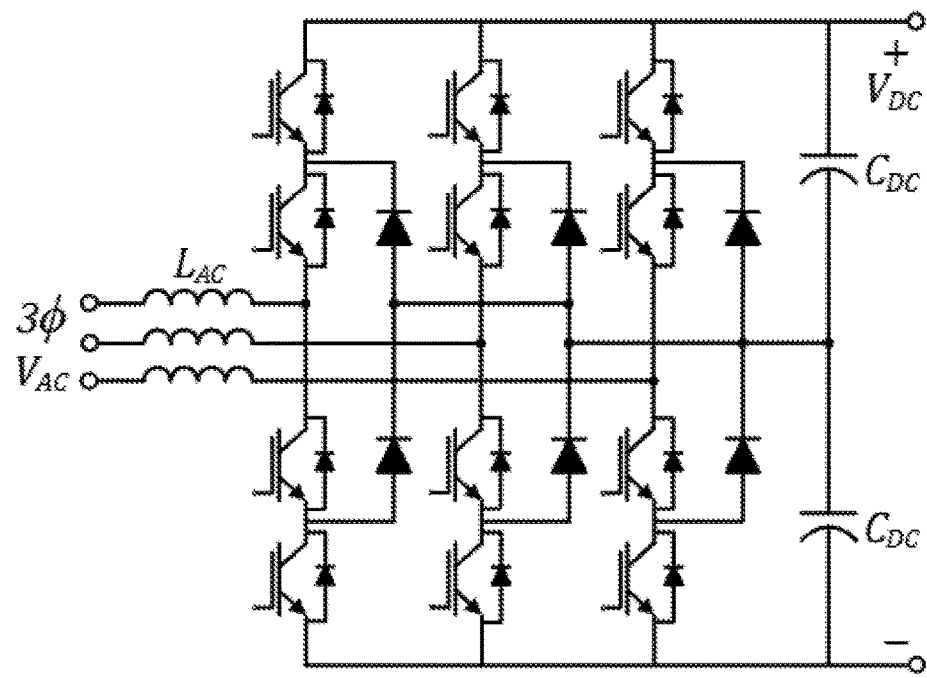
FIG. 14D shows a three-phase multilevel NPC PFC rectifier configuration in accordance with one embodiment.

A. Single or Three-Phase AC-to-DC and DC-to-DC Conversion, Optionally Bidirectional XFC systems 200, 200', 200" for high-power charger deployments are shown in the illustrated embodiments of FIGS. 11-13. The XFC systems 200, 200', 200" may be coupled to an source 50, such as grid power that is single phase or three-phase AC power, and may be operable to translate power from the source 50 to a form suitable for supplying power to a load (not shown in the illustrated embodiment).

Figure 11:
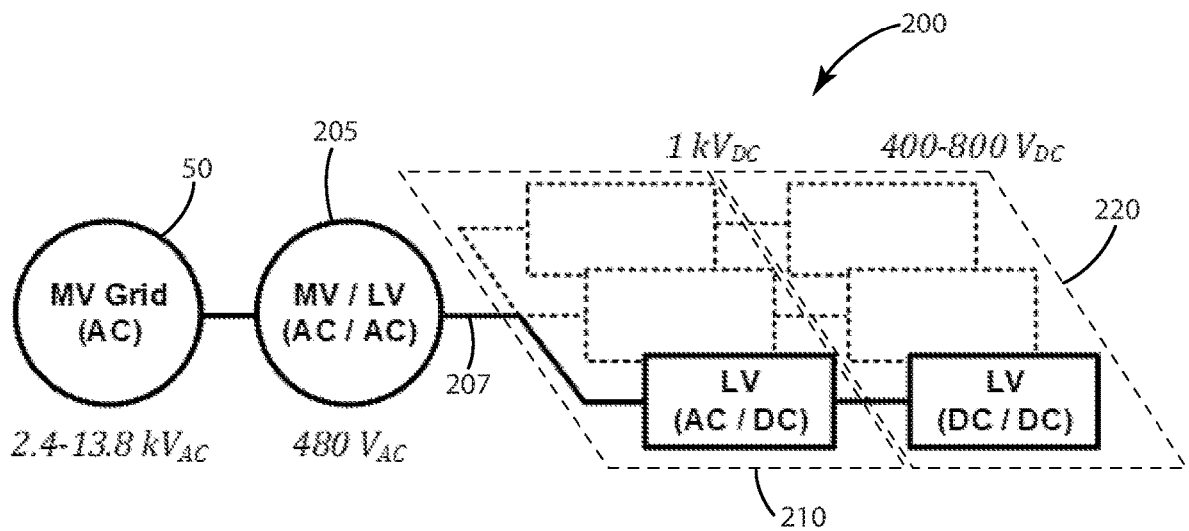
FIG. 11 shows a wireless power system having a parallel connection of AC-to-DC and DC-to-DC converters from a low frequency (LF) transformer in accordance with one embodiment.

In the illustrated embodiments, MV grid voltage to low voltage (LV) conversion by an LF transformer is shown in FIG. 11. Here, parallel connection of AC-to-DC converters 210 and DC-to-DC converters 220 may enable high power WPT charging to a load, such as an EV system. In the illustrated embodiments of FIGS. 12 and 13, alternative embodiments are provided with MV to LV conversion with the energy conversion being provided respectively through a series arrangement of AC-to-DC converters 210' and DC-to-DC converters 220', or directly via AC-to-DC converter 210 and DC-to-DC converter 220". In these topologies, WBG devices can be used for switching circuitry of the converters due to their high voltage ratings. In the illustrated embodiment of FIG. 13, high voltage rated WBG devices can be directly connected to the MV line for direct rectification of MV line.

It is noted that galvanic isolation can enhance safety of the XFC system 200, 200', 200" for users, and help to meet any requirements of the National Electric Code (NEC) and the recommendations of Underwriters Laboratory (UL). In one embodiment, MV grid interface solid state isolation is employed through one or more stages (e.g., one or more AC-to-DC converters and/or one or more DC-to-DC converters). As discussed herein, a high frequency WPT transformer of a wireless power system 100, 300, 400, 400", 500, 600, 700, while providing coupling between a grid side and a vehicle side, also provides galvanic isolation. However, with a direct power conversion stage without paralleling or cascading multiple units in a MV connected system, a WPT conversion stage or wireless power system 100, 300, 400, 500, 600, 700 in this configuration may provide high voltage to low voltage isolation. The XFC system 200, 200', 200" may be configured to avoid such high input voltage proximal to the vehicle. Based on IEEE C57.12.00-2010, minimum clearance is 6.5 inches between live parts of different phases for a 15-kV power transformer. As a result, high frequency isolation transformer may be useful before the coupler transformer to comply with clearance targets. Alternatively, MV-to-LV conversion may be provided through the coupler transformer to comply with clearance targets. Based on these and other constraints, series and parallel configurations of power converters are applicable for high power WPT charging systems.

In the illustrated embodiment of FIG. 11, the XFC system 200 may include an AC-to-DC converter 205 that utilizes an LF transformer to convert MV to LV at the front-end, which is followed by a low voltage (480 V 3-phase) conversion arrangement (e.g., AC-to-DC converters 210 and DC-to-DC converters 220). The two-level converters have advantage in their design and control simplicity, high robustness, and wide compatibility among charging systems. For high-power applications, the two-level converter topologies may have a maximum power limitation. Increasing the power ratings of the topologies, while maintaining positive properties, may be achieved by providing a parallel number of devices with phase-shifting multi-interleaved converters. This expansion provides many advantages such as making the system EMI and output filter design smaller.

The XFC system 200, 200', 200" may incorporate multi-level converter topologies for high input voltage and high-power applications. The multi-level converter topologies may generate multiple output voltage levels (greater than two-levels), centering around a neutral node voltage. Such a configuration may reduce blocking voltage stress for power devices (e.g., switching components), resulting in lower switching and conduction losses and reduced volume of passive components. In addition, multi-level converters may improve the power quality on the grid side with reduced total harmonic distortions. It is noted that multi-level topologies may increase complexity in control and hardware design.

Example two-level and multi-level three-phase AC-to-DC PFC converter topologies (also described herein as AC-to-DC PFC rectifiers) are shown in the illustrated embodiments of FIGS. 14A-D. A three-phase active PFC converter, a three-phase buck type PFC converter, a three-phase buck type Swiss converter, and a three-phase multi-level NPC PFC rectifier are shown respectively in FIGS. 14A, 14B, 14C, and 14D.

Two and three-level central DC-to-DC converters, including three-phase, neutral point-clamped (NPC), and flying-capacitor (FC) converters, may be provided in the XFC system 200, 200', 200" for high-power applications. For instance, a three-level NPC converter may be enable high-power applications with relatively high input voltage. It is noted that voltage imbalance can be a concern with NPC converters on the DC-bus with non-accurate midpoint voltage regulation. In some cases, an FC converter may provide enhanced voltage balancing; however, control circuitry for the FC converter may be more complex than the NPC converter. Such control circuitry may be provided to pre-charge capacitors. Moreover, the FC converter may utilize more capacitance compared to the NPC converter, so the FC converter can have a larger physical size and weight than the NPC converter. The cascaded three-phase converter may be simpler, but this type converter may rely on isolation in each phase that may prevent a three-phase WPT transformer star and delta connection.

Figure 15A:
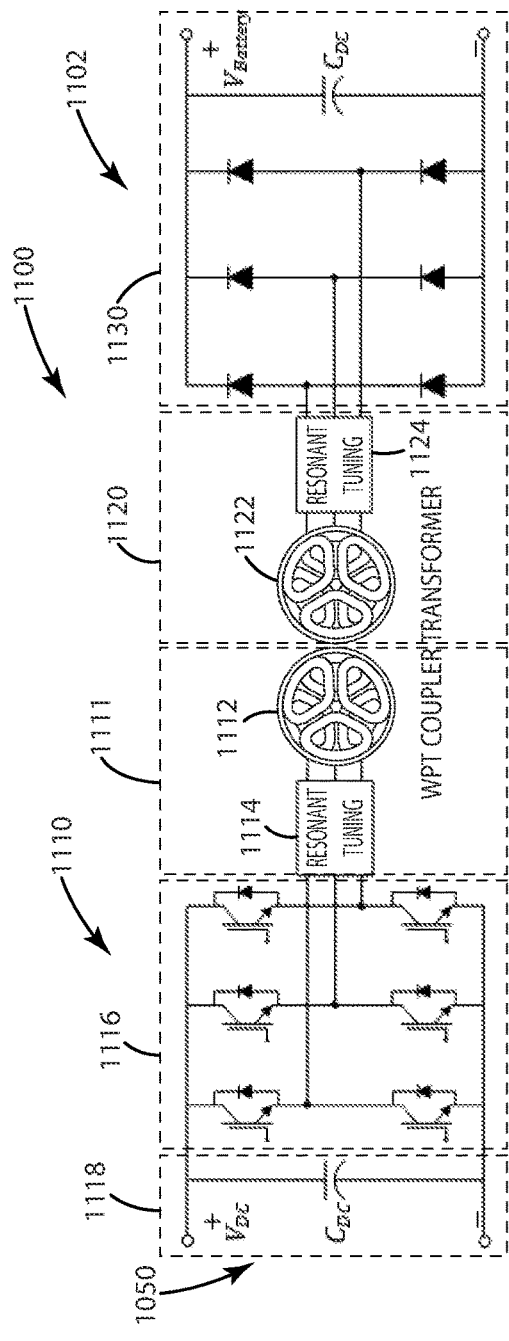
FIG. 15A shows a wireless power system in accordance with one embodiment, including a three-phase DC-to-DC converter configuration.
Figure 15B:
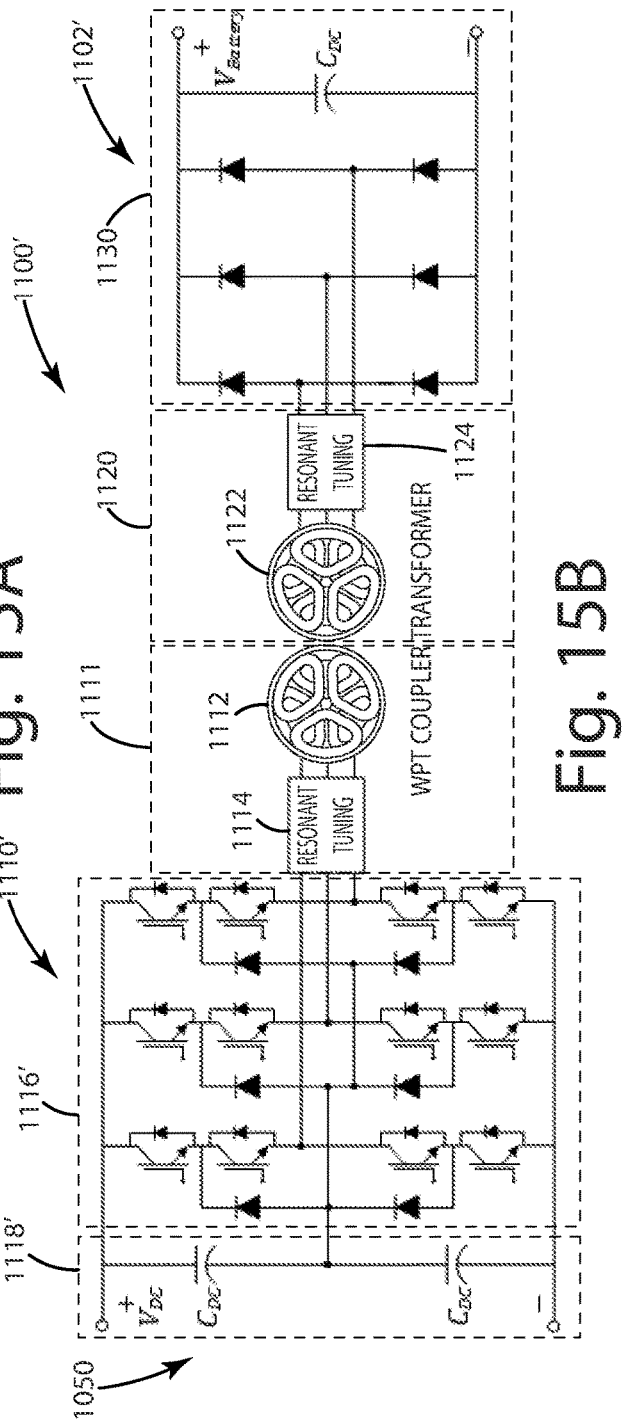
FIG. 15B shows a wireless power system in accordance with one embodiment, including a three-phase DC-to-DC converter configuration having high-frequency isolation stages.

As described herein, the XFC system 200, 200', 200" may incorporate a wireless power system 100, 300, 400, 400", 500, 600, 700, 1100, 1100' in accordance with one or more embodiments. For instance, any of the converters identified in conjunction with the XFC systems 200, 200', 200" may be replaced with a wireless power system 100, 300, 400, 400", 500, 600, 700, 1100, 1100' adapted to satisfy target operating parameters for the converter. As another example, DC-to-DC converters that enable conversion for high-power three-phase power are depicted in the illustrated embodiments of FIGS. 15A-B, which respectively depict a three-phase DC-to-DC wireless power converter and a three-level NPC type DC-to-DC converter with high frequency isolation stages.

B. Series/Parallel Three-Phase Wireless Power System

A wireless power system 100, 300, 400, 400", 500, 600, 700, 1100, 1100' in accordance with one embodiment may be incorporated into a three-phase WPT system 200, 200', 200", with "input series/output parallel" and "input parallel/output parallel" circuits. The three-phase WPT system 200, 200', 200" may include series resonant tuning circuits and/or LCC resonant tuning circuits 1114, 1124. Furthermore, three-phase couplers star (Y) and delta (Δ) connection types may be provided with voltage and current amplitudes as discussed herein.

As noted, the three-phase WPT system 200, 200', 200" may incorporate a wireless power system in accordance with one or more embodiments described herein. For instance, the three-phase WPT system 200, 200', 200" may include a wireless power system 1100, 1100' described and shown in conjunction with the illustrated embodiment of FIG. 15A-B.

1) Single or Three-Phase DC-to-DC Conversion, Optionally Bidirectional

The wireless power system 1100, 1100', as described herein, is similar in many respects to the wireless power system 100, including a wireless power supply 1110, 1110' on the primary side and a remote device 1102 on the secondary side of a coupling between a transmitter 1112 and a receiver 1122. The wireless power system 1100, 1100' in the illustrated embodiments of FIGS. 15A-B may be configured for DC-to-DC conversion. As described and shown, the wireless power system 1100, 1100' is configured to one-way power transfer in a single phase manner or in a three-phase manner or multi-phase manner from a wireless power supply 1110, 1110' to a wireless power receiver 1120, 1120'; however, it is to be understood that the wireless power system 1100, 1100' may be configured for two-way power transfer between the wireless power supply 1110, 1110' and the wireless power receiver 1120, 1120'. In this configuration, the wireless power receiver 1120, 1120' may include receiver switching circuitry similar to the switching circuitry 1116, 1116' capable of driving a receiver 1122, 1122' to transmit power wirelessly to the transmitter 1112, 1112'.

The wireless power supply 1110, 1110' may be operable to receive power from a source 1050 (e.g., a DC power source), and may include switching circuitry 1116, 1116' operable to supply power to the transmitter 1112 in a manner that enables the transmitter 1112 to transfer power wirelessly to the receiver 1122. The receiver 1122 may be coupled to a load 1130, such as a battery 134 of a vehicle. It is noted that the wireless power system 1100, 1100' may vary from application to application, and that any of the one or more embodiments of a wireless power supply system described herein may be provided in place of the wireless power system described in conjunction with any of the systems (e.g., the systems 200, 200', 1200, 1200' 1400, 1500, 1600, 1700) described herein.

The wireless power system 1100, 1100' described in conjunction with the illustrated embodiments includes a three-phase coupler formed by the transmitter 1112, 1112' and the receiver 1122, 1122'. It is to be understood that a single-phase or multi-phase coupler may be provided in place of this three-phase coupler in accordance with one or more embodiments described herein.

The switching circuitry 1116, 1116' of the wireless power supply 1110, 1110' may be similar to the switching circuitry 116, 316 described in conjunction with the wireless power systems 100, 300. The control methodology of the switching circuitry 1116, 1116' may also be similar to the control methodology for the switching circuitry 116, 316, including modulating the source 1050 (e.g., a DC source) with a high frequency carrier signal.

2) Series and Parallel Three-Phase WPT System

Figure 16:
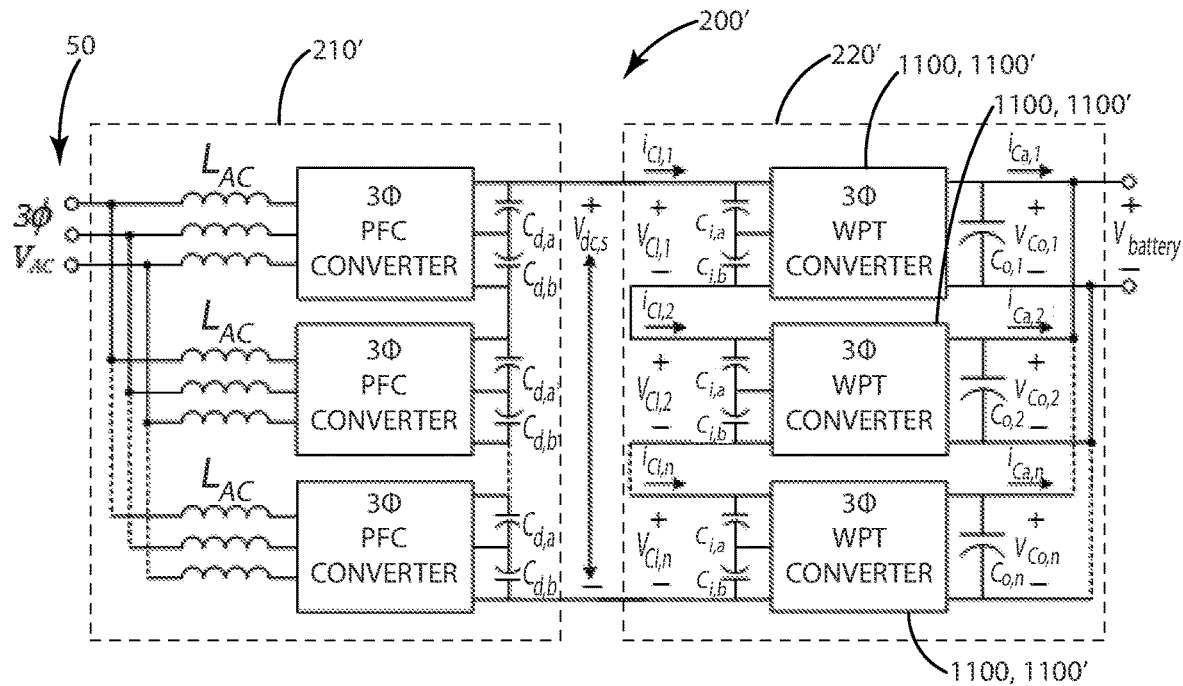
FIG. 16 shows a three-phase AC-to-DC converter and DC-to-DC converter with inputs parallel and output parallel configuration in accordance with one embodiment.
Figure 17:
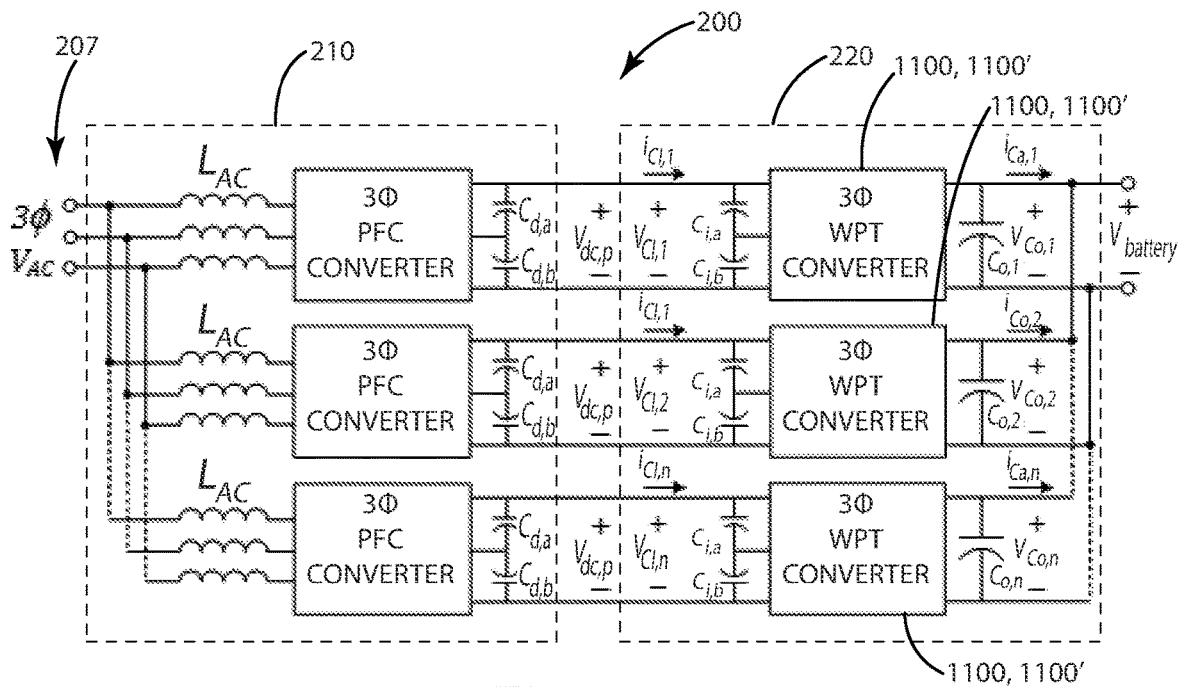
FIG. 17 shows a three-phase AC-to-DC converter and DC-to-DC converter with inputs series (cascaded) and input PFCs series (cascaded) output parallel configuration in accordance with one embodiment.

"Input series/output parallel" and "input parallel/output parallel" three-phase connection configurations are shown in the three-phase WPT system 200' in the illustrated embodiment of FIG. 16. As can be seen in the illustrated embodiment of FIG. 16, based on the output of PFC voltage amplitude, DC bus voltage may be divided into the number of series connected converters. With this connection arrangement, input DC voltage amplitude can be high and proportional to the input DC amplitude of each of the wireless power supply systems 1100, 1100' (in the form of a converter). For an input parallel connection, as depicted in the illustrated embodiment of FIG. 17, the input current can be shared through parallel connection of the wireless power supply systems 1100, 1100' (in the form of three-phase converters). For purposes of disclosure, the three-phase WPT system 200 in the illustrated embodiment is shown separate from components depicted in the illustrated embodiment of FIG. 11 with the output 207 of an AC-to-AC converter 205 coupled to the input of the parallel PFC converters (or parallel AC-to-DC converters 210).

The series system total input voltage $V_{dc,s}$, current $i_{dc,s}$, and power $P_{dc,s}$ equations can be written as, $$V_{dc,s} = \Sigma_{u=1}^{n} V_{Ci,1,\ldots,u} \tag{68}$$

$$i_{dc,s} = i_{Ci,1,\ldots,n} \tag{69}$$

$$P_{dc,s} = V_{dc,s} i_{dc,s} \tag{70}$$

The parallel system input voltage $V_{dc,p}$, total current $i_{dc,p}$, and power $P_{dc,p}$ calculations can be described as, $$V_{dc,p} = v_{Ci,1,\ldots,n} \tag{71}$$

$$i_{dc,p} = \Sigma_{u=1}^{n} i_{Ci,u} \tag{72}$$

$$P_{dc,p} = V_{dc,p} i_{dc,p} \tag{73}$$

The parallel system output battery voltage $V_{battery}$, total current $i_{battery}$, and power $P_{battey}$ equations can be given as, $$V_{battery} = v_{Co,1,\ldots,n} \tag{74}$$

$$i_{battery} = \Sigma_{u=1}^{n} i_{Co,u} \tag{75}$$

$$P_{battery} = V_{battery} i_{battery} \tag{76}$$

3) WPT Three-Phase Coupler Star and Delta Connections

The wireless power supply system 1100, 1100', in one embodiment, may include a transmitter 1112 and a receiver 1122 configured in a variety of ways, depending on the application. Example configurations include star and/or delta connections, such as the connections depicted in the illustrated embodiment of FIG. 18-22 with the star configuration designated 90 and the delta configuration designated 92.

Figure 18:
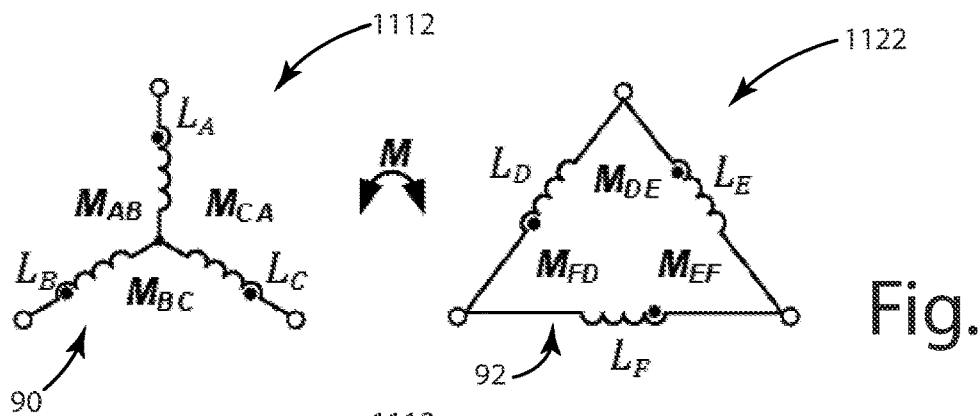
FIG. 18 shows a mutually coupled three-phase coupler Y and Δ configurations in accordance with one embodiment.
Figure 19:
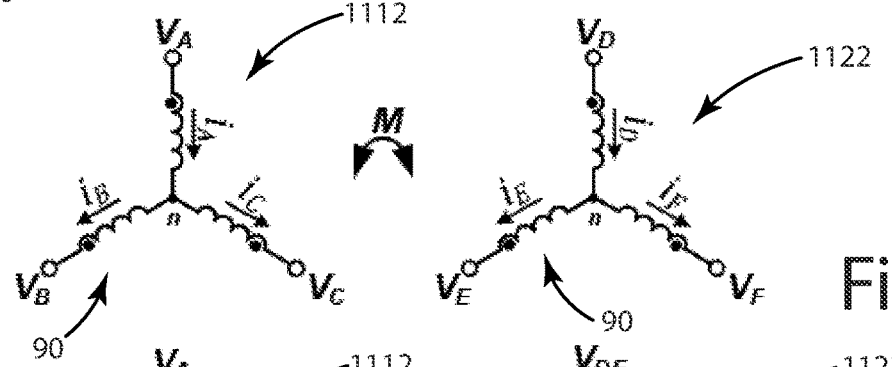
FIG. 19 shows a mutually coupled three-phase coupler Y/Y configuration in accordance with one embodiment.
Figure 20:
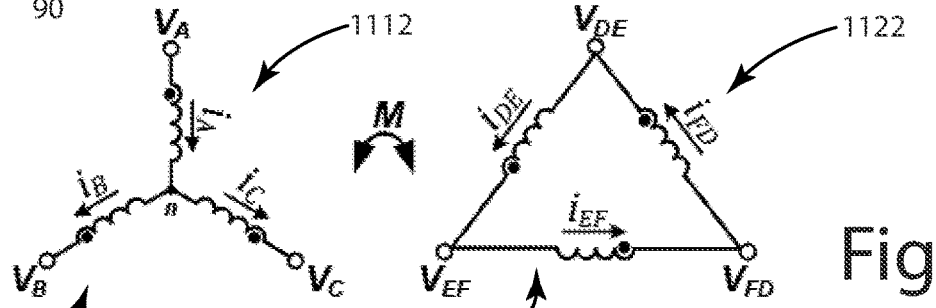
FIG. 20 shows a mutually coupled three-phase coupler Y/Δ configuration in accordance with one embodiment.
Figure 21:
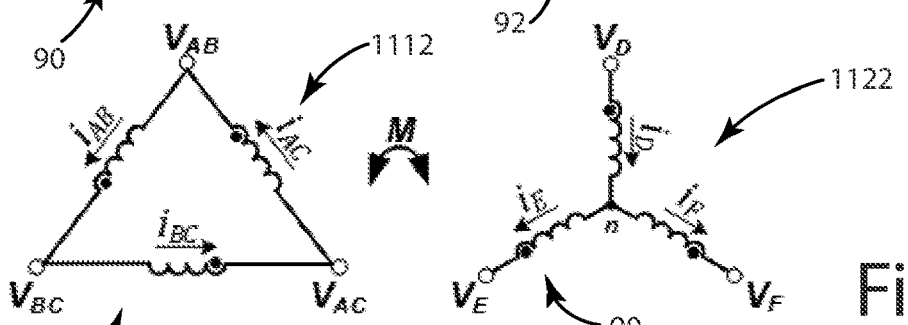
FIG. 21 shows a mutually coupled three-phase coupler Δ/Y configuration in accordance with one embodiment.
Figure 22:
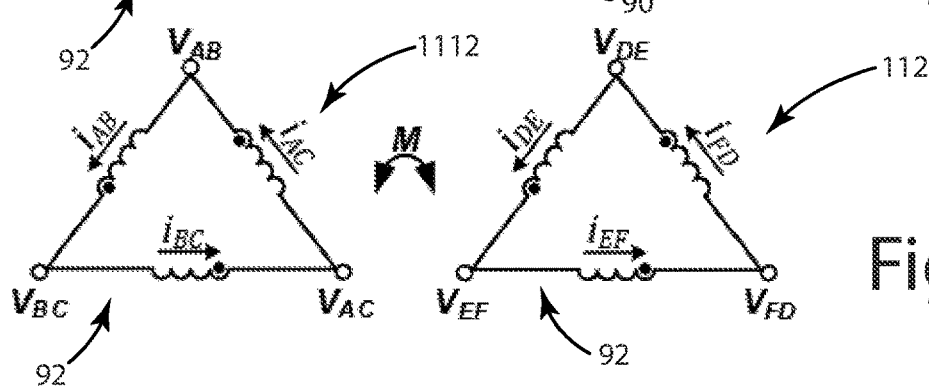
FIG. 22 shows a mutually coupled three-phase coupler Δ/Δ configuration in accordance with one embodiment.
Figure 23:
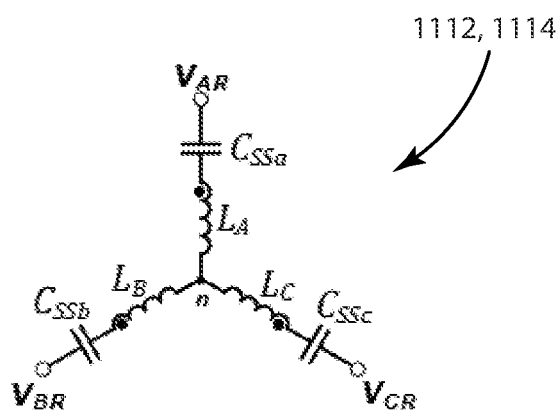
FIG. 23 shows a three-phase resonant compensation circuit with series-series tuning for a series capacitor and coupling inductor star.
Figure 24:
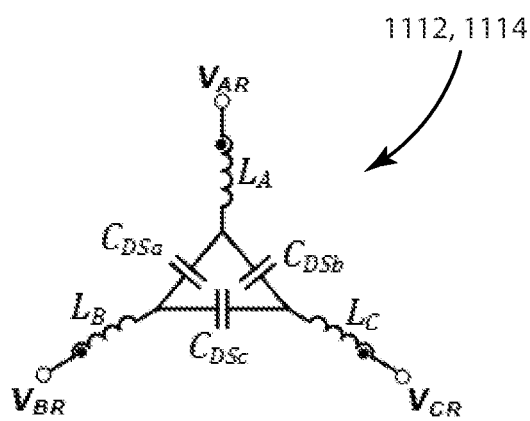
FIG. 24 shows a three-phase resonant compensation circuit with series-series tuning for a series capacitor delta and coupling inductor star.
Figure 25:
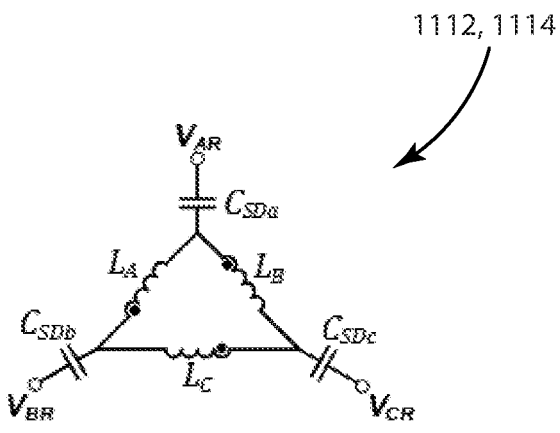
FIG. 25 shows a three-phase resonant compensation circuit with series-series tuning for a series capacitor star and coupling inductor delta.
Figure 26:
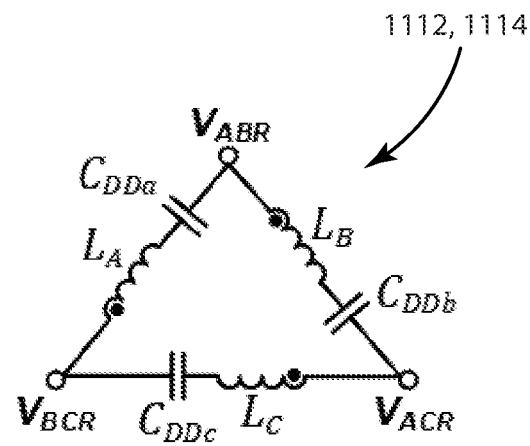
FIG. 26 shows a three-phase resonant compensation circuit with series-series tuning for a series capacitor and coupling inductor delta.
Figure 27:
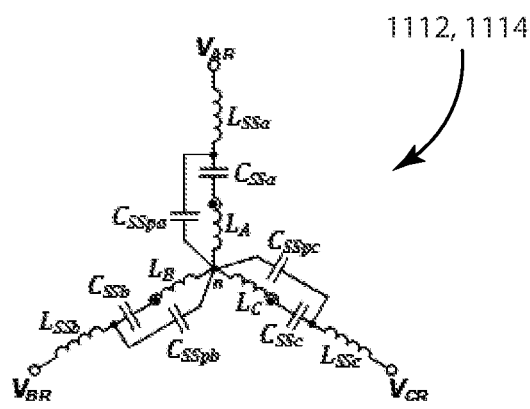
FIG. 27 shows a three-phase resonant compensation circuit with LCC-LCC tuning for series and parallel capacitors and coupling inductor star.
Figure 28:
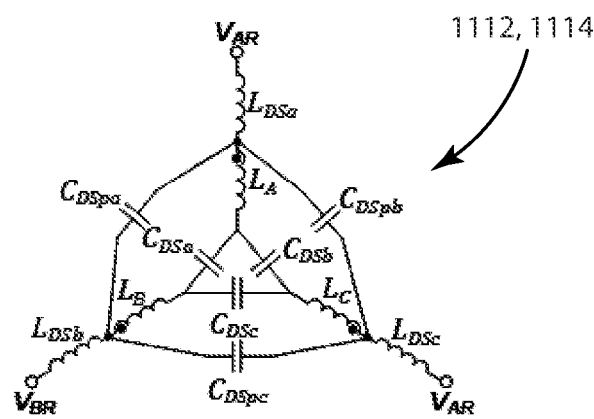
FIG. 28 shows a three-phase resonant compensation circuit with LCC-LCC tuning for series and parallel capacitors delta and coupling inductor star.
Figure 29:
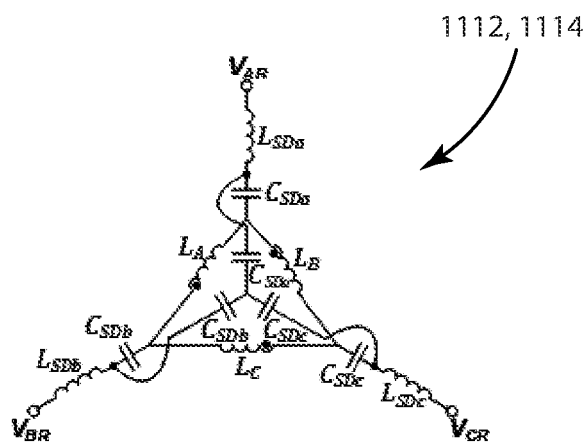
FIG. 29 shows a three-phase resonant compensation circuit with LCC-LCC tuning for series and parallel capacitors start and coupling inductor delta.
Figure 30:
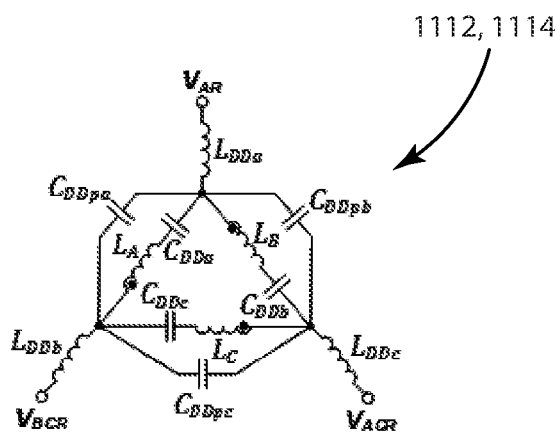
FIG. 30 shows a three-phase resonant compensation circuit with LCC-LCC tuning for series and parallel capacitors and coupling inductor delta.

With respect to the configuration of the transmitter 1112 and the receiver 1122 in the illustrated embodiment of FIG. 18, mutually coupled three-phase coupler circuit diagrams are presented with inductance matrix for star and delta connections 90, 92.

The equivalent inductances $L_P$ and $L_S$ can be characterized from inductance matrix as shown in below, $$L_P = \begin{bmatrix} L_A & M_{AB} & M_{CA} \\ M_{AB} & L_B & M_{BC} \\ M_{CA} & M_{BC} & L_C \end{bmatrix} \tag{77}$$

$$L_S = \begin{bmatrix} L_D & M_{DE} & M_{FD} \\ M_{DE} & L_E & M_{EF} \\ M_{FD} & M_{EF} & L_F \end{bmatrix} \tag{78}$$

Three-phase coupler combinations, star/star, star/delta, delta/star, and delta/delta are provided respectively for a three-phase WPT system 200, 200', 200" in the illustrated embodiments of FIGS. 18-22 and/or the three-phase coupler arrangement provided by the wireless power system 1100, 1100'.

The coupler primary/secondary phase voltages $V_{phase\_p}/V_{phase\_s}$ and currents $i_{phase\_p}/i_{phase\_s}$ are also expressed considering input and output phase voltages and currents. For the star/star connected coupler transformer, primary and secondary side voltage and current equations can be shown as, $$V_{phase\_p} = \sqrt{3} V_A \tag{79}$$

$$i_{phase\_p} = i_A \tag{80}$$

$$V_{phase\_s} = \sqrt{3} V_D \tag{81}$$

$$i_{phase\_s} = i_D \tag{82}$$

$$V_{phase\_p} = V_{phase\_s}\sqrt{L_S/L_P} = \sqrt{3} V_D\sqrt{L_S/L_P} \tag{83}$$

$$i_{phase\_p} = i_{phase\_s}\sqrt{L_P/L_S} = i_D\sqrt{L_P/L_S} \tag{84}$$

The primary and secondary side voltage and current equations for the star/delta coupler as, $$V_{phase\_p} = \sqrt{3} V_A \tag{85}$$

$$i_{phase\_p} = i_A \tag{86}$$

$$V_{phase\_s} = V_{DE} \tag{87}$$

$$i_{phase\_s} = \sqrt{3} i_{DE} \tag{88}$$

$$V_{phase\_p} = \frac{V_{phase\_s}}{\sqrt{3}}\sqrt{L_S/L_P} = \frac{V_{DE}}{\sqrt{3}}\sqrt{L_S/L_P} \tag{89}$$

$$i_{phase\_p} = \sqrt{3} i_{phase\_s}\sqrt{L_P/L_S} = 3 i_{DE} L_P/L_S \tag{90}$$

The primary and secondary side voltage and current equations for the delta/star coupler design can be written as, $$V_{phase\_p} = V_{AB} \tag{91}$$

$$i_{phase\_p} = \sqrt{3} i_{AB} \tag{92}$$

$$V_{phase\_s} = \sqrt{3} V_D \tag{93}$$

$$i_{phase\_s} = i_D \tag{94}$$

$$V_{phase\_p} = \sqrt{3} V_{phase\_s}\sqrt{L_S/L_P} = \sqrt{3} V_D\sqrt{L_S/L_P} \tag{95}$$

$$i_{phase\_p} = \frac{i_{phase\_s}}{\sqrt{3}}\sqrt{L_P/L_S} = \frac{i_D}{\sqrt{3}}\sqrt{L_P/L_S} \tag{96}$$

For the delta/delta coupler design, the primary and secondary side voltage and current equations as, $$V_{phase\_p} = V_{AB} \tag{97}$$

$$i_{phase\_p} = \sqrt{3} i_{AB} \tag{98}$$

$$V_{phase\_s} = V_{DE} \tag{99}$$

$$i_{phase\_s} = \sqrt{3} i_{DE} \tag{100}$$

$$V_{phase\_p} = V_{phase\_s}\sqrt{L_S/L_P} = V_{DE}\sqrt{L_S/L_P} \tag{101}$$

$$i_{phase\_p} = i_{phase\_s}\sqrt{L_P/L_S} = \sqrt{3} i_{DE}\sqrt{L_P/L_S} \tag{102}$$

Based on the equations provided, delta/delta connection provides less current stress in the transformer primary and secondary windings.

4) Series and LCC Resonant Compensation Circuits

The resonant tuning circuitry 1114, 1124 connected respectively to the transmitter 1112 and the receiver 1122 may vary from application to application. Non-limiting example configurations for a transmitter 1112 and resonant tuning circuitry 1114 are provided in the illustrated embodiments of FIGS. 23-30. It is noted that these same configurations may be utilized for the receiver 1122 and associated resonant tuning circuitry 1124.

In other words, three-phase series and LCC compensation circuit schematics are given for the three-phase WPT coupler star and delta connections in FIGS. 23-30. Circuit resonant compensation calculations are also presented. As seen from the results, the system resonant compensation may depend on the transformer connection types, which can change the system voltage/current gain margins.

For series resonant compensation circuits, shown in one or more of the illustrated embodiments of FIGS. 23-26, series resonant capacitors $C_{SS}$, $C_{DS}$, $C_{SD}$, $C_{DD}$ can be calculated for star/star, star/delta, delta/star, and delta/delta as, $$C_{SSa} = C_{SSb} = C_{SSc} = \frac{1}{4\pi^2 f_{sw}^2 L_P}, \text{ for } Y-Y \tag{103}$$

$$C_{DSa} = C_{DSb} = C_{DSc} = \frac{1}{12\pi^2 f_{sw}^2 L_P}, \text{ for } Y-\Delta \tag{104}$$

$$C_{SDa} = C_{SDb} = C_{SDc} = \frac{3}{4\pi^2 f_{sw}^2 L_P}, \text{ for } \Delta-Y \tag{105}$$

$$C_{DDa} = C_{DDb} = C_{DDc} = \frac{1}{4\pi^2 f_{sw}^2 L_P}, \text{ for } \Delta-\Delta \tag{106}$$

For LCC resonant compensation circuits, shown in one or more of the illustrated embodiments of FIGS. 27-30, series resonant capacitors $C_{SS}$, $C_{DS}$, $C_{SD}$, $C_{DD}$, parallel resonant capacitors $C_{SSp}$, $C_{DSp}$, $C_{SDp}$, $C_{DDp}$, and series inductors $L_{SS}$, $L_{DS}$, $L_{SD}$, $L_{DD}$ can be calculated for star/star, star/delta, delta/star, and delta/delta as, $$C_{SSa} = C_{SSb} = C_{SSb} = \frac{1}{4\pi^2 f_{sw}^2 (L_P - L_{SSa})} \tag{107}$$

$$C_{SSpa} = C_{SSpb} = C_{SSpc} = \frac{1}{4\pi^2 f_{sw}^2 L_{SSa}}, \text{ for } Y$$

$$L_{SSa} = L_{SSb} = L_{SSc} = \frac{2V_{in}}{2\sqrt{2}\pi^2 f_{sw} i_{AR}}$$

$$C_{DSa} = C_{DSb} = C_{DSc} = \frac{1}{4\pi^2 f_{sw}^2 (3L_P - 3L_{DSa})} \tag{108}$$

$$C_{DSpa} = C_{DSpb} = C_{DSpc} = \frac{1}{12\pi^2 f_{sw}^2 L_{DSa}}, \text{ for } Y-\Delta$$

$$L_{DSa} = L_{DSb} = L_{DSc} = \frac{2V_{in}}{2\sqrt{2}\pi^2 f_{sw} i_{AR}}$$

$$C_{SDa} = C_{SDb} = C_{SDc} = \frac{1}{4\pi^2 f_{sw}^2 \left(\frac{L_P}{3} - L_{SDa}\right)} \tag{109}$$

$$C_{SDpa} = C_{SDpb} = C_{SDpc} = \frac{1}{4\pi^2 f_{sw}^2 L_{SDa}}, \text{ for } \Delta-Y$$

$$L_{SDa} = L_{SDb} = L_{SDc} = \frac{2V_{in}}{2\sqrt{2}\pi^2 f_{sw} i_{AR}}$$

$$C_{DDa} = C_{DDb} = C_{DDc} = \frac{1}{4\pi^2 f_{sw}^2 (L_P - 3L_{DDa})} \tag{110}$$

-continued $$C_{DDpa} = C_{DDpb} = C_{DDpc} = \frac{1}{12\pi^2 f_{sw} L_{DDa}}, \text{ for } \Delta - \Delta$$

$$L_{DDa} = L_{DDb} = L_{DDc} = \frac{2V_{in}}{2\sqrt{2}\pi^2 f_{sw} i_{AR}}$$

C. Tradeoff Analysis

Figure 31A:
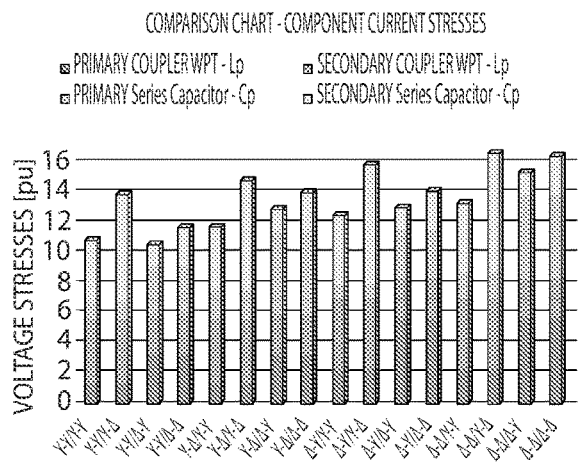
FIG. 31A shows voltage stresses for a three-phase converter with series-series tuning for three-phase coupler star and delta configurations.
Figure 31B:
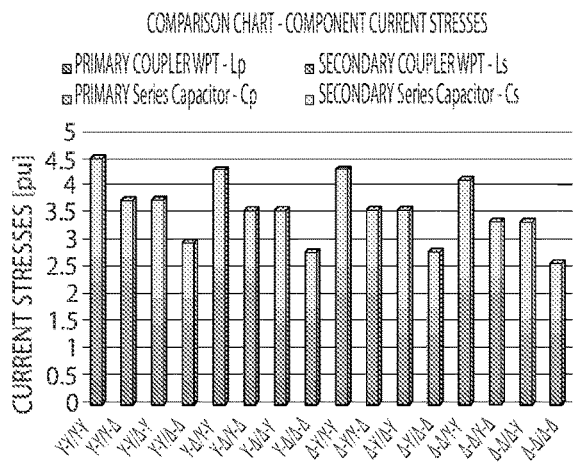
FIG. 31B shows current stresses for a three-phase converter with series-series tuning for three-phase coupler star and delta configurations.
Figure 32A:
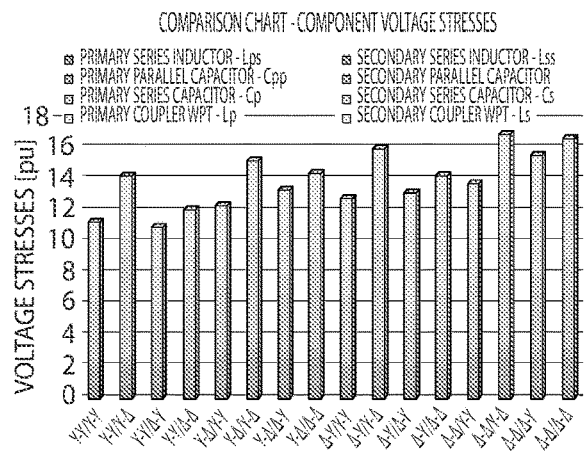
FIG. 32A shows voltage stresses for a three-phase converter with LCC-LCC tuning for three-phase coupler star and delta configurations.
Figure 32B:
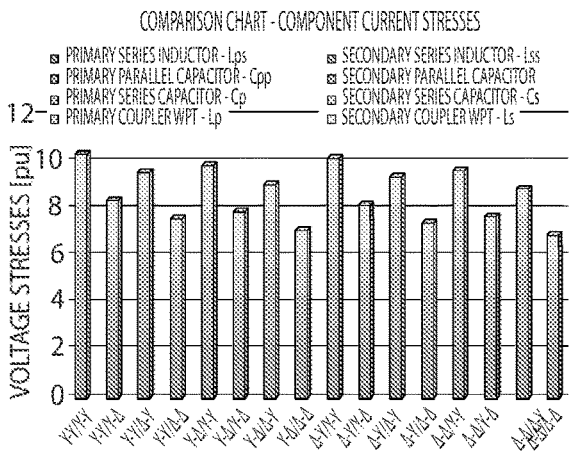
FIG. 32B shows current stresses for a three-phase converter with LCC-LCC tuning for three-phase coupler star and delta configurations.
Figure 33A:
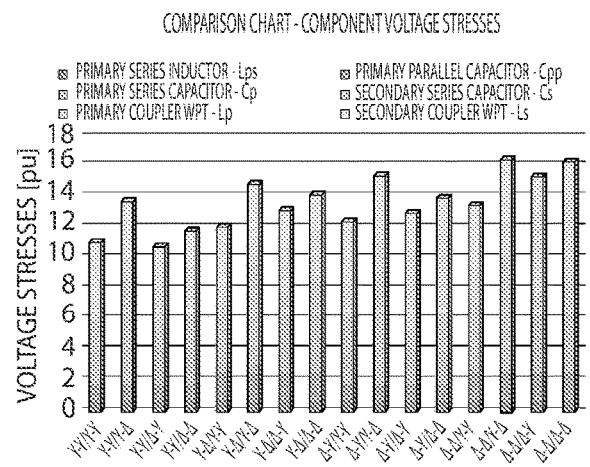
FIG. 33A shows voltage stresses for a three-phase converter with LCC-LCC tuning for three-phase coupler star and delta configurations.
Figure 33B:
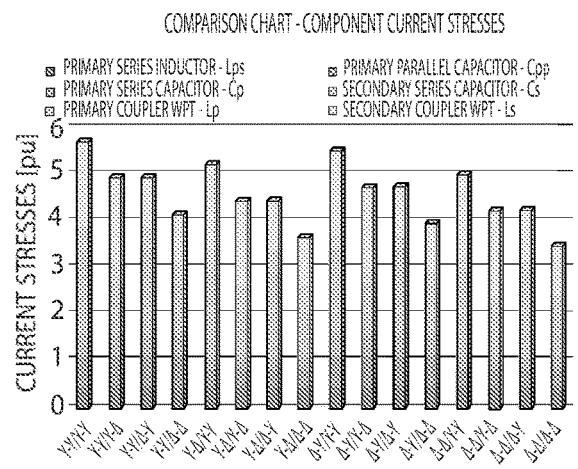
FIG. 33B shows current stresses for a three-phase converter with LCC-series tuning for three-phase coupler star and delta configurations.

A three-phase WPT system 200, 200', 200" adapted for powering a charger for an EV has been simulated with coupler star and delta combinations for series-series, LCC-LCC, and LCC-series tuning with results depicted in FIGS. 31-33, respectively. A system tradeoff analysis is carried out considering the voltage and current stresses in the passive components. The system input voltage is 1600 V for the multi-level WPT converters 1100, 1100' as described in conjunction with FIG. 3, respectively. Considering a typical vehicle battery voltage, the system output voltage is selected 400 V at 100 kW load. Furthermore, figures for voltage and current stresses are shown in per-unit (pu) for 1000 V and 100 A bases, respectively.

In the illustrated embodiments of FIGS. 31-33, $C_P$, $C_S$, $L_P$, $L_S$ refer to the primary-side series tuning capacitor, secondary-side resonant series tuning capacitor, primary-side coupler, and secondary-side coupler, respectively. Also, $L_{PS}$, $L_{SS}$, $C_{PP}$, $C_{PS}$ indicate the primary side series inductor, secondary side series inductor, primary side parallel tuning capacitor, and secondary side parallel tuning inductor. Here, voltage stress indicates the voltage across these components and current stress indicates the current through these components.

As seen from the tradeoff analysis among the configurations simulated and tested, a delta/delta connection of a three-phase converter provides the best current stresses in the passive components for series-series, LCC-LCC, and LCC-series resonant tuning circuit. However, the total current stresses in LCC-LCC tuning parameters are higher than the series-series and LCC-series tuning circuits. Although, a series-series tuning configuration has relatively lower voltage stresses considering all total components while the three-phase coupler is configured in delta/delta connection, each component voltage stress is higher than LCC-LCC and LCC-series (primary) tuning compensation. However, the voltage stresses across the passive components are in relatively acceptable voltage ranges in series-series compensation. As seen from the results, the series-series tuning circuit shows better performance considering acceptable voltage stresses in each component and current stresses in comparison. Although, LCC-LCC tuning provides the same current stresses in the three-phase series capacitor and comparing series tuning, the series inductor connected to the switch node and the parallel capacitor in the primary and secondary side terminals have relatively higher current stresses. However, the voltage stresses are relatively lower compared to other passive components. Considering these concerns in LCC-LCC compensation, LCC-series tuning provides less current stress in the secondary side as series-series tuning. However, the compensation circuit may suffer high current stresses in the primary side components. The advantage of LCC-series tuning is that the current stress in the secondary side is relatively lower compared to LCC-LCC. According to this analysis, in terms of component stress results, the series-series tuned delta/delta coupler converter topology appears to be useful. The LCC-series tuning circuit has advantage in use and can be considered a reasonable option for the EV charger systems.

D. Alternate Converter Configuration

The XFC charger system 200, 200', 200" in one embodiment may be provided without one or more front-end PFC stages. A PFC can be used to keep the XFC charger system 200, 200', 200" under international grid standards and recommended practices, such as IEC-61000-3-2, IEC-61000-3-12, EN 50160, IEEE 519. However, in one embodiment, grid side target operating parameters can be satisfied without PFC stages in high power applications.

Figure 34:
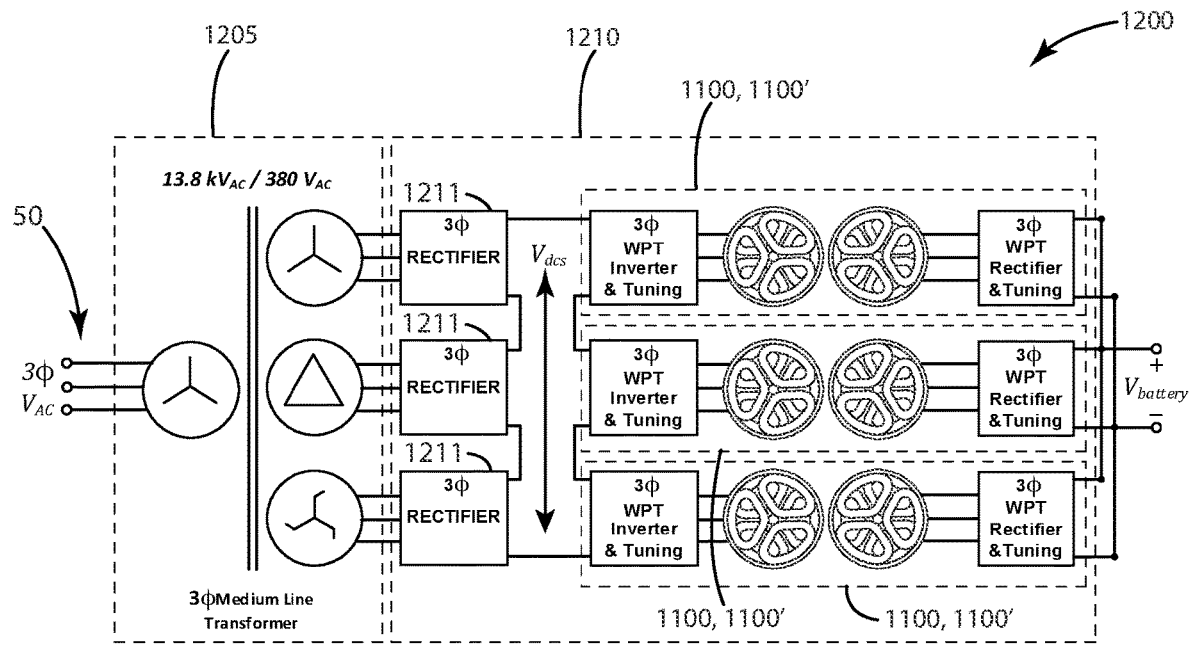
FIG. 34 shows a wireless power system in accordance with one embodiment, including a series connected wireless power system and without PFC.
Figure 35:
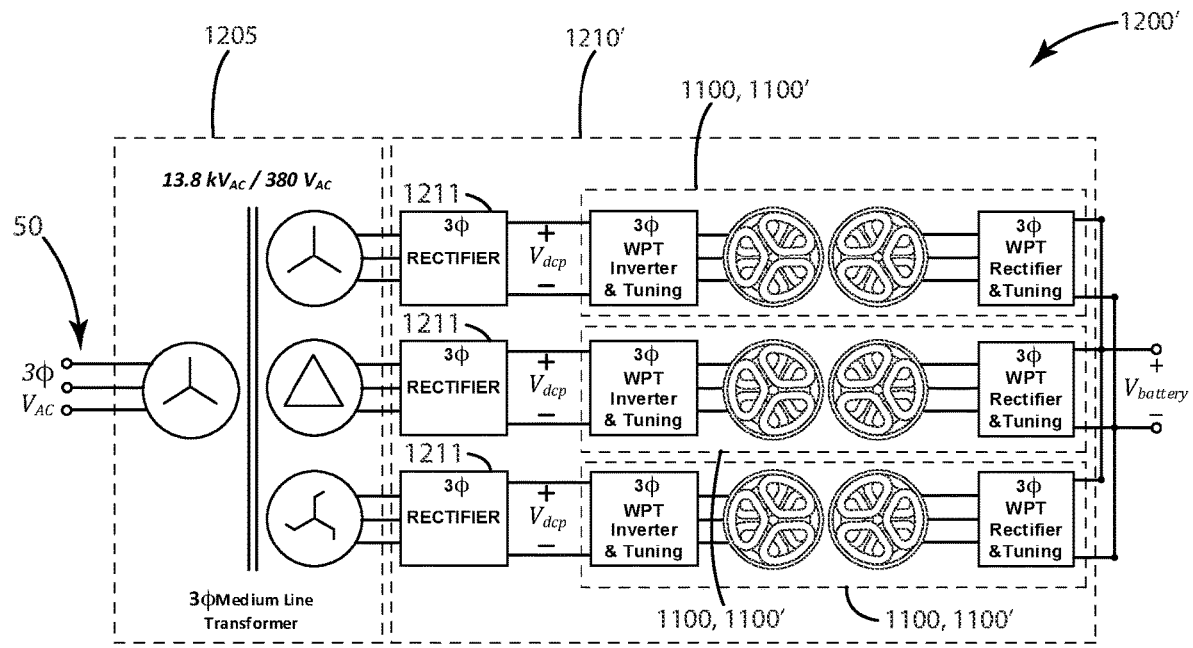
FIG. 35 shows a wireless power system in accordance with one embodiment, including a parallel connected wireless power system and without PFC.
Figure 36:
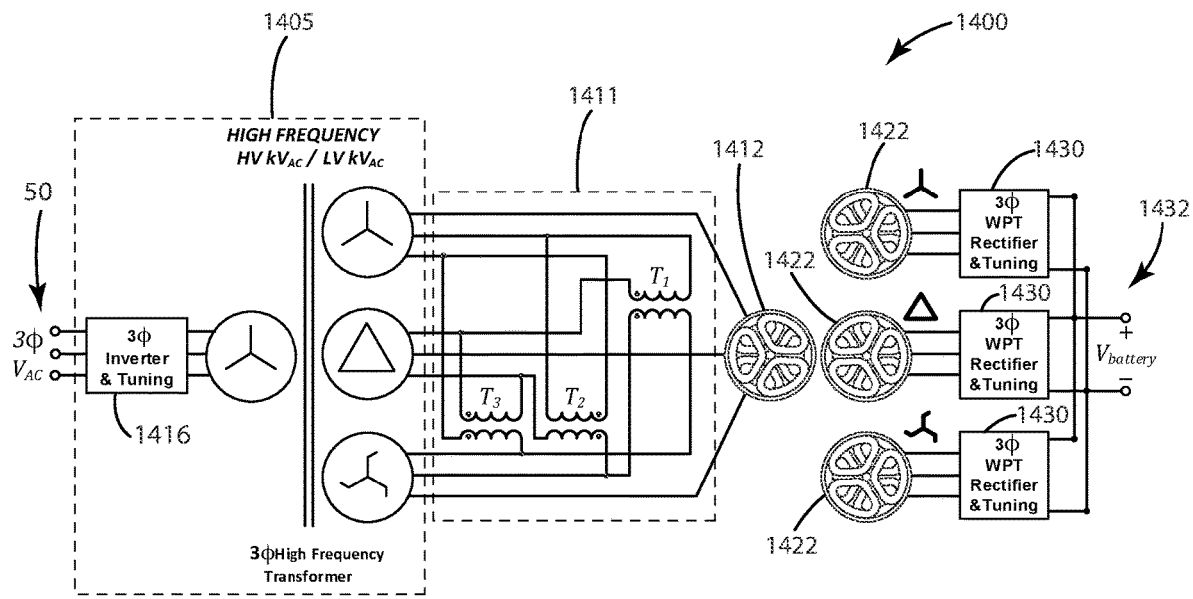
FIG. 36 shows a converter incorporated into a wireless power system in accordance with one embodiment, including a cascade connected wireless power system.

For instance, XFC charger systems in accordance with one embodiment are in FIGS. 34 and 35 and designated 1200 and 1200', respectively. The XFC charger system 1200, 1200' is similar to the XFC charger system 200, 200', 200" in many respects, including a connection to a source 50, which may be an AC source with three-phase power. The XFC charger system 200 may include an AC-to-AC converter 1205 and an AC-to-DC converter 1210, 1210'. The AC-to-DC converter 1210, 1210' in the illustrated embodiment includes a plurality of wireless power systems 100, 300, 400, 400", 500, 600, 700, 1100, 1100' configured according to any of the wireless power systems described herein. For instance, in the illustrated embodiment, the AC-to-DC converter 1210, 1210' may include a plurality of rectifier circuits 1211 operable to provide DC power to the plurality of wireless power systems 1100, 1100' for DC-to-DC conversion.

Although the XFC charger systems (e.g., 1200, 1200') are described in connection with charging a vehicle and supplying power to a load in the form of a battery, it is to be understood that the circuit configuration of the XFC charger system may be provided in a variety of applications, including applications that are unrelated to vehicles and/or a charging batteries. Further, it is to be understood that one or more wireless power systems described herein may be incorporated into an XFC charger system. Additionally, or alternatively, an XFC charger system may form at least part of a load of the wireless power system such that the wireless power system provides power to the XFC charger system. The wireless power systems described herein may be provided as a bridge between components of an XFC charger system or another system described herein, such as an ESS system 390 or a system having a battery as part of a load.

In the illustrated embodiment of FIG. 34, the plurality of wireless power systems 1100, 1100' provide 18 pulse rectifiers or converters without use of one or more front-end PFC stages. The input uncontrolled rectifiers can be connected in series as shown in the AC-to-DC converter 1210 of FIG. 34, or in parallel as shown in the AC-to-DC converter 1210' of FIG. 35. In this way, high power WPT can be achieved with unity power factor and low harmonics into the grid.

It is noted that there are several applications for using an 18 pulse rectifier connection through an autotransformer. The XFC charger system 1200, 1200' may utilize a low frequency transformer configuration on the secondary isolated side. For instance, each transformer (e.g., transmitter 1112 and receiver 1122) output may be connected by star, delta, and zigzag connection, respectively. With this configuration, balancing of voltage and current amplitudes of the transformers may be a consideration. Also, the size of each transformer (e.g., transmitter 1112 and receiver 1122) may be large due to high power and low frequency. If these factors are left unconsidered, cost and complexity can increase.

In one embodiment, in order to reduce the cost and complexity of a low frequency line transformer, front-end active switching may be provided, such as the switching configuration of switching circuitry 116 described in conjunction with the wireless power supply 100. The switching configuration of the switching circuitry 116 of the wireless power supply 100 may provide high frequency through the line transformer of the wireless power supplies 1100, 1100' of the XFC charger system 1200, 1200'. This may provide a hybrid line of low and high frequencies through the transformer with resonant compensation circuits, and help to reduce the size of the transformer with the proportional of hybrid operating frequencies.

An isolated high frequency transformer configuration (e.g., the transmitter 112/receiver 124 and switching circuitry 112 of wireless power supply 100) can be employed through an XFC charger system in a variety of configurations. Example embodiments that implement in series with intercell transformers or parallel connection are depicted in the illustrated embodiments of FIGS. 38 and 39, showing XFC charger system 1400, 1500 in accordance with one embodiment.

The XFC charger systems 1400, 1500 may be similar in some respects to the XFC charger systems described herein, including a source 50 for supply of power (e.g., three-phase AC power from a grid source) and an AC-to-AC converter 1405, 1505 similar in many respects to the AC-to-AC switching methodology implemented by the wireless power supply 100. The AC-to-AC converter 1405, 1505 may be operably coupled in series to a transmitter 1412 or in parallel to a plurality of transmitters 1512, depending on the configuration. The XFC charger systems 1400, 1500 may include a plurality of receivers 1422, 1522 coupled to the transmitter 1412 or transmitters 1512 and rectification circuitry 1430, 1530 that conditions the output from the receivers 1422, 1522 for supply of power to a load 1432, 1532 (e.g., a battery). The AC-to-AC converter 1405, 1505 may include switching circuitry 1416, 1516 operable to in accordance with a method similar to that of the switching circuitry 116 to modulate input power according to a high frequency signal.

Figure 38:
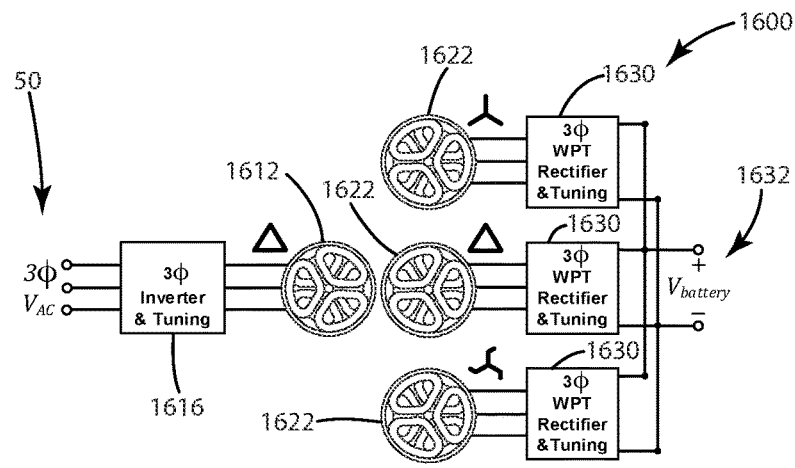
FIG. 38 shows a converter incorporated into a wireless power system in accordance with one embodiment including a star/delta/zig-zag connection scheme for a medium voltage grid.
Figure 39:
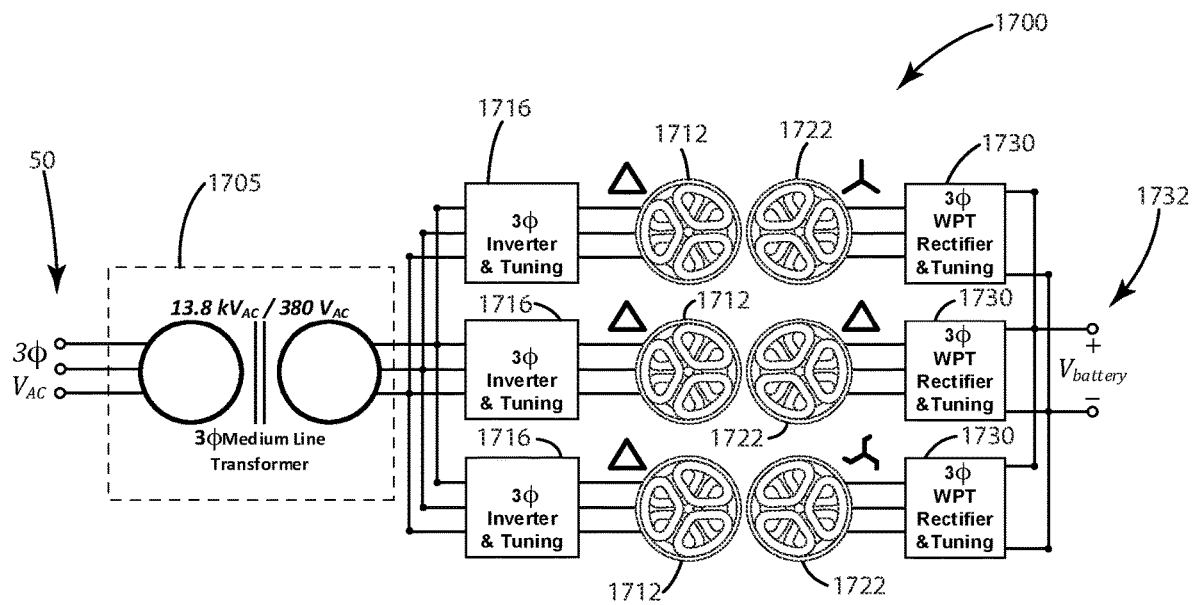
FIG. 39 shows a converter incorporated into a wireless power system in accordance with one embodiment including a star/delta/zig-zag connection scheme for a low voltage grid.

A cascaded connection of high frequency transformer output is provided in the illustrated embodiment of FIG. 38. The intercell transformer acquires the cascaded connection to the high frequency transformer outputs. The system output voltage can be increased across the transformer transmitter and low current can be obtained by reducing the conduction losses in the WPT coupler transformer (e.g., the transmitter 1412 and receivers 1422). This approach may provide for low output voltage line transformer applications by increasing voltage amplitude and reducing the current amplitude. Intercell transformer circulating currents are directly related to the operating frequency and the value of the self-inductance for each intercell transformer. It is noted that this approach may utilize intercell transformers and high frequency transformers. Each output of high frequency transformer is connected by star, delta, and zig-zag configured for the transformer voltage and current amplitudes.

Figure 37:
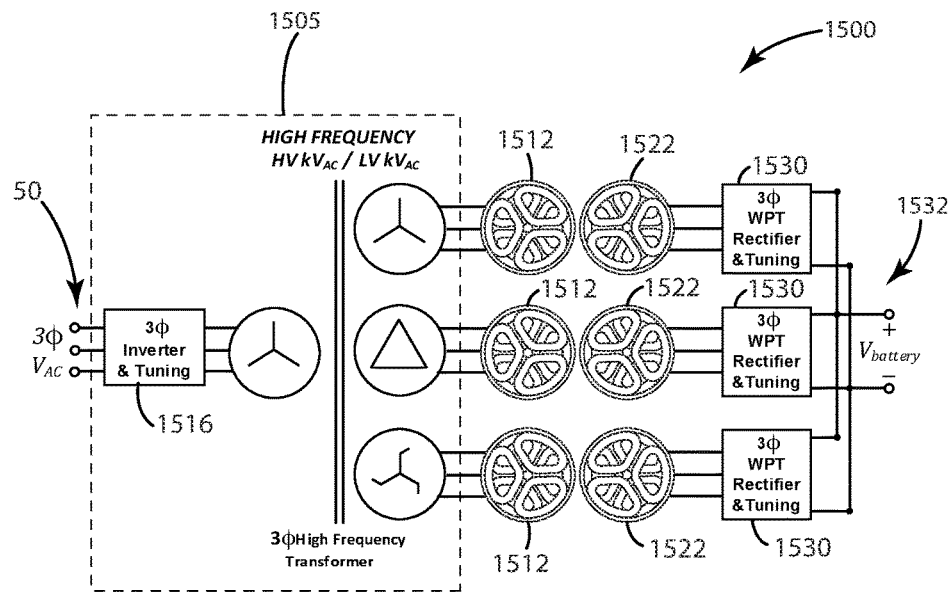
FIG. 37 shows a converter incorporated into a wireless power system in accordance with one embodiment, including a parallel connected wireless power system.

A parallel connection of each high frequency transformer is presented in accordance with one embodiment in FIG. 37. The output of each high frequency transformer is connected by star, delta, and zig-zag and each output is connected parallel through WPT coupler transformer (e.g., the transmitters 1512 and receivers 1522). With the XFC charger system 1400 and XFC charger system 1500, THD and PF targets can be reached, and the system design cost can be reduced relative to conventional system structures.

Further XFC charger systems 1600, 1700 are shown in the illustrated embodiments of FIGS. 38 and 39. These XFC charger systems 1600, 1700 are similar to the XFC charger systems 1400, 1500 in many respects. For instance, the XFC charger systems 1600, 1700 may include a source 50 for supply of power (e.g., three-phase AC power from a grid source) and switching circuitry 1616, 1716 operable in in accordance with a method similar to that of the switching circuitry 116 to modulate input power according to a high frequency signal. The XFC charger systems 1600, 1700 may include one or more transmitters 1612, 1712 and one or more receivers 1624, 1724 operable to couple with the one or more transmitters 1612, 1712 for wireless power transfer. The XFC charger systems 1600, 1700 may include rectification circuitry 1630, 1730 that conditions the output from the receivers 1622, 1722 for supply of power to a load 1632, 1732 (e.g., a battery).

The XFC charger systems 1600, 1700 may be implemented by connecting WPT coupler transformer outputs star, delta, and zig-zag as seen in the illustrated embodiments. In this way, high frequency transformers can be eliminated by designing the WPT coupler transformer considering the input and output voltage conditions. The XFC charger system 1600 can be connected to a medium voltage line through the WPT coupler transformer and multi-output WPT coupler transformer as seen in the illustrated embodiment of FIG. 38. The coupler transformer can provide step-down voltage transformation due to high voltage in the input of the medium voltage source. A parallel connected configuration is depicted through low line voltage the illustrated embodiment of FIG. 39. The converter input current can be divided between parallel connection of the WPT coupler transformer such that high power can be realized. One advantage of the XFC system 1700 is there can be no requirement of a low or high frequency multi-output transformer. Through the WPT coupler transformer output connection, the system grid side target parameters can be attained, and the system infrastructure cost can be significantly reduced. It is noted that, in one embodiment, WPT coupler transformer of the XFC system 1700 may involve providing voltage and current balance in each parallel connection.

As discussed herein and depicted in the illustrated embodiments of FIGS. 36-39 for high power WPT system, power can be supplied without PFC. The coupler transformer configuration (e.g., transmitter and receiver) can reduce harmonics and provide the unit power factor, considering medium voltage and low voltage systems. The coupler WPT connection can reduce the harmonics in the grid stage. It is noted that the voltage and current balances between phases may be considered for the transformer turns ratios. The resonant compensation network may provide unity power factor in the transmitter and receivers sides. If the system is kept in the resonant from the primary and secondary networks, the unity power factor may be obtained at the grid input terminals.

VI. MV Line Switching Circuitry

A variety of embodiments are described herein in conjunction with switching circuitry operable to drive a three-phase coupler. Additional examples of switching circuitry are provided herein in conjunction with the illustrated embodiments of FIGS. 62A-D, and are generally designated 816, 826, 836, 846, respectively. The switching circuitry 816, 826, 836, 846 in the illustrated embodiments is coupled to a source via interface circuitry (e.g., filtering circuitry), which may be similar to the interface circuitry 318 described herein.

The converter phase outputs a, b, and c can be connected to the resonant stage with wireless charging coupling coils or a closely (tightly) coupled high-frequency isolation transformer or a step-down high-frequency transformer followed by the coupling coils. With that, the multi-level converter can operate in both conductive or wireless applications with AC or DC load conditions. With the multi-level architecture, converter can be directly connected to medium-voltage distribution system or high AC voltage systems with kV level input voltages. Multi-level converter types; 62A) diode clamped three-level converter, 62B) flying capacitor three-level converter, 62C) diode clamped multi-level converter, 62D) flying capacitor multi-level converter.

In the illustrated embodiments, the converter phase outputs a, b, and c from the switching circuitry 816, 826, 836, 846 can be connected to a transmitter (e.g., transmitter 312, 412, 512, 612, 712, 1112, 1112') of a resonant stage of wireless charging coupling coils or a closely (tightly) coupled high-frequency isolation transformer or a step-down high-frequency transformer followed by the coupling coils. In one embodiment, the multi-level switching circuitry 816, 826, 836, 846 can operate in both conductive or wireless applications with AC or DC load conditions. With the multi-level architecture, the switching circuitry 816, 826, 836, 846 can be directly connected to medium-voltage distribution system or high AC voltage systems with kV level input voltages.

The switching circuitry 816 includes a diode clamped three level converter topology, and the switching circuitry 826 includes a flying capacitor three level converter topology. The switching circuitry 836 includes a diode clamped multi-level converter topology, and the switching circuitry 846 includes a flying capacitor multi-level converter topology.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A system for wirelessly providing DC power based on AC power and providing AC power based on DC power to provide an AC-to-DC bidirectional converter such that AC power is convertible to DC power and DC power is convertible to AC power, the system comprising:
an off-board module including:
an AC-to-AC converter configured to receive a grid-voltage signal that is a single phase grid-voltage signal or a three-phase grid-voltage signal, the AC-to-AC converter configured to convert the grid-voltage signal to a modulated high-frequency voltage signal, wherein the modulated high-frequency voltage signal includes a high-frequency carrier signal having an envelope corresponding to the grid-voltage signal, and
a transmitter including a primary coil, the transmitter configured to wirelessly transmit the modulated high-frequency voltage signal to provide a DC power source; and an on-board module including:
a receiver including a pick-up coil,
the receiver configured to receive the modulated high-frequency voltage signal when the primary coil and the pick-up coil are disposed adjacent to each other, and
the receiver configured to provide the modulated high-frequency voltage signal to a DC load as the DC power source
wherein the AC-to-DC bidirectional converter includes:
for single phase, two half bridges connected to single-phase active phases in a common point;
for single phase, the two half bridges are configured such that, during a positive cycle, a first one of the half bridges switches on-and-off the grid-voltage signal, while a second one of the half bridges does not switch;
for single phase, the two half bridges are configured such that, during a negative cycle, the second one of the half bridges switches on-and-off the grid-voltage signal, while the first one of the half bridges does not switch; and
for three-phase, three half bridges are connected to three-phase active phases in a common point;
for three-phase, the three half bridges are configured such that, a corresponding half bridge of each phase is in an on state in a positive cycle, while the other half bridges are in an off state;
the three half bridges configured such that, the corresponding half bridge of each phase is in an off state in a negative cycle, while the other half bridges are in an on state; and
whereby the two and three half bridges chop the grid-voltage signal at a carrier frequency of the high-frequency carrier signal and produce the modulated high-frequency voltage signal.

2. The system of claim 1 wherein the carrier frequency is provided within an acceptable range of performance for components of switching circuitry of the half bridges.

3. The system of claim 1 wherein the AC-to-DC bidirectional converter includes coupling capacitors connected across the two and three half bridges, respectively.

4. The system of claim 3 wherein the coupling capacitors have a capacitance based on parameters for the modulated high-frequency voltage signal.

5. The system of claim 1 wherein the off-board module includes a pre-stage filter configured to filter the received grid-voltage signal.

6. The system of claim 1 wherein the grid-voltage signal has a frequency of 50 Hz or 60 Hz and an RMS in a range of 110V-208V-220V-240V-480V-13.8 kV.

7. The system of claim 1 wherein:
the transmitter includes transmitter resonant tuning circuitry;
the receiver includes receiver circuitry operable to receive power wirelessly from the transmitter, the receiver circuitry including receiver resonant tuning circuitry that is different from the transmitter resonant tuning circuitry;
the receiver resonant tuning circuitry includes one or more L and C networks arranged to form a resonant network; and
the transmitter resonant tuning circuitry includes one or more L and C networks arranged to form a resonant network.

8. The system of claim 7 wherein the receiver resonant tuning circuitry includes one or more of the following types of compensation circuits: series-series compensation, parallel-parallel compensation, LCC-LCC compensation, LCL-LCL compensation, series-parallel compensation, parallel-series compensation, series-LCC compensation, LCC-series compensation, parallel-LCC compensation, LCC-parallel compensation, series-LCL compensation, LCL-series compensation, parallel-LCL compensation, and LCL-parallel compensation.

9. The system of claim 7 wherein the transmitter and the receiver are configured to transfer power via at least one transformer, wherein the at least one transformer includes at least one of a) one or more highly coupled transformers and b) one or more loosely coupled transformers, wherein the at least one transformer is based on one or more of the following transformer arrangements: single phase, three-phase, polyphase, multiphase, star connection, delta connection, zig-zag connection, phase-shift connection, unipolar circular coil, unipolar rectangular coil, bipolar double-D coil, bipolar coil as rectangular, bipolar coil as double-D, omni directional 3D coil, LLC transformer, and CLL transformer.

10. A wireless power supply for wirelessly transmitting power to a receiver of a wireless power receiver, the wireless power supply comprising:
power supply circuitry operable to receive AC power from an AC power source, the power supply circuitry configured to output a DC voltage signal, the power supply circuitry being bidirectional such that a received DC voltage signal is convertible to AC power;
a transmitter circuitry operably coupled to the power supply circuitry, the transmitter circuitry configured to receive the DC voltage signal from the power supply circuitry, the transmitter circuitry configured to modulate the DC voltage signal to wirelessly transmit a modulated AC voltage signal to the receiver of the wireless power receiver;
wherein the transmitter circuitry includes switching circuitry configured to modulate the DC voltage signal to yield the modulated AC voltage signal;
wherein the switching circuitry includes two half-bridges for single phase and three half-bridges for a three-phase system connected in a common point and active phases;
wherein for single phase, the two half-bridges are configured such that, during a positive cycle, a first one of the two half-bridges is configured to switch on-and-off the DC voltage signal, while a second one of the two half-bridges does not switch;
wherein for single phase, the two half-bridges are configured such that, during a negative cycle, the second one of the two half-bridges is configured to switch on-and-off the DC voltage signal, while the first one of the two half-bridges does not switch;
wherein for three-phase, the three half-bridges are configured such that, a corresponding half bridge of each phase is in an on state in a positive cycle, while the other half bridges are in an off state;
wherein for three-phase, the three half-bridges are configured such that, the corresponding half bridge of each phase is in an off state in a negative cycle, while the other half bridges are on state; and
whereby the two half-bridges and the three half-bridges are operable to chop the DC voltage signal at a carrier frequency of a high-frequency carrier signal and produce the modulated AC voltage signal.

11. The wireless power supply of claim 10 wherein the modulated AC voltage signal transmitted to the wireless power receiver provides the wireless power receiver with AC power corresponding to grid-power received from a grid connection to a grid-power source, wherein the AC power source is the grid-power source.

12. The wireless power supply of claim 10 wherein an envelope of the modulated AC voltage signal corresponds to the AC power received from the AC power source.

13. The wireless power supply of claim 10 wherein the transmitter circuitry includes a primary coil configured to inductively couple with a secondary coil of the wireless power receiver for transmission of power to the wireless power receiver.

14. The wireless power supply of claim 10 wherein the switching circuitry is configured to generate the modulated AC voltage signal by modulating the DC voltage signal according to a high-frequency carrier signal that has a carrier frequency greater than a frequency of the AC power obtained from the power supply circuitry.

15. The wireless power supply of claim 10 wherein the switching circuitry is configured to generate the modulated AC voltage signal by switching ON and OFF the DC voltage signal according to a modulation signal.

16. The wireless power supply of claim 15 wherein the modulation signal is the high-frequency carrier signal.

17. The wireless power supply of claim 10 wherein the wireless power receiver is incorporated into a DC source, and wherein the wireless power supply is incorporated into a DC system and is bidirectional.

18. The wireless power supply of claim 10 wherein the wireless power supply and the receiver form a wireless AC bridge capable of transmitting the AC power from the AC power source to the wireless power receiver for consumption as DC power by a load.

19. The wireless power supply of claim 10 wherein:
the transmitter circuitry includes a transmitter and transmitter resonant tuning circuitry;
the wireless power receiver includes receiver circuitry with the receiver, the receiver circuitry operable to receive power wirelessly from the transmitter circuitry, the receiver circuitry including receiver resonant tuning circuitry that is different from the transmitter resonant tuning circuitry;
the receiver resonant tuning circuitry includes one or more L and C networks arranged to form a resonant network; and
the transmitter resonant tuning circuitry includes one or more L and C networks arranged to form a resonant network.

20. The wireless power supply of claim 19 wherein the receiver resonant tuning circuitry includes one or more of the following types of compensation circuits: series-series compensation, parallel-parallel compensation, LCC-LCC compensation, LCL-LCL compensation, series-parallel compensation, parallel-series compensation, series-LCC compensation, LCC-series compensation, parallel-LCC compensation, LCC-parallel compensation, series-LCL compensation, LCL-series compensation, parallel-LCL compensation, and LCL-parallel compensation.

21. The wireless power supply of claim 19 wherein the transmitter and the receiver are configured to transfer power via at least one transformer, wherein the at least one transformer includes at least one of a) one or more highly coupled transformers and b) one or more loosely coupled transformers, wherein the at least one transformer is based on one or more of the following transformer arrangements: single phase, three-phase, polyphase, multiphase, star connection, delta connection, zig-zag connection, phase-shift connection, unipolar circular coil, unipolar rectangular coil, bipolar double-D coil, bipolar coil as rectangular, bipolar coil as double-D, omni directional 3D coil, LLC transformer, and CLL transformer.

* * * * *